US008380541B1

(12) United States Patent  (10) Patent No.: US 8,380,541 B1
Holmes  (45) Date of Patent: *Feb. 19, 2013

(54) SYSTEMS AND METHODS FOR COLLECTING AND TRANSMITTING ASSAY RESULTS

(75) Inventor: Elizabeth Holmes, Palo Alto, CA (US)

(73) Assignee: Theranos, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,946

(22) Filed: Sep. 26, 2011

Related U.S. Application Data

(63) Continuation-in-part of application No. PCT/US2011/053189, filed on Sep. 25, 2011.

(51) Int. Cl.
G06F 7/04 (2006.01)
G06F 15/16 (2006.01)
G06F 17/30 (2006.01)
H04L 29/06 (2006.01)

(52) U.S. Cl. ............................................. 705/3; 705/2
(58) Field of Classification Search .................. 705/2–3
See application file for complete search history.

(56) References Cited

U.S. PATENT DOCUMENTS

| 5,273,905 | A * | 12/1993 | Muller et al. .............. 435/286.5 |
| 6,477,394 | B2 * | 11/2002 | Rice et al. .................... 600/318 |
| 6,748,337 | B2 * | 6/2004 | Wardlaw et al. ................ 702/84 |
| 2002/0052761 | A1 * | 5/2002 | Fey et al. ......................... 705/2 |
| 2002/0059030 | A1 * | 5/2002 | Otworth et al. ................ 702/19 |
| 2002/0120187 | A1 | 8/2002 | Eiffert et al. |
| 2002/0161606 | A1 * | 10/2002 | Bennett et al. .................. 705/2 |
| 2003/0100822 | A1 | 5/2003 | Lew et al. |
| 2005/0159982 | A1 * | 7/2005 | Showalter et al. .............. 705/2 |
| 2006/0292039 | A1 | 12/2006 | Iida |
| 2007/0118399 | A1 | 5/2007 | Avinash et al. |
| 2008/0065420 | A1 | 3/2008 | Tirinato et al. |
| 2009/0093970 | A1 * | 4/2009 | Lewy et al. .................... 702/21 |
| 2010/0152885 | A1 | 6/2010 | Regan et al. |
| 2010/0184093 | A1 * | 7/2010 | Donovan et al. ............. 435/7.21 |
| 2011/0213564 | A1 | 9/2011 | Henke |
| 2011/0213579 | A1 | 9/2011 | Henke |
| 2011/0213619 | A1 | 9/2011 | Henke |

FOREIGN PATENT DOCUMENTS

WO  WO 2011/106512 A1  9/2011

OTHER PUBLICATIONS

Abbott. FDA Clears Abbott's i-STAT® 1 Wireless Point of Care Testing System. Press release dated Mar. 29, 2011.
Abbott. Procedure Manual for the i-STAT® System. Rev. date Jul. 12, 2004.
Abbott. Testing Cartridges for the i-STAT System. Rev. B. Jun. 2009. Available at http://www.abbottpointofcare.com/PDFs/17845_CrtrdgeBrochure_M1.pdf. Accessed Sep. 13, 2011.

(Continued)

*Primary Examiner* — Robert Morgan
*Assistant Examiner* — Joy Chng
(74) *Attorney, Agent, or Firm* — Wilson Sonsini Goodrich & Rosati

(57) ABSTRACT

Systems and methods are provided for collecting, preparing, and/or analyzing a biological sample. A sample collection site may be utilized with one or more sample processing device. The sample processing device may be configured to accept a sample from a subject. The sample processing device may perform one or more sample preparation step and/or chemical reaction involving the sample. Data related to the sample may be sent from the device to a laboratory. The laboratory may be a certified laboratory that may generate a report that is transmitted to a health care professional. The health care professional may rely on the report for diagnosing, treating, and/or preventing a disease in the subject.

24 Claims, 16 Drawing Sheets

OTHER PUBLICATIONS

Health Buddy device. Available at http://www.3hc.org/images/2009%20images/health-buddy-appliance.gif. Accessed Aug. 26, 2011.

Health Buddy Health Management Programs. Available at http://www.bosch-telehealth.com/content/language1/img_zoom/health_buddy_system.gif. Accessed Aug. 26, 2011.

U.S. Appl. No. 13/244,951, filed Sep. 26, 2011, Holmes.

Di Serio, et al. Integration between the tele-cardiology unit and the central laboratory: methodological and clinical evaluation of point-of-care testing cardiac marker in the ambulance. Clin Chem Lab Med. 2006;44(6):768-73.

International search report and written opinion dated Jan. 18, 2012 for PCT/US2011/053189.

\* cited by examiner

FIG. 9

EXEMPLARY ASSAYS AND TESTS 17- ketosteroids, 17-hydroxypregneno, 1-methylhistidine, 2,4-dichlorophenoxyacetic acid, 3-methylhistidine, 5-hiaa, a-aminoadipic acid, a-amino-n-butyric acid, acetaminophen, acetic anhydride, acetone assay, acetone/ketones, Acetylcholinesterase assay, acid, acth, activated protein c, Acylcarnitines, qual, acylcarnitines, quant, adenovirus ag, if, Adenovirus antibody, Adenovirus assay w/optic, Ag detect nos, eia, mult, Ag detect nos, eia, single, Ag detect polyval, eia, mult, Ag detection, polyval, if, Agent nos assay w/optic, Agglutinins, febrile, alanine, alanine amino (alt) (sgpt), albumin, serum, albumin, urine, aldolase, aldosterone, alkaline phosphatase, Allergen specific IgE, Allergen specific igg, alpha-1-antitrypsin, pheno, alpha-1-antitrypsin, total, alpha-fetoprotein 13, alpha-fetoprotein, amniotic, alpha-fetoprotein, serum, alternaria tenuis, amikacin, amines, vaginal fluid qual, aminolevulinic acid, amitriptyline, ammonia, Amniotic fluid enzyme test, amphetamines, amylase, androstanediol glucuronide, androstenedione, angiotensin i enzyme , Antibody detection, nos, if, antinomyces antibody, antinuclear antibodies, antinuclear antibodies (ana), antistreptolysin o, titer, antithrombin iii activity; clotting inhibitors or anticoagulants, apo a-1, apo b, arginine, ascorbic acid, asparagine, Aspergillus ag, eia, aspergillus antibody, Assay acid phosphatase, Assay alkaline phosphatase, Assay alkaline phosphatases, Assay duodenal fluid trypsin, Assay for calprotectin fecal, Assay of aluminum, Assay of androsterone, Assay of angiotensin II, Assay of apolipoprotein, Assay of arsenic, Assay of blood acetaldehyde, Assay of breath ethanol, Assay of cadmium, Assay of chromium, Assay of corticosteroids, Assay of corticosterone, Assay of cryofibrinogen, Assay of csf protein, Assay of desipramine, Assay of dibucaine number, Assay of dihydrocodeinone, Assay of dihydromorphinone, Assay of doxepin, Assay of endocrine hormone, Assay of estrogen, Assay of ethosuximide, Assay of ethylene glycol, Assay of etiocholanolone, Assay of fecal fat, Assay of feces for trypsin, Assay of feces porphyrins, Assay of fluoride, Assay of galactose, Assay of glucagon, Assay of glucosidase, Assay of glutethimide, Assay of haloperidol, Assay of idh enzyme, Assay of imipramine, Assay of intrinsic factor, Assay of ketogenic steroids, Assay of lap enzyme, Assay of ldh enzymes, Assay of lead, Assay of lidocaine, Assay of lrh hormone, Assay of manganese, Assay of mercury, Assay of methsuximide, Assay of nickel, Assay of nicotine, Assay of nucleotidase, Assay of phenothiazine, Assay of phenylketones, Assay of phenytoin, free, Assay of pregnanediol, Assay of pregnanetriol, Assay of primidone, Assay of procainamide, Assay of procainamide, Assay of progesterone, Assay of prostaglandin, Assay of protein, any source, Assay of protein, other, Assay of pyruvate kinase, Assay of quinidine, Assay of selenium, Assay of semen fructose, Assay of silica, Assay of somatostatin, Assay of thyroid activity, Assay of troponin, qual. Assay of urine alkaloids, Assay of urine osmolality, Assay of vitamin b-2, Assay of volatiles, Assay ph body fluid nos, Assay phosphohexose enzymes, assay prostate phosphatase, Assay, blood catecholamines, Assay, carbamazepine, free, Assay, carboxyhb, qual, Assay, c-d transfer measure, Assay, chondroitin sulfate, Assay, free hydroxyproline, Assay, myeloperoxidase, Assay, nephelometry not spec, Assay, nonendocrine receptor, Assay, other fluid chlorides, Assay, rbc cholinesterase, Assay, serum cholinesterase, Assay, total hydroxyproline, Assay, toxin or antitoxin, Atomic absorption, aureobasidium pullulans, automated leukocyte count, automated platelet count, automated rbc count, automated reticulocyte count, b cells, total count, b hexosaminidase, b-12 binding capacity, b-alanine, b-aminoisobutyric acid, barbiturates, bartonella antibody, Bartonella, dna, amp probe, basophils, benzene, benzodiazepines, beta-2 protein, Bile acids, cholylglycine, bile acids, total, bilirubin total transcut, bilirubin, direct, bilirubin, total, biotinidase, Bl smear w/diff wbc count, Bl smear w/o diff wbc count, Blastomyces antibody, Bleeding time test, Blood clot factor assay, blood clot factor ii test, blood clot factor ix test, Blood clot factor V test, blood clot factor vii test, Blood clot factor VIII test,

FIG. 9 con't.

Blood clot factor X test, blood clot factor xi test, blood clot factor xii test, Blood clot factor XIII test, Blood clot factor XIII test, Blood culture for bacteria, Blood fungus culture, blood gases w/02 saturation, blood gases, o2 sat only, blood gases: ph, po2 & pco2, blood lipoprotein, blood methemoglobin assay, Blood methemoglobin test, blood platelet aggregation, Blood smear interpretation, blood typing, abo, blood typing, antigen screen, Blood typing, patient serum, blood typing, rh (d), Blood viscosity examination, body fluid cell count, Body fluid cell count, Body fluid specific gravity, bordetella antibody, Borrelia antibody, breakbone fever, Brucella antibody, BSAP, butorphanol, C diff amplified probe, calcitonin, calcium, calcium in urine, Calcium infusion test, Calculus analysis, qual, Calculus assay, quant, Calculus spectroscopy, candida antibody, candida, dna, amp probe, candida, dna, dir probe, carbamazepine, total, carbon dioxide, blood, carbon tetrachloride, carboxyhemoglobin quant, carcinoembryonic antigen, cardiolipin antibody, carnitine, carnosine, carotene, catecholamines, urine, ccp antibody, Cell cryopresrve/storage, ceruloplasmin, Chemiluminescent assay, chlamydia antibody, Chlamydia culture, chlamydia igm antibody, chlamydia trachomatis ag, if, chloride, blood, chloride, urine, cholesterol, bld/serum, chorionic gonadotropin , Chromatogram assay, sugars, Chromogenic substrate assay, Chromosome analys, amniotic, Chromosome analys, placenta, Chromosome analysis, 100, Chromosome analysis, 15-20, Chromosome analysis, 20-25, Chromosome analysis, 45, Chromosome analysis, 5, Chromosome analysis, 50-100, Chromosome banding study. Chromosome count, additional, Chromosome karyotype study, Chromosome study, additional, Chromotography, quant, mult, Chromotography, quant, sing, chylmd pneum, dna, amp probe, chylmd trach ag, eia, Chylmd trach assay w/optic, chylmd trach, dna, amp probe, chylmd trach, dna, dir probe, citrate, citrulline, ck (cpk), cladosporium , Clinical chemistry test, clostridium ag, eia, clostridium toxin a w/optic, Clotting funct activity, clotting inhibitors or anticoagulants; protein c, activity, clotting inhibitors or anticoagulants; protein s, total, clotting; factor viii (ahg), 1-stage, clotting; factor viii, vw factor antigen, clotting, factor viii, vw factor, ristocetin cofactor, cmv antibody, cmv antibody, igm, coagulation time, Coagulation time, cocaine, coccidioides antibody, cold agglutinin, titer, Collagen crosslinks, colorado tick fever antibodies, igg & igm, ifa , Column chromotograph/isotope, Column chromotograph/isotope, Column chromotography, qual, Column chromotography, quant, complement component 1 antigen, complement component 1 functional, complement component 2 antigen, complement component 2 functional, complement component 3 antigen, complement component 3 functional, complement component 4 antigen, complement component 4 functional, complement component 5 antigen, complement component 5 functional, complement component 6 antigen, complement component 6 functional, complement component 7 antigen, complement component 7 functional, complement component 8 antigen, complement component 8 functional, complement component 9 antigen, complement component 9 functional, Complement fixation, each, complement, total (ch50), coombs (antiglobulin test, agt), coombs test, indirect, titer, copper, coproporphyrin, cortisol, free, c-peptide, c-reactive protein, creatine, creatinine, mb fraction, creatinine (egfr), creatinine clearance , creatinine, urine, cresols, cryoglobulin, cryptococcus antibody, Cryptococcus neoform ag, eia, cryptosporidium ag, eia, cryptosporidium ag, if, ctx, Cultr bacteria, except blood, Culture aerobic identify, Culture anaerobe ident, each, Culture bacteri aerobic othr, Culture bacteria anaerobic, Culture of specimen by kit, Culture screen only, Culture type immunofluoresc, Culture type, immunologic, Culture typing, added method, Culture, bacteria, other, cyanide, cyclosporine, cystathionine, cystatin c, cystine, Cyto/molecular report, Cytogenetics, 100-300, Cytogenetics, 10-30, Cytogenetics, 25-99, Cytogenetics, 3-5, Cytogenetics, dna probe, cytomeg, dna, amp probe, Cytomeg, dna, dir probe, cytomeg, dna, quant, Cytomegalovirus ag, eia, Cytomegalovirus dfa, Cytopath c/v auto fluid redo, Cytopath c/v thin layer redo, Cytopath eval, fna, report, Cytopath smear, other source, Cytopath tbs, c/v, manual, Cytopath tbs, c/v, redo, Cytopath, c/v auto, in fluid, Cytopath, c/v, auto rescreen, Cytopath, c/v, automated, Cytopath, c/v, index add-on, Cytopath, c/v, interpret, Cytopath, c/v, manual, Cytopath, c/v, thin layer, Cytopath, cell enhance

FIG. 9 cont.

tech, Cytopathology procedure, Cytotoxic antibody screening, cytotoxic antibody screening, Dark field examination, Dark field examination, Decalcify tissue, dehydroepiandrosterone, dehydroepiandrosterone sulfate (dheas), dengue 1 antibody quant, dengue 1 viral load, dengue 2 antibody quant, dengue 2 viral load, dengue 3 antibody quant, dengue 3 viral load, dengue 4 antibody quant, dengue 4 viral load, dengue fever virus antibodies, Deoxycortisol, deoxypyridinoline, deoxyribonuclease, antibody, Desoxycorticosterone, Detect agent nos. dna, amp, Detect agent nos, dna, dir, Detect agent nos, dna, quant, Detect agent nt mult, dna, ampli, Detect agent nt mult, dna, direc, dichloroethane, dichloromethane, diethylether, digoxin, dihydrotestosterone, diphtheria antibody, dipropylacetic acid, disaccharides, d-lysergicacid diethylamide, dna antibody, dna antibody, single strand, Dna/rna direct probe, Dna/rna sequencing, dolophine,, dopamine, E coli 0157 ag, eia, ehrlichia antibody, Electrophoretic test, Encephalitis antibody, Encephalitis antibody, Encephalitis antibody, Encephalitis antibody, Entamoeb hist dispr, ag, eia, Entamoeb hist group, ag, eia, enterovirus antibody, Enterovirus, dna, amp probe, Enzyme cell activity, Enzyme cell activity, ra, eosinophils, epinephrine, epstein-barr antibody, epstein-barr antibody, epstein-barr antibody, erythropoietin, estradiol, estriol, estrone, ethanol, ethyl glucuronide, Euglobulin lysis, Evaluation, cervical mucus, Exam feces for meat fibers, Exam,synovial fluid crystals, exanthem subitum, Factor inhibitor test, fats/lipids, feces, qual, fatty acids, blood, Fecal bilirubin test, Feces culture, bacteria, ferritin, fetal fibronectin, Fetal hemoglobin assay, qual, Fetal hemoglobin, chemical, FGF-23, fibrin degradation products, fibrin degradation, quant, fibrinogen, Fibrinogen, Fibrinolysins screen, fibrinolytic antiplasmin, fibrinolytic plasminogen, fibrinolytic plasminogen, Fibrinolytic plasminogen, flavivirus, Flowcytometry/ tc, 1 marker, Flowcytometry/read, 16 & >, Flowcytometry/tc, add-on, flunitrazepam, Fluorescent antibody, screen, Fluorescent antibody, titer, Fluoro polarize, fetal lung, folic acid serum, blood, folic acid, rbc, formate, Fractionation, ketosteroids, Francisella tularensis, Frozen cell preparation, ft-3, free, Fungi identification, mold, Fungi identification, yeast, Fungus isolation culture, g6pd enzyme, galactose transferase, Galactose transferase test, gardner vag, dna, amp probe, gardner vag, dna, dir probe, Gas/liquid chromatography, gastrin, Gastrin test, gdh enzyme, genet virus isolate, hsv, Genetic examination, genotype, dna, hiv reverse t, gentamicin, ggt, giardia ag, eia, giardia ag, if, Giardia lamblia antibody, glucagon tolerance test, Glucose other fluid, glucose, blood quant, glutamic acid, glutamine, glutathione, glycan antibodies, glycated protein, glycine, glycoprotein ab iga, glycoprotein ab igg, glycoprotein ab igm, Glycoprotein antibody, glycosylated hemoglobin, gonadotropin (fsh), gonadotropin (lh), growth hormone (hgh), Growth hormone antibody, h pylori (c-13), blood, h pylori (c-13), breath, h pylori ag, eia, h pylori drug admin, h pylori iab iga, h pylori iab igg, h pylori iab igm, hairstat, haptoglobin, quant, hcg, free betachain test, Heavy metal screen, hedonal, Heinz bodies, direct, Heinz bodies, induced, Helicobacter pylori, Helminth antibody, helminth setomelanomma rostrata/halodes, Hemagglutination inhibition, hematocrit, Hematology procedure, hemoglobin, Hemoglobin chromatography, Hemoglobin electrophoresis, Hemoglobin stability screen, Hemoglobin, copper sulfate, hemoglobin, fetal, hemoglobin, plasma, hemoglobin, urine, Hemoglobin-oxygen affinity, Hemolysin, Hemolysins/agglutinins, Hemolysins/agglutinins, auto, hemophilus influenza, hemosiderin, qual, hep a antibody, igm, hep a antibody, total, hep b core antibody, igm, hep b core antibody, total, hep b surface antibody, hep be antibody, hep c ab test, confirm, heparin assay, Heparin neutralization, hepatitis b surface ag, eia, hepatitis b surface, ag, eia, hepatitis b, dna, amp probe, Hepatitis b, dna, dir probe, hepatitis b, dna, quant, hepatitis be ag, eia, hepatitis c ab , hepatitis c, genotype, dna, hepatitis c, rna, amp probe, Hepatitis c, rna, dir probe, hepatitis c, rna, quant, Hepatitis delta ag, eia, hepatitis e antibody, igg, hepatitis e antibody, igm, Hepatitis, delta agent, hepcidin, heptacarboxyporphyrin, heroin, herpes simplex , herpes simplex, herpes simplex 1, ag, if, herpes simplex 2, ag, if, herpes simplex type 2, herpesvirus 6 (hhv-6) antibody, herpesvirus 6 antibody, igm, heterophile antibodies, Heterophile antibodies, heterophile antibodies, hexacarboxyporphyrin, Hgb quant transcutaneous, Hhv-6, dna, dir probe, Hhv-6, dna, quant, histamine, histidine, Histoplasma, Histoplasma capsul ag, eia, hiv-1 ag, eia, hiv-1, dna, amp probe, hiv-

FIG. 9 cont.

1, dna, quant, hiv-1/hiv-2, single , hiv-2, hiv-2 ag, eia, Hiv-2, dna, amp probe, hla typing, a, b, or c, HLA typing, A, B, or C, hla typing, dr/dq, HLA typing, DR/DQ, Hla x-match, non-cyt add-on, Hla x-match, non-cytotoxic, homocystine, Hpv, dna, amp probe, hpylori, stool, eia, hsv, dna, amp probe, Hsv, dna, dir probe, htlv/hiv confirmatory , Htlv-i antibody, Htlv-ii antibody, Human epididymis protein 4, hva, IFN gamma, iga, igd, ige, igg, igg 1, igg 2, igg 3, igg 4, igm, IL-10, IL-12, IL-6, IL-8, Immune complex assay, Immunfix e-phorsis/urine/csf, Immunoassay, dipstick, Immunoassay, nonantibody, Immunoassay, tumor other, Immunoassay, tumor, qual, Immunoassay,infectious agent, Immunoassay,infectious agent, Immunodiffusion ouchterlony, Immunofix e-phoresis, serum, immunohistochemistry, inf a, inf a igg, inf a igm, inf b, inf b igg, inf b igm, influenza a, ag, if, influenza a/b, ag, eia, influenza b viral load, influenza b, ag, if, influenza h1n1 08 viral load, influenza h1n1 viral load, influenza h3n2 viral load, influenza h5n1 viral load, Influenza HI assay, inhibin a or b, Insitu hybridization (fish), Insitu hybridization, manual, insulin, insulin antibodies, intrinsic factor antibody, ipecac, iron, iron binding, islet cell antibody, isoleucine, isopropyl alcohol, 1/s ratio, fetal lung, lactate dehydrogenase (ld) (ldh) enzyme, lactic acid, lactoferrin, fecal (qual), lactoferrin, fecal (quant), Lamellar bdy, fetal lung, ld-i (h4), ld-ii (h3m), ld-iii (h2m2), ld-iv (hm3), ld-v (m4), legion pneumo, dna, amp prob, Legion pneumophila ag, if, Legionella antibody, Leishmania antibody, Leptospira antibody, leucine, leukocyte assessment, fecal, Leukocyte histamine release, lipase, Lipopro bld, electrophoretic, lipoprotein, Lipoprotein bld, hr fraction, lipoprotein pla2, lipoprotein(a), Lipoprotein, bld, by nmr, lipoprotein, blood, listeria antibody, Listeria monocytogenes ab, lithium, Long chain fatty acids, lsd,, lsd-25, lyme dis, dna, amp probe, lyme disease antibody, lyme disease antibody, Lymph choriomeningitis ab, Lymphocyte culture, mixed, Lymphocyte transformation, lymphocytes, Lymphocytotoxicity assay, Lyse cells for nucleic ext, lysergide, lysine, M.avium-intra, dna, dir prob, m.pneumon, dna, amp probe, M.pneumon, dna, dir probe, M.tuberculo, dna, amp probe, m.tuberculo, dna, dir probe, Macroscopic exam arthropod, Macroscopic exam parasite, magnesium, Malaria antibody, Manual cell count, each, Manual reticulocyte count, Mass spectrometry quant, mean cell volume, mean corpuscular hemoglobin, mean corpuscular hemoglobin per cell, measles antibody quant, measles viral load, meprobamate, metanephrines, methadone, methanol, methionine, methylmalonic acid (mma), Microbe suscept, macrobroth, Microbe suscept, mycobacteri, Microbe susceptible, diffuse, Microbe susceptible, disk, Microbe susceptible, enzyme, Microbe susceptible, mic, Microbe susceptible, mlc, Microscopic exam of urine, microsomal antibody, Molecular diagnostics, Molecular diagnostics, Molecular diagnostics, Molecular, rna stabilization, Molecule dot/slot/blot, Molecule gel electrophor, Molecule isolate, Molecule isolate nucleic, Molecule mutation identify, Molecule mutation identify, Molecule mutation identify, Molecule mutation scan, Molecule nucleic ampli 2 seq, Molecule nucleic ampli addon, Molecule nucleic ampli, each, Molecule nucleic transfer, monocytes, Mononuclear cell antigen, monosaccharides, mr-staph, dna, amp probe, Mucopolysaccharides, Mucopolysaccharides screen, mucor racemousus, mumps antibody, mumps antibody quant, mumps viral load, Muramidase, Mutation ident ola/sbce/aspe, Mycobacteria culture, Mycobacteria, dna, dir probe, Mycobacterium identification, mycobacterium tuberculosis antibody, Mycoplasma, mycoplasma antibody, myoglobin, N. gonorrhoeae assay w/optic, n.gonorrhoeae, dna, amp prob, n.gonorrhoeae, dna, dir prob, nalbuphine, naphthalene, Nasal smear for eosinophils, natriuretic peptide, Neisseria meningitidis, Neutralization test, viral, neutrophils, niacin (vitamin b3), Nitroblue tetrazolium dye, nk cells, total count, Nocardia antibody, norepinephrine, nortriptyline, ntx, nubain{r}, nuclear antigen antibody, Nucleic acid, high resolute, Nucleic acid, signal ampli, occult bld feces, 1-3 tests, occult blood, feces, Occult blood, other sources, Oligoclonal bands, oligosaccharides, opiates, Organic acids, total, quant, ornithine, orotic acid, osmolality, oxalate, P1CP, P1NP, pancreatic elastase, fecal, pappa, serum, parainfluenza virus 1 immunoelectrophoresis, Ova and parasites smears, antibody, igg, igm, parainfluenza virus 2 antibody, igg, igm, parainfluenza virus 3 antibody, igg, igm, parainfluenza, ag, if, parathormone,

FIG. 9 con't.

Particle agglutination test, parvovirus antibody, penicillium chrysogenum/notatum, pentaacarboxyporphyrin, pertussis ag, if, ph, blood, phencyclidine, phenobarbital. Phenotype, dna hiv w/clt add, Phenotype, dna hiv w/culture, Phenotype, infect agent drug, phenylalanine, phenytoin, total, pharmacodynamic assay, pharmacokinetic assay, phoma betae, phospholipid antibody, phosphorus, phosphorus, urine, Pinworm exam, pku (phenylalanine), blood, Placental lactogen, platelet antibodies, platelet associated antibodies, platelet neutralization, Pneumocystis carinii, ag, if, porphobilinogen, potassium, potassium, serum, potassium, urine, prealbumin, pregnancy, urine, pregnenolone, Procalcitonin (pct), progesterone, progesterone, proinsulin, prolactin, proline, propylene glycol, Protein analysis w/probe, protein c, antigen; clotting inhibitors or anticoagulants, Protein e-phoresis, serum, Protein e-phoresis/urine/csf, protein s, free; clotting inhibitors or anticoagulants, protein, serum, protein, urine, Protein, western blot test, prothrombin test, prothrombin time, Protozoa antibody nos, psa, complexed, psa, free, psa, total, pyridinoline, pyruvate, q fever antibody, Quantitative screen, metals, rabies antibody, igg (vaccine response), rbc antibody indentification, rbc antibody screen, RBC osmotic fragility, rbc pretreatment, serum, rbc protoporphyrin, rbc sed rate, automated, rbc sickle cell, red cell distribution width, renin, Reptilase test, resp syncytial ag, eia, respiratory syncytial ag, if, respiratory virus antibody, respiratory virus panel, Reticulated platelet assay, Retrograde ejaculation anal, rheumatoid factor test, rheumatoid factor, quant, rhizopus nigricans, rickettsia antibody, rohipnola®, roseola infantum, rotavirus ag, eia, rotavirus antibody, rsv w/optic, rubella antibody, rubella antibody quant, rubella viral load, rubeola antibody, Rubeola, ag, if, russell viper venom, diluted, salicylate, Salmonella antibody, Semen anal vol/count/mot, Semen anal, sperm detection, Semen anal, strict criteria, semen analysis w/count, semen analysis w/huhner, serine, serotonin, Serum immunoelectrophoresis, Sex chromatin identification, sex hormone globul, shiga-like toxin ag, eia, sialic acid, sialidase enzyme assay, sirolimus, Skin fungi culture, Small animal inoculation, Small animal inoculation, Smear, complex stain, Smear, fluorescent/acid stai, Smear, gram stain, Smear, special stain, Smear, wet mount, saline/ink, sodium, serum, sodium, urine, somatomedin, Special stains group 1, Special stains group 2, Specimen concentration, Specimen fat stain, Spectrophotometry, Sperm antibody test, Sperm evaluation test, sporothrix antibody, ssay, tumor, ca 19-9, stachybotrys chartarum, stadola®, staph a, dna, amp probe, Starch granules, feces, Stem cells, total count, Stool cultr, bacteria, each, strep a w/optic, strep a ag, eia, strep a, dna, amp probe, strep a, dna, dir probe, strep b assay w/optic, strep b, dna, amp probe, Streptokinase, antibody, streptozyme, sulfate, urine, Surgical path, gross, sweat sodium, synovial fluid mucin, syphilis non-trep qual, t cell, absolute count, t cell, absolute count/ratio, t cells, total count, t3 reverse, tacrolimus, taurine, tb test, cell immun measure, Test feces for trypsin, Test for chlorohydrocarbons, Test for porphobilinogen, Test for urine cystines, Test RBC protoporphyrin, testosterone, testosterone, total cortisol, total testosterone, toxic shock syndrome antibody, maid, toxoplasma antibody, toxoplasma antibody, igm, Transcutaneous carboxyhb, transferase (ast) (sgot), transferrin, TRAP5b, Treponema pallidum, Treponema pallidum, ag, if, trichinella antibody, trichomonas assay w/optic, trichomonas vagin, dir probe, trichophyton rubrum, triglycerides, triiodothyronine (t3), trinoxol, troponin, quant, tsi, Tumor immunohistochem/manual, tumor, ca 125, tumor, ca 15-3, typing, rbc antigens, blood, typing, rh phenotype, blood, tyrosine, tyrosine, urea nitrogen, Urea nitrogen semi-quant, Urea-N clearance test, urea-nitrogm, urine, uric acid, blood, uric acid, urine, Urinalysis, glass test, Urinalysis, volume measure, Urine bacteria culture, Urine culture/colony count, Urine screen for

FIG. 9 con't.

bacteria, urine urobilinogen, urobilinogen, urine. urobilinogen, urine, uroporphyrin, valine, vancomycin, varicella antibody quant, varicella viral load, Varicella zoster, ag, if, varicella-zoster antibody, vasopressin, vip, Viper venom prothrombin time, Virus inoculate tissue, add1, Virus inoculate, eggs/animal, Virus inoculation, shell via, Virus inoculation, tissue, vit d 1, 25-dihydroxy, vitamin a, vitamin b-1, vitamin b-12, vitamin b5(pantothenic acid), vitamin b-6, vitamin b7 (biotin ), vitamin d, 25 hydroxy, vitamin e, vitamin h, vitamin k, vma, urine, von willebrand factor, clotting factor viii, multimetric analysis, Water load test, wbc alkaline phosphatase, wbc antibody identification, west nile virus ab, igm, west nile virus antibody, Western blot test, xylenes, Xylose tolerance test, Yersinia antibody, zinc.

SYSTEMS AND METHODS FOR COLLECTING AND TRANSMITTING ASSAY RESULTS

CROSS-REFERENCE

This application is a continuation-in-part application of PCT Application No. PCT/US11/53189, filed Sep. 25, 2011 which is incorporated herein by reference in its entirety.

BACKGROUND OF THE INVENTION

Existing systems and methods for clinical testing suffer many drawbacks from the perspectives of patients, health care professionals, and taxpayers or insurance companies. Today, consumers can purchase certain specialized tests from various locations for consumer use. For example, a consumer can purchase a pregnancy test at a pharmacy and review the results. However, such results are to be viewed by the consumer, and are not to be relied on by the consumer's physician in forming a diagnosis or treatment plan.

Additionally, if a test result is to be conducted and to be relied on by a doctor, physical samples are transported to a laboratory where the tests on the samples are performed. For example, blood from a fingerstick or venous draw is typically collected from a subject at a hospital or physician's office. The blood sample is shipped to a Clinical Laboratory Improvement Amendments (CLIA) certified laboratory which performs the tests and analysis that is provided to the patient's doctor. Such techniques are cumbersome and cause significant delay in providing the result of a test ordered by a physician, especially because the physical specimens must be transported to a different site for analysis. Moreover, the sample collection sites often have limited hours which further causes inconvenience to patients.

Conventional techniques are also problematic for certain diagnoses. Some tests are time sensitive, and the results of which may take days or weeks to complete. In such a time, a disease can progress past the point of treatment. This impairs a medical professional's ability to provide quality care.

Traditional systems and methods also affect the integrity and quality of a clinical test due to degradation of a sample that often occurs while transporting such sample from the site of collection to the place where actual analysis of the sample is performed. For examples, analytes decay at a certain rate, and the time delay for analysis can result in loss of the sample integrity. Different laboratories also work with different qualities which can result in varying degrees of error. Each laboratory can have its own set of references that further introduce a wide range of variability in coefficients of variation. Additionally, preparation of samples by hand permit upfront human error to occur from various sample collection sites. These and other drawbacks inherent in the conventional setup make it difficult to perform longitudinal analysis with high quality.

Furthermore, the conventional techniques are typically not very cost effective. For example, delays in test results lead to delays in diagnoses and treatments that can have a deleterious effect on a patient's health. For example, a disease may progress further, resulting in the patient needing additional treatment. Payers, such as health insurance companies and taxpayers contributing to governmental health programs, end up paying more to treat problems that could have been averted with more accessible and faster clinical test results.

SUMMARY OF THE INVENTION

A need exists for improved systems and methods that allow higher quality of care, more rapid and accurate diagnosis and/or treatment. Specifically, there is a considerable need for sample collection, preparation and analysis. A further need exists for easily accessible sample collection sites, while permitting the analysis of data that can be relied on by a health care professional.

Systems and methods are further needed for earlier intervention and providing high quality of care with little variability and reduced human error to enable the performance of longitudinal analysis of data. Systems and methods disclosed herein meet this need and provide related advantages as well.

An aspect of the invention is directed a method of evaluating a biological sample collected from a subject, said method comprising: (a) receiving data transmitted from a device placed in or on the subject or at a retailer site, wherein the device is configured to process the biological sample by: (i) receiving the biological sample; (ii) preparing the biological sample for a subsequent qualitative and/or quantitative evaluation, to yield data necessary for the subsequent qualitative and/or quantitative evaluation of said biological sample; and (iii) transmitting electronically the data to an authorized analytical facility and/or an affiliate thereof for performance of said subsequent qualitative and/or quantitative evaluation; and (b) analyzing the data transmitted from the device, at the authorized analytical facility and/or the affiliate thereof, to provide said qualitative and/or quantitative evaluation of said biological sample.

In accordance with another aspect of the invention, a method of evaluating a biological sample collected from a subject may comprise: (a) receiving electronic data representative of an image of said biological sample and/or an image of a physical process or chemical reaction performed with said biological sample or a portion thereof, said data being transmitted from a device placed in or on the subject or at a designated sample collection site, wherein the device is configured to process the biological sample by: (i) receiving the biological sample; (ii) preparing the biological sample for a subsequent qualitative and/or quantitative evaluation, wherein said preparation yields the electronic data representative of the image of said biological sample and/or the image of the physical process or the chemical reaction; and (iii) transmitting the electronic data representative of the image to an authorized analytical facility and/or an affiliate thereof for performance of said subsequent qualitative and/or quantitative evaluation; wherein the processing generates the electronic data representative of the image necessary for the subsequent qualitative and/or quantitative evaluation of said biological sample, and (b) analyzing the electronic data representative of the image transmitted from the device, at the authorized analytical facility and/or the affiliate thereof, to provide said qualitative and/or quantitative evaluation of said biological sample.

A method of evaluating a plurality of types of biological samples collected from a subject may be provided in accordance with another aspect of the invention. The method may comprise: (a) receiving data transmitted from a device placed in or on the subject or at a designated sample collection site, wherein the device is configured to process the plurality of types of biological samples by: (i) receiving the plurality of types of biological samples; (ii) preparing the biological samples for a subsequent qualitative and/or quantitative evaluation, to yield data necessary for the subsequent qualitative and/or quantitative evaluation of said plurality of types of biological samples; and (iii) transmitting electronically the data to an authorized analytical facility and/or an affiliate thereof for performance of said subsequent qualitative and/or quantitative evaluation; and (b) analyzing the data transmitted from the device, at the authorized analytical facility and/or the affiliate thereof, to provide said qualitative and/or quantitative evaluation of said plurality of types of biological samples.

An additional aspect of the invention may be directed to a method of evaluating a biological sample collected from a subject at a designated site, said method comprising: (a) collecting and processing the biological sample at said designated site wherein the sample is collected by a device that is configured to (i) receive the biological sample; (ii) prepare the biological sample for a subsequent qualitative and/or quantitative evaluation, to yield data necessary for the subsequent qualitative and/or quantitative evaluation of said biological sample; and (iii) transmit the data to a health care provider of an authorized analytical facility and/or an affiliate thereof for performance of said subsequent qualitative and/or quantitative evaluation; and (b) transmitting the data to the authorized analytical facility and/or an affiliate thereof; and (c) analyzing the data transmitted from the device, at the authorized analytical facility and/or the affiliate thereof, to provide said qualitative and/or quantitative evaluation of said biological sample.

Also, aspects of the invention may be directed to a method of evaluating a biological sample collected from a subject, said method comprising: (a) receiving data transmitted from a device placed in or on the subject or at a designated sample collection site, wherein the device is configured to process the biological sample by (i) receiving the biological sample; (ii) preparing the biological sample for a subsequent qualitative and/or quantitative evaluation, to yield data necessary for the subsequent qualitative and/or quantitative evaluation of said biological sample; and (iii) transmitting the data to a health care provider of an authorized analytical facility and/or an affiliate thereof for performance of said subsequent qualitative and/or quantitative; and (b) analyzing the data transmitted from the device, at the authorized analytical facility and/or the affiliate thereof, to provide said qualitative and/or quantitative evaluation of said biological sample; and (c) verifying (x) whether the subject received an order from a health care professional to undertake said subsequent qualitative and/or quantitative evaluation of said biological sample, or (y) whether the order for the subsequent qualitative and/or quantitative evaluation of said biological sample is within the policy restrictions of a payer or a prescribing physician for said subsequent qualitative and/or quantitative evaluation, and/or (z) whether the subject is covered by health insurance for said qualitative and/or quantitative evaluation of the biological sample; wherein said verifying step is performed prior to, concurrently with, or after steps (a) and/or (b).

A method of performing a pathological study of a biological sample collected from a subject may be provided in accordance with another aspect of the invention. The method may comprise: (a) receiving electronic data representative of an image of said biological sample, a physical process and/or chemical reaction performed with said biological sample or a portion thereof, wherein the data is received from a device placed in or on the subject or at a designated sample collection site, wherein the device is configured to: (i) receive said biological sample; (ii) prepare the collected biological sample for a subsequent qualitative and/or quantitative evaluation, wherein said preparation yields the electronic data representative of the image of said biological sample and/or the chemical reaction; and (iii) transmit the electronic data representative of the image to a pathologist of an authorized analytical facility and/or its affiliate thereof; (b) analyzing the electronic data by the pathologist of the authorized analytical facility and/or the affiliate thereof, to provide said qualitative and/or quantitative evaluation.

Additional aspects of the invention may be directed to a method of performing a pathological study of a biological sample collected from a subject, said method comprising: (a) receiving electronic data representative of an image of said biological sample and/or a chemical reaction performed with at least one component from said biological sample from a device placed in or on the subject or at a designated sample collection site, wherein the device is configured to: (i) receive said biological sample; (ii) prepare the collected biological sample for a subsequent qualitative and/or quantitative evaluation, wherein said preparation yields the electronic data representative of the image of said biological sample and/or the chemical reaction; and (iii) transmit the electronic data representative of the image to a pathologist of an authorized analytical facility; (b) analyzing the electronic data by the pathologist of the authorized analytical facility to provide said subsequent qualitative and/or quantitative evaluation.

Furthermore, aspects of the invention may be directed to a method of evaluating a biological sample collected from a subject, said method comprising: (a) receiving data transmitted from a device placed in or on the subject or at a designated sample collection site, wherein the device is configured to process the biological sample by: (i) receiving the biological sample; (ii) preparing the biological sample for a subsequent qualitative and/or quantitative evaluation, to yield data necessary for the subsequent qualitative and/or quantitative evaluation of said biological sample; and (iii) transmitting electronically the data to an authorized analytical facility and/or an affiliate thereof; (b) analyzing the data transmitted from the device, at the authorized analytical facility and/or the affiliate thereof, to provide said subsequent qualitative and/or quantitative evaluation of said biological sample.

Additional aspects of the invention may be directed to a method of evaluating a biological sample collected from a subject, said method comprising: (a) receiving data transmitted from a device placed in or on the subject or at a retailer site, wherein the device is configured to process the biological sample by: (i) receiving the biological sample; (ii) preparing the biological sample for a subsequent qualitative and/or quantitative evaluation, to yield data necessary for the subsequent qualitative and/or quantitative evaluation of said biological sample; and (iii) transmitting electronically the data to an authorized analytical facility and/or an affiliate thereof; and (b) analyzing the data transmitted from the device, at the authorized analytical facility and/or the affiliate thereof, to provide said subsequent qualitative and/or quantitative evaluation of said biological sample.

In accordance with additional aspects of the invention, a method of evaluating a biological sample may comprise: (a) processing, with the aid of a device, a biological sample collected from a subject, wherein the device is placed in or on the subject or at a designated sample collection site, wherein the processing generates data necessary for a subsequent qualitative and/or quantitative evaluation of said biological sample, and wherein the device is configured to (i) receive the biological sample; (ii) prepare the biological sample for the subsequent qualitative and/or quantitative evaluation; and (iii) transmit the data to an authorized analytical facility and/or an affiliate thereof; (b) transmitting the data from the device, at the authorized analytical facility and/or the affiliate thereof, to provide said subsequent qualitative and/or quantitative evaluation of said biological sample; and (c) verifying whether the subject has healthcare coverage, wherein said verifying step is performed prior to, concurrently with, or after steps (a) and/or (b).

A method of evaluating a biological sample collected from a subject may provided in accordance with another aspect of the invention. The method may comprise: (a) receiving electronic data representative of an image of said biological sample and/or chemical reaction performed with at least one component from said biological sample transmitted from a device placed in or on the subject or at a designated sample collection site, wherein the device is configured to process the biological sample by: (i) receiving the biological sample; (ii) preparing the biological sample for a subsequent qualitative and/or quantitative evaluation, wherein said preparation yields the electronic data representative of the image of said biological sample and/or the chemical reaction; and (iii) transmitting the electronic data representative of the image to an authorized analytical facility and/or an affiliate thereof; wherein the processing generates the electronic data representative of the image necessary for the subsequent qualitative and/or quantitative evaluation of said biological sample, and (b) analyzing the electronic data representative of the image transmitted from the device, at the authorized analytical facility and/or the affiliate thereof, to provide said subsequent qualitative and/or quantitative evaluation of said biological sample.

Additional aspects may be directed to a method of evaluating a biological sample collected from a subject, said method comprising: (a) receiving data transmitted from a device placed in or on the subject or at a designated sample collection site, wherein the device is configured to process the biological sample by (i) receiving the biological sample; (ii) preparing the biological sample for a subsequent qualitative and/or quantitative evaluation, to yield data necessary for the subsequent qualitative and/or quantitative evaluation of said biological sample; and (iii) transmitting the data to a health care provider of an authorized analytical facility and/or an affiliate thereof; and (b) analyzing the data transmitted from the device, at the authorized analytical facility and/or the affiliate thereof, to provide said subsequent qualitative and/or quantitative evaluation of said biological sample (c) verifying whether the subject received an order from a health care professional to undertake said subsequent qualitative and/or quantitative evaluation of said biological sample, wherein said verifying step is performed prior to, concurrently with, or after steps (a) and/or (b).

Also, aspects of the invention may be directed to a method of evaluating a biological sample, said method comprising: (a) processing, with aid of a device, a biological sample collected from a subject having received an order for undertaking a subsequent qualitative and/or quantitative evaluation of the biological sample, wherein the device is placed in or on the subject or at a designated sample collection site, wherein the processing generates data necessary for the subsequent qualitative and/or quantitative evaluation of said biological sample, and wherein the device is configured to (i) receive the biological sample; (ii) prepare the biological sample for a subsequent qualitative and/or quantitative evaluation; and (iii) transmit the data to an authorized analytical facility and/or an affiliate thereof; (b) transmitting the data from the device, for analysis at the authorized analytical facility and/or the affiliate thereof, to provide said subsequent qualitative and/or quantitative evaluation of said biological sample; and (c) verifying whether the order for the subsequent qualitative and/or quantitative evaluation of said biological sample is within the policy restrictions of a payer or a prescribing physician for said subsequent qualitative and/or quantitative evaluation, wherein said verifying step is performed prior to, concurrently with, or after steps (a) and/or (b).

Another aspect of the invention provides a method of evaluating a biological sample collected from a subject, said method comprising: (a) receiving data transmitted from a device placed in or on the subject or at a designated sample collection site, wherein the device is configured to process the biological sample by: (i) receiving the biological sample; (ii) preparing the biological sample for a subsequent qualitative and/or quantitative evaluation, to yield information necessary for the subsequent qualitative and/or quantitative evaluation of said biological sample; and (iii) transmitting electronically the data to an authorized analytical facility and/or an affiliate thereof; and (b) analyzing the data transmitted from the device, at the authorized analytical facility and/or the affiliate thereof, to provide said subsequent qualitative and/or quantitative evaluation of said biological sample, wherein the subsequent qualitative and/or quantitative evaluation of said biological sample yields a determination of the presence or concentration of an analyte selected from one or more of the following: sodium, potassium, chloride, $TCO_2$, anion Gap, ionized calcium, glucose, urea nitrogen, creatinine, lactate, hematocrit, hemoglobin, pH, $PCO_2$, $PO_2$, $HCO_3$, base excess, $sO_2$, ACT Kaolin, ACT Celite, PT/INR, cTnI, CK-MB, or BNP.

Moreover, aspects of the invention may be directed to a method of evaluating a plurality of types of biological samples collected from a subject, said method comprising: (a) receiving data transmitted from a device placed in or on the subject or at a designated sample collection site, wherein the device is configured to process the plurality of types of biological samples by: (i) receiving the plurality of types of biological samples; (ii) preparing the biological samples for a subsequent qualitative and/or quantitative evaluation, to yield data necessary for the subsequent qualitative and/or quantitative evaluation of said plurality of types of biological samples; and (iii) transmitting electronically the data to an authorized analytical facility and/or an affiliate thereof; and (b) analyzing the data transmitted from the device, at the authorized analytical facility and/or the affiliate thereof, to provide said subsequent qualitative and/or quantitative evaluation of said plurality of types of biological samples.

In practicing any of the methods above or elsewhere herein, alone or in combination, the qualitative and/or quantitative evaluation of said biological sample may be effected without transporting said sample from the site where the sample is collected to an authorized analytical facility and/or an affiliate thereof.

The methods above or elsewhere herein, alone or in combination, may include methods wherein the biological sample is selected from the group consisting of blood, serum, plasma, nasal swab or nasopharyngeal wash, saliva, urine, tears, gastric fluid, spinal fluid, stool, mucus, sweat, earwax, oil, glandular secretion, cerebral spinal fluid, tissue, semen, and vaginal fluid, throat swab, breath, hair, finger nails, skin, biopsy, placental fluid, amniotic fluid, cord blood, emphatic fluids, cavity fluids, sputum, mucus, puss, micropiota, meconium, breast milk and/or other excretions.

Any of the methods above or elsewhere herein, alone or in combination, may be practiced wherein the biological sample has a volume of 250 microliters (uL) or less.

In practicing the methods described above or elsewhere herein, alone or in combination, the methods may further comprise the step of providing oversight by a health care professional of the authorized analytical facility and/or by a software program.

In some embodiments, the methods above or elsewhere herein, alone or in combination may further comprising the step of verifying insurance eligibility of said subject prior to, concurrent with or subsequent to said analysis.

The methods above or elsewhere herein, alone or in combination, may further comprise generating a report that comprises the analysis for said subject based on said qualitative and/or quantitative evaluation.

In practicing the methods above or elsewhere herein, alone or in combination, the analysis may determine presence or concentration of analyte present in the biological sample.

The methods provided above or elsewhere herein, alone or in combination, may include an analyte selected from the group consisting of protein, nucleic acid, drug, drug metabolite, gas, ions, particles, small molecules and metabolites thereof, elements, toxins, lipids, carbohydrates, prions, formed elements, and combination thereof.

A designated sample collection site may be a retailer location or a physician's office, in accordance with the practice of any of the methods described above or elsewhere herein, alone or in combination. In some embodiments when practicing any of the methods described above or elsewhere herein, alone or in combination, the designated sample collection site may be the subject's home. A designated sample collection site may be an employer site, provider office, or hospital in methods above or elsewhere herein, alone or in combination.

In practicing the methods above or elsewhere herein, alone or in combination, a further step may be provided of aggregating the data to a yield a longitudinal analysis over time.

The methods described above or elsewhere herein, alone or in combination may utilize a biological sample that is collected from a fingerstick.

In practicing the methods above or elsewhere herein, alone or in combination, in some instances, the processing of the biological sample does not involve a display of the presence or concentration level of one or more analyte selected for determination of cardiac markers, chemistries, blood gases, electrolytes, lactate, hemoglobin, coagulation or hematology.

Methods described above or elsewhere herein, alone or in combination, may include a device that is configured to verify whether the subject is covered by health insurance for said qualitative and/or quantitative evaluation of the biological sample.

The device may be configured to verify whether the subject received an order from a health care professional to undertake said qualitative and/or quantitative evaluation of the biological sample, in the practice of any of the methods above or elsewhere herein, alone or in combination.

In some embodiments, the methods above or elsewhere herein, alone or in combination, may include the device that is configured to verify the subject's identity prior to receiving the biological sample, transmitting electronically the data, or analyzing the transmitted data. In some embodiments, the verification of the subject's identity may comprise receiving a genetic signature of the subject. In some of the methods described above or elsewhere herein, alone or in combination, the genetic signature may be obtained by nucleic acid amplification of a biological sample from the subject. The verification of the subject's identity may comprise one or more biometric measurement of the subject, in the practice of the methods described above or elsewhere herein, alone or in combination. The verification of the subject's identity may be performed by an authorized technician, in some embodiments of the methods described above or elsewhere herein, alone or in combination.

In practicing the methods above or elsewhere herein, alone or in combination, the identity of the authorized technician may be verified prior to receiving the biological sample, transmitting electronically the data, or analyzing the transmitted data.

The device may be configured to receive one or more cartridge configured for the qualitative and/or quantitative evaluation ordered by a health care professional, in the practice of one or more of the methods above or elsewhere herein, alone or in combination.

In some embodiments, one or more of the methods above or elsewhere herein, alone or in combination, may provide cartridge that has one or more identifier that is readable by the device.

The methods above or elsewhere herein, alone or in combination, may further comprise receiving the identifier information from the device.

The performance of methods above or elsewhere herein, alone or in combination may further comprise the step of providing one or more protocol to said device based on the identifier information received, wherein said protocol effects the preparation of the biological sample.

In practicing methods above or elsewhere herein, alone or in combination, the device may be contained within a housing.

Methods above or elsewhere herein, alone or in combination, may comprise a qualitative and/or quantitative evaluation that involves a determination of clinical relevance of the biological sample or lack thereof.

The designated sample collection site may be a retailer location in the practice of methods above or elsewhere herein, alone or in combination. In some embodiments of the invention, including methods above or elsewhere herein, alone or in combination, the designated sample collection site is a chain store, pharmacy, supermarket, or department store. The designated sample collection site may be the subject's home in methods above or elsewhere herein, alone or in combination.

The performance of methods above or elsewhere herein, alone or in combination may comprise data that includes electronic bits representative of the sample. The data may be aggregated and may be useful for longitudinal analysis over time to facilitate diagnosis, treatment, and/or disease prevention in the methods above or elsewhere herein, alone or in combination.

The biological sample in the methods above or elsewhere herein, alone or in combination, may have a volume of 250 microliters ("uL") or less. In some embodiments, the biological sample may be blood, serum, saliva, urine, tears, gastric and/or digestive fluid, stool, mucus, sweat, earwax, oil, glandular secretion, semen, or vaginal fluid in the methods above or elsewhere herein, alone or in combination. In the practice of methods above or elsewhere herein, alone or in combination, the biological sample may be a tissue sample. The methods above or elsewhere herein, alone or in combination, may include a biological sample that is collected from a fingerstick.

Methods above or elsewhere herein, alone or in combination, may further comprise generating a report based on said qualitative and/or quantitative evaluation of said biological sample. In some embodiments, the performance of one or more methods above or elsewhere herein, alone or in combination, may further comprise transmitting said report to an additional health care professional. The additional health care professional may have provided the order to the subject to undertake said qualitative and/or quantitative evaluation of said biological sample in methods above or elsewhere herein, alone or in combination. In some instances, the additional health care professional is at a different location from the authorized analytical facility in the performance of methods above or elsewhere herein, alone or in combination.

In the practice of methods above or elsewhere herein, alone or in combination, processing may include adding one or more reagent or fixatives.

In some embodiments, the data is transmitted to a cloud computing based infrastructure in methods above or elsewhere herein, alone or in combination.

Methods above or elsewhere herein, alone or in combination, may comprise an image wherein the image is a video image. The data may comprise electronic data representative of an image and/or audio signal in the practice of methods above or elsewhere herein, alone or in combination.

In the practice of methods above or elsewhere herein, alone or in combination, a payer may receive an electronic bill from the designated sample collection site.

A health care professional of the authorized analytical facility may receive an electronic payment from the designated sample collection site in the practice of one methods above or elsewhere herein, alone or in combination.

The device utilized in methods above or elsewhere herein, alone or in combination, may be configured to additionally prepare the biological sample based on at least one of: prior preparation of the biological sample, analysis of the data at the authorized analytical facility and/or the affiliate thereof.

In the performance of methods above or elsewhere herein, alone or in combination the authorized analytical facility may be separate from the sample collection site.

A preparation of a biological sample may be automated when practicing one or more of the methods above or elsewhere herein, alone or in combination.

Methods above or elsewhere herein, alone or in combination may further comprise overseeing said subsequent qualitative and/or quantitative evaluation. The overseeing step may be performed by a health care professional of the authorized analytical facility and/or by a software program in methods above or elsewhere herein, alone or in combination. In some embodiments, transmitting the data from the device may also be for oversight of said subsequent qualitative and/or quantitative evaluation in some methods above or elsewhere herein, alone or in combination. Methods above or elsewhere herein, alone or in combination, may be provided wherein the oversight is provided by the health care professional of the authorized analytical facility and/or by a software program.

The data utilized in methods above or elsewhere herein, alone or in combination, may be representative of the biological sample and/or any portion thereof. In some embodiments, the data may be representative of a preparation of the collected biological sample. The data may comprise information of one or more conditions under which a preparation of the collected biological sample occurs. The one or more conditions may comprise one or more characteristics listed from the group: amount of the biological sample, concentration of the biological sample, quality of the biological sample, temperature, or humidity.

In some of the methods above or elsewhere herein, alone or in combination, the data is representative of a reaction run by the device. The data may comprise information of the rate of the reaction. In some instances, the data may comprise information about a control reaction and a chemical reaction involving the biological sample.

In practicing methods above or elsewhere herein, alone or in combination, such methods may further comprise (c) overseeing one or more steps of (i)-(iii) to improve quality of said evaluation, wherein said overseeing is performed prior to, concurrently with, or subsequent to any of steps (i)-(iii).

Methods above or elsewhere herein, alone or in combination may further comprise (iv) overseeing one or more steps of (i)-(iii) to improve quality of said evaluation, wherein said overseeing is performed prior to, concurrently with, or subsequent to any of steps (i)-(iii).

In some embodiments, methods above or elsewhere herein, alone or in combination may be provided wherein the overseeing is of data representative of the biological sample and/or any portion thereof. The overseeing may be of data representative of the biological sample and/or any portion thereof. The overseeing may be of data representative of a preparation of the collected biological sample. In some instances, the overseeing is of data representative of a preparation of the collected biological sample. The overseeing may be of information of one or more conditions under which a preparation of the collected biological sample occurs. In methods above or elsewhere herein, alone or in combination, overseeing may be of information of one or more conditions under which a preparation of the collected biological sample occurs. The overseeing may be of data that is representative of a chemical reaction run by the device. In some embodiments, overseeing may be of data is representative of a chemical reaction run by the device.

In the performance of methods above or elsewhere herein, alone or in combination, the healthcare coverage may be provided by a health insurance company Methods above or elsewhere herein, alone or in combination may comprise the preparing step that involves one or more of the types of chemical reactions selected from immunoassay, nucleic acid assay, receptor-based assay, cytometric assay, colorimetric assay, enzymatic assay, electrophoretic assay, electrochemical assay, spectroscopic assay, chromatographic assay, microscopic assay, topographic assay, calorimetric assay, turbidmetric assay, agglutination assay, radioisotope assay, viscometric assay, coagulation assay, clotting time assay, protein synthesis assay, histological assay, culture assay, or osmolarity assay.

The device may be further configured to process the biological sample by transmitting electronically data representative of one or more biometric measurement of the subject, in accordance with methods above or elsewhere herein, alone or in combination.

In some methods above or elsewhere herein, alone or in combination, the processing of the biological sample does not encompass an analysis of the presence or concentration level of three or more analytes belonging to categories of cardiac marker, blood gas, electrolyte, lactate, hemoglobin, and coagulation factors.

In some embodiments, the processing of the biological sample does not encompass an analysis of the presence or concentration level of three or more analytes belonging to the following: sodium, potassium, chloride, $TCO_2$, anion Gap, ionized calcium, glucose, urea nitrogen, creatinine, lactate, hematocrit, hemoglobin, pH, $PCO_2$, $PO_2$, $HCO_3$, base excess, $sO_2$, ACT Kaolin, ACT Celite, PT/INR, cTnI, CK-MB, and BNP, in the practice of methods above or elsewhere herein, alone or in combination.

In the practice of some methods above or elsewhere herein, alone or in combination, the sample collection site may be one or more of the following: a hospital, clinic, military site, or subject's home.

In some embodiments, data may be displayed on the touch screen after analysis, for methods above or elsewhere herein, alone or in combination.

Methods above or elsewhere herein may include imaging data of body parts that may be done for analysis simultaneously with biochemical analyses.

An aspect of the invention may be directed to a system of evaluating a biological sample collected from a subject, said system comprising: (a) a communication unit configured to receive data from a device placed in or on the subject or at a designated sample collection site, wherein the device is configured to process the biological sample, thereby generating data necessary for a subsequent qualitative and/or quantitative evaluation of said biological sample, and wherein the device comprises (i) a sample collection unit configured to receive the biological sample; (ii) a sample preparation unit configured to prepare the biological sample for the subsequent qualitative and/or quantitative evaluation; and (iii) transmission unit configured to transmit the data to an authorized analytical facility and/or an affiliate thereof; and (b) a processor that processes said data for the qualitative and/or quantitative evaluation of said biological sample at the authorized analytical facility and/or the affiliate thereof, and wherein said processor communicates with a record database comprising one or more medical records and/or insurance information of the subject.

Additional aspects of the invention may be directed to a system of evaluating a biological sample collected from a subject, said system comprising: (a) a communication unit configured to receive data from a device placed in or on the subject or at a designated sample collection site, wherein the device is configured to process the biological sample, thereby generating data necessary for a subsequent qualitative and/or quantitative evaluation of said biological sample, and wherein the device comprises (i) a sample collection unit configured to receive the biological sample; (ii) a sample preparation unit configured to prepare the biological sample for the subsequent qualitative and/or quantitative evaluation; and (iii) transmission unit configured to transmit the data to an authorized analytical facility and/or an affiliate thereof; (b) a processor that processes said data for the subsequent qualitative and/or quantitative evaluation of said biological sample at the authorized analytical facility and/or the affiliate thereof, and wherein said processor communicates with a record database comprising one or more medical records for the subject, and/or wherein the processor communicates with a payer database comprising insurance information for the subject.

In accordance with another aspect of the invention, a system of evaluating a blood sample collected from a subject may be provided. The system may comprise: (a) a communication unit configured to receive data from a device placed in or on the subject or at a designated sample collection site, wherein the device is configured to process the blood sample, thereby generating data necessary for a subsequent qualitative and/or quantitative evaluation of said blood sample, and wherein the device comprises (i) a sample collection unit configured to receive the blood sample; (ii) a sample preparation unit configured to prepare the biological sample for the subsequent qualitative and/or quantitative evaluation, wherein the sample preparation unit permits at least one reagent to be added to the blood sample; and (iii) transmission unit configured to transmit the data to an authorized analytical facility and/or an affiliate thereof; and (b) a processor that processes said data for the subsequent qualitative and/or quantitative evaluation of said blood sample at the authorized analytical facility and/or the affiliate thereof, and wherein said processor accesses a record database comprising one or more medical records for the subject, and/or wherein the processor accesses a payer database comprising insurance information for the subject.

A system for rapid evaluation of a biological sample collected from a subject to aid in diagnosis, treatment, or prevention of a disease may be provided in accordance with an additional aspect of the invention. The system may comprise: a communication unit for receiving from a device electronic data representative of an image of said biological sample and/or a chemical reaction performed with at least one component from said biological sample; said device being placed in or on the subject or at a designated sample collection site, wherein said device is for processing the biological sample thereby generating the electronic data representative of the image of said biological sample necessary for a subsequent qualitative and/or quantitative evaluation of said biological sample, and wherein the device comprises, within a housing, (i) a sample collection unit for receiving the biological sample; (ii) a sample preparation unit for preparing the biological sample for the subsequent qualitative and/or quantitative evaluation, wherein the preparation of the biological sample is automated; (iii) an imaging unit for recording an image of the biological sample and/or a chemical reaction performed with at least one component from said biological sample; and (iv) a transmission unit for transmitting the electronic data representative of the image and/or the chemical reaction; and a processor that processes said electronic data representative of the image for subsequent qualitative and/or quantitative evaluation of said biological sample.

In practicing the systems above or elsewhere herein, alone or in combination, the process may be configured to communicate with a payer database comprising the insurance information for the subject.

The systems described above or elsewhere herein, alone or in combination may include a device that is configured to receive information relating to said qualitative and/or quantitative evaluation and optionally display said information on said device.

The device may comprises a processing unit configured to verify whether the subject is covered by health insurance for said qualitative and/or quantitative evaluation of the biological sample in the practice of systems above or elsewhere herein, alone or in combination.

In some embodiments, systems above or elsewhere herein, alone or in combination may comprise a device that is configured to verify whether the subject received an order from a health care professional to undertake said qualitative and/or quantitative evaluation of the biological sample.

The processor provided in systems above or elsewhere herein, alone or in combination, may access the records database prior to providing said qualitative and/or quantitative evaluation. Optionally, the processor accesses the payer database prior to providing said qualitative and/or quantitative evaluation in systems above or elsewhere herein, alone or in combination.

Prior to providing said qualitative and/or quantitative evaluation, said systems above or elsewhere herein, alone or in combination, may determine which records database to access.

The device may be configured to receive one or more cartridge configured for the qualitative and/or quantitative evaluation ordered by a health care professional, in the practice of systems above or elsewhere herein, alone or in combination.

In some embodiments, the device is contained within a housing in systems above or elsewhere herein, alone or in combination.

In systems above or elsewhere herein, alone or in combination, the qualitative and/or quantitative evaluation may involve a determination of clinical relevance of the biological sample or lack thereof.

The designated sample collection site may be a chain store, pharmacy, supermarket, or department store in systems above or elsewhere herein, alone or in combination. In some embodiments, the designated sample collection site is the subject's home.

The systems above or elsewhere herein, alone or in combination, may comprise a biological sample that has a volume of 250 uL or less. The biological sample may be blood, serum, saliva, urine, tears, gastric and/or digestive fluid, stool, mucus, sweat, earwax, oil, glandular secretion, semen, or vaginal fluid. In some instances, the biological sample may be a tissue sample.

In some systems above or elsewhere herein, alone or in combination, the biological sample may be collected from a fingerstick.

In some embodiments, systems above or elsewhere herein may utilize a designated sample collection site that may be a retailer. A designated sample collection site may be an employer site, provider office, or hospital in systems above or elsewhere herein, alone or in combination.

An authorized analytical facility, in some systems above or elsewhere herein, alone or in combination, may be separate from the sample collection site.

A user interface may be accessible by a health care professional for said subsequent qualitative and/or quantitative evaluation and/or oversight of said subsequent qualitative and/or quantitative evaluation in systems above or elsewhere herein, alone or in combination.

In systems above or elsewhere herein, alone or in combination, a processor may further provide oversight of said subsequent qualitative and/or quantitative evaluation.

A sample preparation unit may comprise (i) a pipette, and optionally (ii) one or more of the following: centrifuge, magnetic separator, filter, vessels, containers, assay units, reagent units, heater, thermal controller, cytometer, electromagnetic source, temperature sensor, motion sensor, or sensor for electrical properties, in systems above or elsewhere herein, alone or in combination.

In some embodiments, systems above or elsewhere herein, alone or in combination may comprise an image. The image may be static. In some embodiments, the image may be a video image. Systems above or elsewhere herein, alone or in combination may include the transmission unit that is configured to transmit the electronic data representative of the image wirelessly.

In systems above or elsewhere herein, alone or in combination, data may comprise electronic data representative of the image and an audio signal.

A device in systems above or elsewhere herein, alone or in combination, may be configured to receive one or more cartridge configured for the qualitative and/or quantitative evaluation. In some embodiments, the cartridge may have one or more identifier that is readable by the device.

In some systems above or elsewhere herein, alone or in combination, at least one component may be a biological analyte made of carbohydrate, lipid, protein or a combination thereof.

In utilizing the systems above or elsewhere herein, alone or in combination, a chemical reaction may be performed without the biological sample.

In some embodiments, data may be displayed on the touch screen after analysis, for systems above or elsewhere herein, alone or in combination.

Systems above or elsewhere herein may include imaging data of body parts that may be done for analysis simultaneously with biochemical analyses.

Some aspects of the invention are directed to a method of performing a pathological study of a biological sample collected from a subject, said method comprising (a) receiving electronic data representative of an image of said biological sample and/or a chemical reaction performed with at least one component of the biological sample from a device placed in or on the subject or at a designated sample collection site, wherein the device is configured to: (i) receive said biological sample; (ii) prepare the collected biological sample for a subsequent qualitative and/or quantitative evaluation, wherein said preparation yields the electronic data representative of the image of said biological sample and/or chemical reaction; and (iii) transmit the electronic data representative of the image to a pathologist of an authorized analytical facility; and (b) analyzing the electronic data by the pathologist of the authorized analytical facility to provide said subsequent qualitative and/or quantitative evaluation.

An aspect of the invention is directed to a method of evaluating a biological sample collected from a subject. The method comprises (a) receiving data transmitted from a device placed in or on the subject or at a designated sample collection site, wherein the device is configured to process the biological sample by: (i) receiving the biological sample; (ii) preparing the biological sample for a subsequent qualitative and/or quantitative evaluation, to yield data necessary for the subsequent qualitative and/or quantitative evaluation of said biological sample; and (iii) transmitting electronically the data to an authorized analytical facility and/or an affiliate thereof; and (b) analyzing the data transmitted from the device, at the authorized analytical facility and/or the affiliate thereof, to provide said subsequent qualitative and/or quantitative evaluation of said biological sample. This may be in contrast to conventional devices which may only transmit results of an analysis, not data for subsequent qualitative and/or quantitative evaluation of a sample. Such conventional devices that only transmit results may not be relied upon by one or more health care professional in diagnosing, treating and/or preventing a disease for subject.

In some embodiments, the processing of the biological sample does not encompass an analysis of the presence or concentration level of three or more analytes belonging to categories of cardiac marker, blood gas, electrolyte, lactate, hemoglobin, and coagulation factors. In some instances, the processing of the biological sample does not encompass an analysis of the presence or concentration level of three or more analytes belonging to the following: sodium, potassium, chloride, $TCO_2$, anion Gap, ionized calcium, glucose, urea nitrogen, creatinine, lactate, hematocrit, hemoglobin, pH, $PCO_2$, $PO_2$, $HCO_3$, base excess, $sO_2$, ACT Kaolin, ACT Celite, PT/INR, cTnI, CK-MB, and BNP.

A method of evaluating a biological sample collected from a subject is provided in accordance with another aspect of the invention. The method comprises (a) receiving data transmitted from a device placed in or on the subject or at a retailer site, wherein the device is configured to process the biological sample by: (i) receiving the biological sample; (ii) preparing the biological sample for a subsequent qualitative and/or quantitative evaluation, to yield data necessary for the subsequent qualitative and/or quantitative evaluation of said biological sample; and (iii) transmitting electronically the data to an authorized analytical facility and/or an affiliate thereof; and (b) analyzing the data transmitted from the device, at the authorized analytical facility and/or the affiliate thereof, to provide said subsequent qualitative and/or quantitative evaluation of said biological sample.

An additional aspect of the invention is a method of evaluating a biological sample, said method comprising: (a) processing, with the aid of a device, a biological sample collected from a subject, wherein the device is placed in or on the subject or at a designated sample collection site, wherein the processing generates data necessary for a subsequent qualitative and/or quantitative evaluation of said biological sample, and wherein the device is configured to (i) receive the biological sample; (ii) prepare the biological sample for the subsequent qualitative and/or quantitative evaluation; and (iii) transmit the data to an authorized analytical facility and/or an affiliate thereof; (b) transmitting the data from the device, at the authorized analytical facility and/or the affiliate thereof, to provide said subsequent qualitative and/or quantitative evaluation of said biological sample; and (c) verifying whether the subject has healthcare coverage, wherein said verifying step is performed prior to, concurrently with, or after steps (a) and/or (b).

Another aspect of the invention is a method of evaluating a biological sample collected from a subject, said method comprising (a) receiving electronic data representative of an image of said biological sample and/or chemical reaction performed on a device, wherein the electronic data is transmitted from a device placed in or on the subject or at a designated sample collection site, wherein the device is configured to process the biological sample by: (i) receiving the biological sample; (ii) preparing the biological sample for a subsequent qualitative and/or quantitative evaluation, wherein said preparation yields the electronic data representative of the image of said biological sample and/or the chemical reaction; and (iii) transmitting the electronic data representative of the image to an authorized analytical facility and/or an affiliate thereof; wherein the processing generates the electronic data representative of the image necessary for the subsequent qualitative and/or quantitative evaluation of said biological sample; and (b) analyzing the electronic data representative of the image transmitted from the device, at the authorized analytical facility and/or the affiliate thereof, to provide said subsequent qualitative and/or quantitative evaluation of said biological sample.

A system of evaluating a biological sample collected from a subject is provided in accordance with yet another aspect of the invention. The system comprises (a) a communication unit configured to receive data from a device placed in or on the subject or at a designated sample collection site, wherein the device is configured to process the biological sample, thereby generating data necessary for a subsequent qualitative and/or quantitative evaluation of said biological sample, and wherein the device comprises (i) a sample collection unit configured to receive the biological sample; (ii) a sample preparation unit configured to prepare the biological sample for the subsequent qualitative and/or quantitative evaluation; and (iii) transmission unit configured to transmit the data to an authorized analytical facility and/or an affiliate thereof; (b) a processor that processes said data for the subsequent qualitative and/or quantitative evaluation of said biological sample at the authorized analytical facility and/or the affiliate thereof, and wherein said processor communicates with a record database comprising one or more medical records for the subject, and/or wherein the processor communicates with a payer database comprising insurance information for the subject.

Furthermore, a method of evaluating a biological sample collected from a subject is provided. The method comprises (a) receiving data transmitted from a device placed in or on the subject or at a designated sample collection site, wherein the device is configured to process the biological sample by (i) receiving the biological sample; (ii) preparing the biological sample for a subsequent qualitative and/or quantitative evaluation, to yield data necessary for the subsequent qualitative and/or quantitative evaluation of said biological sample; and (iii) transmitting the data to a health care provider of an authorized analytical facility and/or an affiliate thereof; and (b) analyzing the data transmitted from the device, at the authorized analytical facility and/or the affiliate thereof, to provide said subsequent qualitative and/or quantitative evaluation of said biological sample; and (c) verifying whether the subject received an order from a health care professional to undertake said subsequent qualitative and/or quantitative evaluation of said biological sample, wherein said verifying step is performed prior to, concurrently with, or after steps (a) and/or (b).

An additional aspect of the invention is directed to a method of evaluating a biological sample, said method comprising (a) processing, with aid of a device, a biological sample collected from a subject having received an order for undertaking a subsequent qualitative and/or quantitative evaluation of the biological sample, wherein the device is placed in or on the subject or at a designated sample collection site, wherein the processing generates data necessary for the subsequent qualitative and/or quantitative evaluation of said biological sample, and wherein the device is configured to (i) receive the biological sample; (ii) prepare the biological sample for a subsequent qualitative and/or quantitative evaluation; and (iii) transmit the data to an authorized analytical facility and/or an affiliate thereof; (b) transmitting the data from the device, for analysis at the authorized analytical facility and/or the affiliate thereof, to provide said subsequent qualitative and/or quantitative evaluation of said biological sample; and (c) verifying whether the order for the subsequent qualitative and/or quantitative evaluation of said biological sample is within the policy restrictions of a payer or a prescribing physician for said subsequent qualitative and/or quantitative evaluation, wherein said verifying step is performed prior to, concurrently with, or after steps (a) and/or (b).

A method of evaluating a biological sample collected from a subject is illustrated in accordance with an aspect of the invention. The method comprises (a) receiving data transmitted from a device placed in or on the subject or at a designated sample collection site, wherein the device is configured to process the biological sample by (i) receiving the biological sample; (ii) preparing the biological sample for a subsequent qualitative and/or quantitative evaluation, to yield information necessary for the subsequent qualitative and/or quantitative evaluation of said biological sample; and (iii) transmitting electronically the data to an authorized analytical facility and/or an affiliate thereof; and (b) analyzing the data transmitted from the device, at the authorized analytical facility and/or the affiliate thereof, to provide said subsequent qualitative and/or quantitative evaluation of said biological sample, wherein the subsequent qualitative and/or quantitative evaluation of said biological sample yields a determination of the presence or concentration of an analyte belonging selected from one or more of the following: sodium, potassium, chloride, $TCO_2$, anion Gap, ionized calcium, glucose, urea nitrogen, creatinine, lactate, hematocrit, hemoglobin, pH, $PCO_2$, $PO_2$, $HCO_3$, base excess, $sO_2$, ACT Kaolin, ACT Celite, PT/INR, cTnl, CK-MB, or BNP.

In another aspect, the invention provides a system of evaluating a blood sample collected from a subject, said system comprising (a) a communication unit configured to receive data from a device placed in or on the subject or at a designated sample collection site, wherein the device is configured to process the blood sample, thereby generating data necessary for a subsequent qualitative and/or quantitative evaluation of said blood sample, and wherein the device comprises (i) a sample collection unit configured to receive the blood sample; (ii) a sample preparation unit configured to prepare the biological sample for the subsequent qualitative and/or quantitative evaluation, wherein the sample preparation unit permits at least one reagent to be added to the blood sample; and (iii) transmission unit configured to transmit the data to an authorized analytical facility and/or an affiliate thereof; and (b) a processor that processes said data for the subsequent qualitative and/or quantitative evaluation of said blood sample at the authorized analytical facility and/or the affiliate thereof, and wherein said processor accesses a record database comprising one or more medical records for the subject, and/or wherein the processor accesses a payer database comprising insurance information for the subject.

Another method of evaluating a plurality of types of biological samples collected from a subject is provided. The method comprises (a) receiving data transmitted from a device placed in or on the subject or at a designated sample collection site, wherein the device is configured to process the plurality of types of biological samples by (i) receiving the plurality of types of biological samples; (ii) preparing the biological samples for a subsequent qualitative and/or quantitative evaluation, to yield data necessary for the subsequent qualitative and/or quantitative evaluation of said plurality of types of biological samples; and (iii) transmitting electronically the data to an authorized analytical facility and/or an affiliate thereof; and (b) analyzing the data transmitted from the device, at the authorized analytical facility and/or the affiliate thereof, to provide said subsequent qualitative and/or quantitative evaluation of said plurality of types of biological samples.

In some embodiments, the processing of the biological sample does not involve a display of the presence or concentration level of one or more analyte selected for determination of cardiac markers, chemistries, blood gases, electrolytes, lactate, hemoglobin, coagulation or hematology. In some embodiments, the processing of the biological sample does not involve a display of the presence or concentration level of three or more analytes belonging to the following: sodium, potassium, chloride, $TCO_2$, anion Gap, ionized calcium, glucose, urea nitrogen, creatinine, lactate, hematocrit, hemoglobin, pH, $PCO_2$, $PO_2$, $HCO_3$, base excess, $sO_2$, ACT Kaolin, ACT Celite, PT/INR, cTnI, CK-MB, and BNP. After the subsequent analysis, such information can be transmitted back to the device, such as for display, storage, or analysis.

Furthermore, in some embodiments, the device is configured to verify whether the subject is covered by health insurance for said qualitative and/or quantitative evaluation of the biological sample. The device can comprise a processing unit configured to verify whether the subject is covered by health insurance for said qualitative and/or quantitative evaluation of the biological sample. The device can be configured to verify whether the subject received an order from a health care professional to undertake said qualitative and/or quantitative evaluation of the biological sample.

In some instances, the processor accesses the records database prior to providing said qualitative and/or quantitative evaluation. The processor may access the payer database prior to providing said qualitative and/or quantitative evaluation. In some embodiments, prior to providing said qualitative and/or quantitative evaluation, said system determines which records database to access.

In some embodiments, the device is configured to verify the subject's identity prior to receiving the biological sample, transmitting electronically the data, or analyzing the transmitted data. The verification of the subject's identity can comprise receiving a genetic signature of the subject. The genetic signature can be obtained by nucleic acid amplification of a biological sample from the subject. The verification of the subject's identity can comprise one or more biometric measurement of the subject. The verification of the subject's identity can be performed by an authorized technician. The identity of the authorized technician can be verified prior to receiving the biological sample, transmitting electronically the data, or analyzing the transmitted data.

In accordance with some embodiments of the invention, the device can be configured to receive one or more cartridge configured for the qualitative and/or quantitative evaluation ordered by a health care professional. The device can be configured to receive one or more cartridge configured for the qualitative and/or quantitative evaluation ordered by a health care professional. The cartridge can have one or more identifier that is readable by the device. In some instances, methods are provided further comprising receiving the identifier information from the device. Such methods can also further comprise providing one or more protocol to said device based on the identifier information received, wherein said protocol effects the preparation of the biological sample. A protocol may be provided from a server wirelessly to facilitate preparation and/or processing of the biological sample. The protocol may be provided from the cloud or from any external device.

In some embodiments, the device is contained within a housing.

The qualitative and/or quantitative evaluation can involve a determination of clinical relevance of the biological sample or lack thereof.

The designated sample collection site is a retailer location in some embodiments of the invention. The designated sample collection site can be a chain store, pharmacy, supermarket, or department store. The designated sample collection site can be the subject's home.

In some embodiments, the data includes electronic bits representative of the sample. The data can be aggregated and is useful for longitudinal analysis over time to facilitate diagnosis, progress treatment, and/or disease prevention. The data can also be useful and viewable for longitudinal analysis over time to facilitate diagnosis, progress treatment, and/or disease prevention, as well as a better understanding of disease progression or regression, or efficacy of an intervention, including a treatment or lifestyle change.

The biological sample can have a volume of 250 uL or less. The biological sample is blood, serum, saliva, urine, tears, gastric and/or digestive fluid, stool, mucus, sweat, earwax, oil, glandular secretion, semen, or vaginal fluid. The biological sample can be a tissue sample. The biological sample can be collected from a fingerstick.

In some embodiments, a method can further comprise generating a report based on said qualitative and/or quantitative evaluation of said biological sample. The method can further comprise transmitting said report to an additional health care professional. In some instances, the additional health care professional provided the order to the subject to undertake said qualitative and/or quantitative evaluation of said biological sample. The additional health care professional can be at a different location from the authorized analytical facility.

In some embodiments, processing includes adding one or more reagent or fixatives.

The data can be transmitted to a cloud computing based infrastructure in accordance with an embodiment of the invention. The image can be a video image. The data can comprise electronic data representative of an image and/or audio signal. The cloud computing based infrastructure may be self learning. Data may be provided to a model that may refit and retune based on the data that is collected. The cloud computing based infrastructure can perform the analysis.

In some embodiments, the processor accesses the payer database. A payer can receive an electronic bill from the designated sample collection site. A health care professional of the authorized analytical facility can receive an electronic payment from the designated sample collection site.

The device can be configured to additionally prepare the biological sample based on at least one of: prior preparation of the biological sample, analysis of the data at the authorized analytical facility and/or the affiliate thereof.

In some embodiments, the authorized analytical facility is separate from the sample collection site.

The preparation of the biological sample can be automated.

Methods may be provided further comprising overseeing said subsequent qualitative and/or quantitative evaluation. The overseeing step can be performed by a health care professional of the authorized analytical facility and/or by a software program. Transmitting the data from the device can also be for oversight of said subsequent qualitative and/or quantitative evaluation. The oversight can be provided by the health care professional of the authorized analytical facility and/or by a software program. A user interface can be provided accessible by a health care professional for said subsequent qualitative and/or quantitative evaluation and/or oversight of said subsequent qualitative and/or quantitative evaluation. The processor can further provide oversight of said subsequent qualitative and/or quantitative evaluation.

In some embodiments, the data is representative of the biological sample and/or any portion thereof. The data can be representative of a preparation of the collected biological sample. The data can comprise information of one or more conditions under which a preparation of the collected biological sample occurs. One or more conditions can comprise one or more characteristics listed from the group: amount of the biological sample, concentration of the biological sample, quality of the biological sample, temperature, or humidity. The data can be representative of a reaction run by the device. The data can comprise information of the rate, quality, and/or performance of the reaction. The data can comprise information about a control reaction and a chemical reaction involving the biological sample. Collected data can be a photon as a result of a chemical reaction. Other examples of data may include electrons, photons, intensities, frequencies, colors, sounds, or temperatures.

In some embodiments, methods are provided further comprising (c) overseeing one or more steps of (i)-(iii) to improve quality of said evaluation, wherein said overseeing is performed prior to, concurrently with, or subsequent to any of steps (i)-(iii). Additionally methods are provided further comprising (iv) overseeing one or more steps of (i)-(iii) to improve quality of said evaluation, wherein said overseeing is performed prior to, concurrently with, or subsequent to any of steps (i)-(iii). The overseeing can be of data that is representative of the biological sample and/or any portion thereof. The overseeing can be of data that is representative of a preparation of the collected biological sample. The overseeing can be of information of one or more conditions under which a preparation of the collected biological sample occurs. The overseeing can be of that is data representative of a reaction run by the device. The overseeing can be of data that is representative of a reaction run that occurs within the system.

In some embodiments, healthcare coverage is provided by a health insurance company and/or employer.

In some embodiments, a preparing step involves one or more of the types of reactions selected from immunoassay, nucleic acid assay, receptor-based assay, cytometry, colorimetric assay, enzymatic assay, spectroscopic assay (e.g., mass spectrometry, infrared spectroscopy, x-ray photoelectron spectroscopy), electrophoresis, nucleic acid sequencing, agglutination, chromatography, coagulation, electrochemical assay, histology, or cell analysis, including dead and/or live cell analysis, molecular biology, chemistry, turbidmetric assay, agglutination assay, radioisotope assay, viscometric assay, coagulation assay, clotting time assay, protein synthesis assay, histological assay, culture assay, osmolarity assay, microscopic assay, topographic assay, calorimetric assay, and/or other types of assays or combinations thereof.

The device can be further configured to process the biological sample by transmitting electronically data representative of one or more biometric measurements of the subject.

In some embodiments, a sample collection site is one or more of the following: a hospital, clinic, emergency room, military site, or subject's home.

An aspect of the invention may be directed to a system for rapid evaluation of a biological sample collected from a subject to aid in diagnosis, treatment, or prevention of a disease, said system comprising: a communication unit for receiving from a device electronic data representative of an image of said biological sample and/or a chemical reaction performed with at least one component from said biological sample; said device being placed in or on the subject or at a designated sample collection site, wherein said device is for processing the biological sample thereby generating the electronic data representative of the image of said biological sample necessary for a subsequent qualitative and/or quantitative evaluation of said biological sample, and wherein the device comprises, within a housing, (i) a sample collection unit for receiving the biological sample; (ii) a sample preparation unit for preparing the biological sample for the subsequent qualitative and/or quantitative evaluation, wherein the preparation of the biological sample is automated; (iii) an imaging unit for recording an image of the biological sample and/or a chemical reaction performed with at least one component from said biological sample; and (iv) a transmission unit for transmitting the electronic data representative of the image and/or the chemical reaction; and a processor that processes said electronic data representative of the image for subsequent qualitative and/or quantitative evaluation of said biological sample.

In some embodiments, the sample preparation unit may comprise (i) a pipette, and optionally (ii) one or more of the following: centrifuge, magnetic separator, filter, vessels, containers, assay units, reagent units, heater, thermal controller, cytometer, electromagnetic source, temperature sensor, motion sensor, or sensor for electrical properties.

The image may be static and/or a video image. The data may comprise electronic data representative of the image and an audio signal.

The biological sample may be selected from one or more of the following: blood, serum, saliva, urine, tears, gastric and/or digestive fluid, stool, mucus, sweat, earwax, oil, glandular secretion, semen, or vaginal fluid. In some embodiments, the biological sample has a volume of 250 uL or less. A component of a biological sample may be a biological analyte made of carbohydrate, lipid, protein or a combination thereof. A chemical reaction may be performed without the biological sample.

The transmission unit may be configured to transmit the electronic data representative of the image wirelessly.

The device may be configured to receive one or more cartridge configured for the qualitative and/or quantitative evaluation. In some embodiments, the cartridge may have one or more identifier that is readable by the device.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 9 shows exemplary assays and tests.

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for collecting and transmitting data relating to a sample, and often representative of the sample so that further analysis of the sample does not require physical transportation of the sample. Various aspects of the invention described herein may be applied to any of the particular applications set forth below or for any other types of diagnostic or assay systems. The invention may be applied as a standalone system or method, or as part of an integrated system, such as in a system between laboratories, health care professionals, and sample collection sites. It shall be understood that different aspects of the invention can be appreciated individually, collectively, or in combination with each other.

Figure 1A:
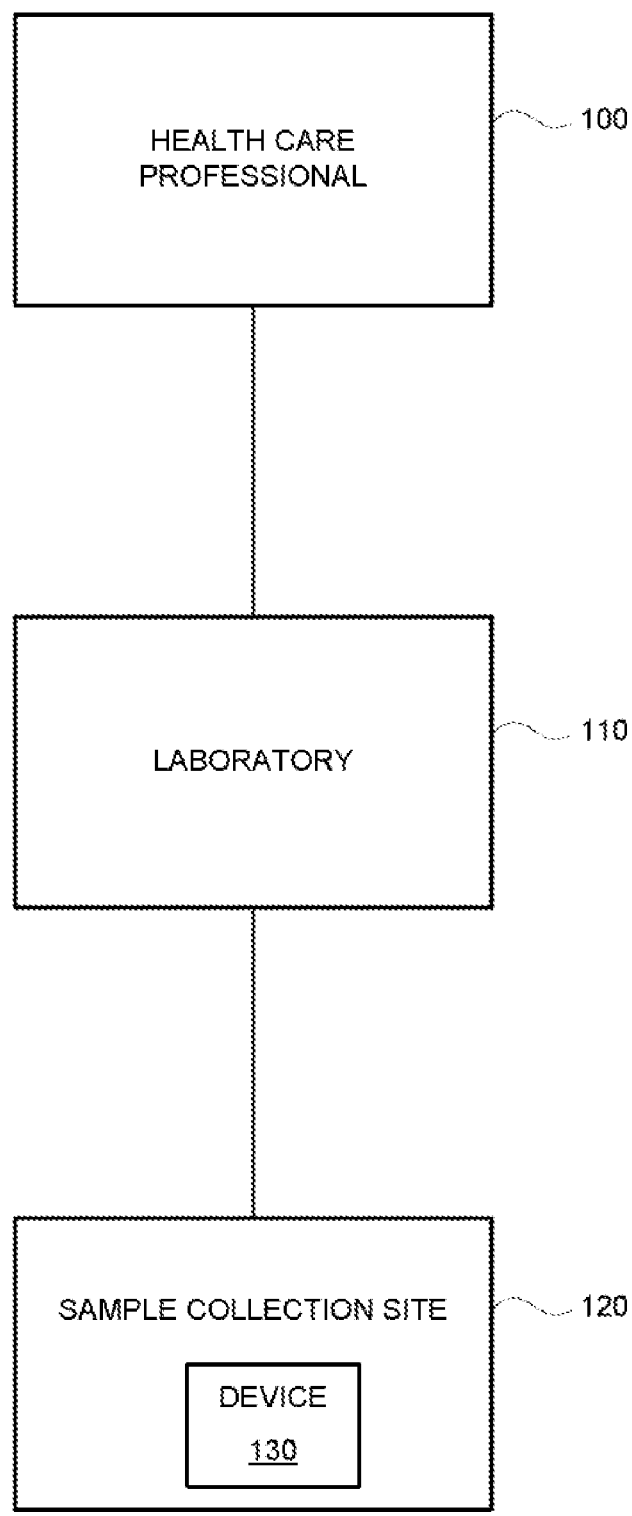
FIG. 1A shows an operation scheme involving a laboratory, a sample collection site, and a health care professional.

FIG. 1A shows a system comprising a laboratory 110, a designated sample collection site 120, and a health care professional 100. A device 130 may be provided at the designated sample collection site. A sample collection site may be a first location, and a laboratory may be provided at a second location. The first location and the second location may be different locations. The first and second locations may be located so that they are not proximate to one another. A health care professional may be provided at a third location, although he/she may be affiliated with, employed by, or contracted by the laboratory. The third location may be a different location from the first and second locations. The third location may be located so that it is not proximate to the first or second locations. A laboratory, health care professional, and sample collection site may all be at different locations from one another. In one example, a laboratory, health care professional, and/or sample collection site may be at separate facilities. Alternatively, one or more of them may be at the same location.

A laboratory can be an entity or facility or system or device capable of performing a clinical test or analyzing collected data. A laboratory can provide controlled conditions in which scientific research, experiments, and measurement can be performed. The laboratory can be a medical laboratory or clinical laboratory where tests can be done on clinical specimens, or analysis can occur on data collected from clinical specimens, in order to get information about the health of a patient as pertaining to the diagnosis, prognosis, treatment, and/or prevention of disease. A clinical specimen may be a sample collected from a subject. Preferably, a clinical specimen may be collected from the subject at a sample collection site that is at a separate facility from the laboratory, as described in further detail elsewhere herein. The clinical specimen may be collected from the subject using a device, which is placed at a designated sample collection site or in or on the subject.

In some embodiments, a laboratory may be a certified laboratory. The certified laboratory may be an authorized analytical facility. In some embodiments, authorized analytical facilities may include contracted analytical facilities. For example, a certified laboratory or other laboratory may send images to experts at another laboratory (which may be a certified laboratory) for analysis.

Any description herein of a laboratory may apply to an authorized analytical facility and vice versa. In some instances, the laboratory may be certified by a governmental agency or professional association. A laboratory may receive certification or oversight by a regulatory body. In one example, the laboratory may be certified by an entity, such as Centers for Medicare & Medicaid Services (CMS), College of American Pathologists, ISO standards 15189 or 17025 or equivalents thereof. For instance, an authorized analytical facility may be a Clinical Laboratory Improvement Amendments (CLIA) certified laboratory in the United States or its equivalent in a foreign jurisdiction.

An authorized analytical facility is typically subject to oversight or regulation. For example, a laboratory may have oversight by a board-certified entity (which may include one or more board-certified personnel). In some embodiments, oversight can include validating one or more clinical test. Oversight may also include assessing the performance of, correcting, calibrating, running controls, replicates, adjusting, or analyzing one or more clinical test. Oversight can include evaluation of one or more sets of data to provide a quality control for a clinical test. The authorized analytical facility can have one or more qualified person providing the oversight. For example, one or more pathologist or other health care professional may review data and/or analysis that is processed by the facility. At an authorized analytical facility, a trained pathologist or other certified health care professional may provide oversight. In some instances, the certified health care professional providing oversight may be one or more of the following: a doctor certified in pathology, a doctor with laboratory training or experience in the specialty areas of service for which the health care professional is responsible, or an individual with experience or laboratory training in the specialty.

The oversight may further include the certified health care professional who may establish the procedures and rules in the laboratory, deal with problems that arise, and/or train/evaluate the lab personnel. Oversight may also include selecting test methodology, verifying test procedures and establishment of laboratory's test performance characteristics, enrollment in participation in an HHS approved proficiency testing program, establishing a quality control program appropriate for the testing performed, establishing the parameters for acceptable levels of analytic performance, ensuring that those levels are maintained throughout the entire testing process, resolving technical problems and ensuring that remedial actions are taken when test systems deviate from the established performance specifications, ensuring patient test results are not reported until all corrective actions have been taken, identifying training needs and assuring that each individual performing tests receives regular in-service training and education, evaluating the competency of all testing personnel and assuring that the staff maintain their competency to perform test procedures (e.g., also procedures for evaluation of the staff: direct observation of routine test performance, monitoring the recording/reporting of results, review of intermediate test results, records, etc., observation of performance of instrument maintenance, assessment of test performance, assessment of problem solving skills), and/or evaluating and documenting the performance of individuals responsible for moderate complexity testing (e.g., semiannually during the first year; thereafter, at least annually unless test methodology or instrumentation changes). Oversight may include reviewing and/or verifying functionality of laboratory procedures or devices, and/or validity of data collected and/or generated. The oversight may assure the quality of the rest and/or put the data into a condition upon which a health care professional can rely upon it to provide a diagnosis, treatment, including but not limited to prophylactic treatment. Oversight may include reviewing a test empirically. Oversight may include one or more, two or more, or any of the number of items described elsewhere herein.

In some instances, the oversight may be provided by an oversight software program rather than the certified health care professional. In some instances, one, two or more of the types of oversight provided may be implemented by an oversight software program. A combination of an oversight software program and health care professional may be employed to provide oversight. In some instances, one, two or more of the types of oversight may be implemented by a health care professional over a software program. For example, the health care professional may determine the procedures and rules associated with the software program. In some instances, the software program may be self-learning. The software program may access an increasing pool of data and/or evolving rules or procedures.

In some embodiments, the oversight software program may be provided on a device. The oversight software program may be provided at a sample collection site, on or off the device. The software program may be provided a laboratory, such as an authorized analytical facility. In some instances, the device may receive updates to the oversight software program. The updates may or may not be provided by the laboratory. The oversight software may be stored in a memory, and may include computer readable media comprising code, instructions, or logics that may be capable of executing a step.

In some instances, the oversight software may include one or more algorithm that may review a qualitative and/or quantitative evaluation of the sample that may be performed. The oversight software program may look for outliers, may determine whether the qualitative and/or quantitative evaluation was properly performed, may perform one or more comparison with records or data points, may perform statistical analysis of the evaluation, or any other oversight action as described elsewhere herein. The oversight software may be able to perform one or more calibrations and/or diagnostics.

A health care professional of an authorized analytical facility may receive and/or view data. A health care professional of an authorized analytical facility may be affiliated with or associated with the authorized analytical facility. In some instances, the health care professional may be employed by or under contract with the authorized analytical facility. The health care professional may be located at the authorized analytical facility, may be located remotely from the authorized analytical facility, or in another analytical facility (e.g., hospital, center of excellence, specialized leading path/group). In some instances, the health care professional is not required to be on-site at all times while testing is performed, or when data is received at an authorized analytical facility, but may be available on an as needed basis to provide consultation. The health care professional may be accessible to provide on-site, telephone and/or electronic consultation.

The health care professional providing oversight may be a different individual from or the same individual as the health care professional that may receive a report from the authorized analytical facility for diagnosing, treating, monitoring, or preventing a disease for the subject. For example, a pathologist of an authorized analytical facility may be a different individual from a prescribing physician of the subject. A health care professional of authorized analytical facility may be a reviewing health care professional or an overseeing health care professional. The health care professional who may receive the report may be the health care professional who has ordered the test that the subject has undertaken. A different health care professional may provide analysis, and a different health care professional may provide oversight. Alternatively, the same health care professional may provide both analysis and oversight.

A designated sample collection site may be a point of service (POS) location. Any disclosure herein of a sample collection site may also apply to a point of service location and vice versa. A point of service location where a sample may be collected from a subject or provided by a subject may be a location remote to the laboratory. The sample collection site may have a separate facility from a laboratory. The sample may or may not be collected fresh from the subject at the sample collection site. Alternatively, the sample may be collected from the subject elsewhere and brought to the sample collection site. A sample collection site at a point of service location may be a blood collection center, or any other bodily fluid collection center. The sample collection site may be a biological sample collection center. In some embodiments, a sample collection site may be a retailer. Examples of retailers are provided in further detail elsewhere herein. Other examples of sample collection sites may include hospitals, clinics, health care professionals' offices, schools, day-care centers, health centers, assisted living residences, government offices, traveling medical care units, mobile units, emergency vehicles (e.g., air, boat, ambulance), or the home. For example, a sample collection site may be a subject's home. A sample collection site may be at a sample acquisition site and/or health assessment and/or treatment locations (which may include any of the sample collection sites described elsewhere herein including but not limited to emergency rooms, doctors' offices, urgent care, tents for screening (which may be in remote locations), a health care professional walking into someone's house to provide home care). A sample collection site may be any location where a sample from the subject is received by the device. Any location may be designated as a sample collection site. The designation may be made by any party, including but not limited to the laboratory, entity associated with the laboratory, governmental agency, or regulatory body. Any description herein relating to sample collection site or point of service may relate to or be applied to retailers, hospitals, clinics, or any other examples provided herein and vice versa.

A device may be provided at the sample collection site. The device may be configured to accept a sample. The device may be referred to as a sample collection device. The device may also be referred to as a sample processing device. The device may also be referred to as a reader device. Any description of a reader device may apply to any device that may be capable of receiving a sample and/or processing the sample. The device may accept a sample collected from a subject at the sample collection site, or that the subject or subject's proxy brings to the service location. The device may directly collect the sample from the subject, or an intermediate device or technique may be used to collect the sample from the subject. Examples of collection techniques and mechanisms are described in greater detail elsewhere herein.

In some instances, the device may be placed in or on a subject. For example, a device may be ingested by a subject (see e.g. U.S. Patent Publication No. 2006/0182738, U.S. Patent Publication No. 2006/0062852, U.S. Patent Publication No. 2005/0147559, U.S. Patent Publication No. 2010/0081894, which are hereby incorporated by reference in their entirety). The device may be a pill or have another format that may pass through the digestive tract of a subject. The device may be implanted within the subject. For example, the device may be subcutaneously implanted within the subject. In another example, the device may be worn by the subject. The device may be attached to the subject via strap, adhesive, integrated into clothing, or any other technique. The device may comprise one or more needle or microneedle that may penetrate the skin of the subject. The device may be a patch that may be worn by the patient. The device may include an automated lancing cartridge. The cartridge may be disposable. One or more disposable component may be used to collect a sample from a subject. The disposable component may provide the sample to a non-disposable device. Alternatively, the disposable component may be the sample processing device.

The device may receive a sample from the subject at one time. Alternatively, the device may periodically receive a sample from the subject. This may be at regularly scheduled intervals or in response to one or more detected conditions. The device may optionally administer therapy to the subject. The device may administer one or more therapeutic agent to the subject. The therapeutic agent may be administered at scheduled intervals or in response to one or more detected conditions. The therapeutic agent may be administered in response to one or more detected conditions from the sample.

In some instances, the device may be provided to a subject at a designated sample collection site. Alternatively, the subject may obtain or come into contact with the device at any other location.

Examples of samples may include various fluid or solid samples. In some instances, the sample can be a bodily fluid sample from the subject. The sample can be an aqueous or gaseous sample. In some instances, solid or semi-solid samples can be provided. The sample can include tissues and/or cells collected from the subject. The sample can be a biological sample. Examples of biological samples can include but are not limited to, blood, serum, plasma, nasal swab or nasopharyngeal wash, saliva, urine, gastric fluid, spinal fluid, tears, stool, mucus, sweat, earwax, oil, glandular secretion, cerebral spinal fluid, tissue, semen, vaginal fluid, interstitial fluids derived from tumorous tissue, ocular fluids, spinal fluid, throat swab, breath, hair, finger nails, skin, biopsy, placental fluid, amniotic fluid, cord blood, emphatic fluids, cavity fluids, sputum, pus, micropiota, meconium, breast milk and/or other excretions. The samples may include nasopharyngeal wash. Examples of tissue samples of the subject may include but are not limited to, connective tissue, muscle tissue, nervous tissue, epithelial tissue, cartilage, cancerous sample, or bone. The sample may be provided from a human or animal. The sample may be provided from a mammal, vertebrate, such as murines, simians, humans, farm animals, sport animals, or pets. The sample may be collected from a living or dead subject. The sample may be collected fresh from a subject or may have undergone some form of pre-processing, storage, or transport.

One or more, two or more, three or more, four or more, five or more, six or more, seven or more, eight or more, ten or more, twelve or more, fifteen or more, or twenty or more different types of samples may be collected from a subject. A single type of sample or a plurality of types of samples may be collected from the subject simultaneously or at different times. A single type of sample or a plurality of types of samples may be received or capable of being received by the device simultaneously or at different times. A plurality of types of samples may be processed by the device in parallel and/or in sequence. For example, a device may be capable of receiving both a bodily fluid and a tissue, or a stool sample and a bodily fluid. In another example, a device may be capable of receiving a plurality of types of bodily fluids, such as blood and urine. For example, the device may be capable of receiving one or more type, two or more type, three or more types, four or more types, five or more types, six or more types, seven or more types, eight or more types, ten or more types, or twenty or more types of bodily fluid.

Different collection mechanisms or the same collection mechanism of a device may be used to collect a plurality of types of samples.

A subject may provide a sample, and/or the sample may be collected from a subject. A subject may be a human or animal. The subject may be a mammal, vertebrate, such as murines, simians, humans, farm animals, sport animals, or pets. The subject may be living or dead. The subject may be a patient, clinical subject, or pre-clinical subject. A subject may be undergoing diagnosis, treatment, monitoring, and/or disease prevention. The subject may or may not be under the care of a health care professional. The subject may be a person of any age, an infant, a toddler, an adult or an elderly.

Any volume of sample may be provided from the subject. Examples of volumes may include, but are not limited to, about 10 mL or less, 5 mL or less, 3 mL or less, 1 microliter (μL, also "uL" herein) or less, 500 μL or less, 300 μL or less, 250 μl, or less, 200 μL or less, 170 μL or less, 150 μL or less, 125 μL or less, 100 μL or less, 75 μl, or less, 50 μL or less, 25 μL or less, 20 μL or less, 15 μL or less, 10 μL or less, 5 μL or less, 3 μL, or less, 1 μL, or less, 500 nL or less, 250 nL or less, 100 nL or less, 50 nL or less, 20 nL or less, 10 nL or less, 5 nL or less, 1 nL or less, 500 pL or less, 100 pL or less, 50 pL or less, or 1 pL or less. The amount of sample may be about a drop of a sample. The amount of sample may be the amount collected from a pricked finger or fingerstick. The amount of sample may be the amount collected from a microneedle or a venous draw. Any volume, including those described herein, may be provided to the device.

A health care professional may include a person or entity that is associated with the health care system. A health care professional may be a medical health care provider. A health care professional may be a doctor. A health care professional may be an individual or an institution that provides preventive, curative, promotional or rehabilitative health care services in a systematic way to individuals, families and/or communities. Examples of health care professionals may include physicians (including general practitioners and specialists), dentists, audiologists, speech pathologists, physician assistants, nurses, midwives, pharmaconomists/pharmacists, dietitians, therapists, psychologists, chiropractors, clinical officers, physical therapists, phlebotomists, occupational therapists, optometrists, emergency medical technicians, paramedics, medical laboratory technicians, medical prosthetic technicians, radiographers, social workers, and a wide variety of other human resources trained to provide some type of health care service. A health care professional may or may not be certified to write prescriptions. A health care professional may work in or be affiliated with hospitals, health care centers and other service delivery points, or also in academic training, research and administration. Some health care professionals may provide care and treatment services for patients in private homes. Community health workers may work outside of formal health care institutions. Managers of health care services, medical records and health information technicians and other support workers may also be health care professionals or affiliated with a health care provider.

In some embodiments, the health care professional may already be familiar with the subject or have communicated with the subject. The subject may be a patient of the health care professional. In some instances, the health care professional may have prescribed the subject to undergo a clinical test. The health care professional may have instructed or suggested to the subject to undergo a clinical test conducted at the sample collection site or by the laboratory. In one example, the health care professional may be the subject's primary care physician. The health care professional may be any type of physician for the subject (including general practitioners, and specialists).

A health care professional may receive a report from an authorized analytical facility. The health care professional that receives a report may be an ordering health care professional or health care professional in the analytical facility and/or sample collection site.

A laboratory 110 may be in communication with a sample collection site 120 and a health care professional 100. The laboratory may be in communication with any number of sample collection sites and health care professionals. For example, the laboratory may be in communication with one or more, two or more, three or more, five or more, ten or more, fifteen or more, twenty or more, 30 or more, 50 or more, 100 or more, 200 or more, 500 or more, 1000 or more, 5000 or more, 10,000 or more, 100,000 or more, or 1,000,000 or more sample collection sites and/or health care professionals. In some systems, one, two, three, four, or more laboratories may be provided that may communicate with any number of sample collection sites and/or health care professionals. The laboratories may or may not communicate with one another. The sample collection sites, laboratories, and/or health care professionals may be scattered geographically at any location. In some embodiments, the sample collection sites and/or health care professionals in communication with a laboratory may be in the same geographic region (e.g., town, city, state, region, country). Alternatively, the sample collection sites and/or health care professionals in communication with a laboratory may be scattered anywhere globally.

The laboratory may communicate with the health care professional and the sample collection site in any manner known in the art. In some embodiments, the laboratory may communicate directly with a device located at the sample collection site or in or on a subject. Such communications may be via electronic signals, radiofrequency signals, optical signals, cellular signals, or any other type of signals that may be transmitted via a wired or wireless connection. Any transmission of data or description of electronic data or transmission described elsewhere herein may occur via electronic signals, radiofrequency signals, optical signals, cellular signals, or any other type of signals that may be transmitted via a wired or wireless connection. For example, data may be transmitted electronically from a sample collection site to a laboratory and vice versa. Data may be transmitted from a device which may be at the sample collection site or in or on a subject to the laboratory and vice versa. Similarly, data may be transmitted electronically from a laboratory to a health care professional and vice versa. The communications may be over a network such as a local area network (LAN), wide area network (WAN) such as the Internet, personal area network, a telecommunications network such as a telephone network, cell phone network, mobile network, a wireless network, a data-providing network, or any other type of network. The communications may utilize wireless technology, such as Bluetooth or RTM technology. Alternatively, various communication methods may be utilized, such as a dial-up wired connection with a modem, a direct link such as T1, ISDN, or cable line. In some embodiments, a wireless connection may be using exemplary wireless networks such as cellular, satellite, or pager networks, GPRS, or a local data transport system such as Ethernet or token ring over a LAN. In some embodiments, the device may communicate wirelessly using infrared communication components. A device 130, personal computer, server, laptop computer, tablet, mobile phone, cell phone, satellite phone, smartphone (e.g., iPhone, Android, Blackberry, Palm, Symbian, Windows), personal digital assistant, Bluetooth device, pager, land-line phone, or other network device may be used in order to provide communications. Such devices may be communication-enabled devices.

The laboratory may communicate with a device at a sample collection site, or in or on a subject. The device from the sample collection site may communicate with any communication-enabled device of the laboratory. The device may provide data to a cloud computing infrastructure that may be accessed by any communication-enabled device of the laboratory. The device may transmit data to the laboratory.

The data provided by the device may include data relating to a sample from a subject. The data may be information necessary and/or sufficient for a qualitative and/or quantitative evaluation of the sample. The data may include information for oversight. The data may include information for analysis. The data may be an electronic representation of a sample. An electronic representation of a sample may include an electronic representation of the entire sample and/or any portion thereof. The data may be electronic data. In some instances, the data may be electronic bits representative of the sample or reaction or reagents. The data may be digital and/or analog. The data may be representative of one or more measurable parameter relating to, based on, or of the sample.

The data may be representative of a sample and/or any portion thereof. In some embodiments, the data is representative of a preparation of the collected biological sample. The data may be collected prior to, during, and/or after the preparation of the sample. The data may be collected over time. The data may comprise information of one or more conditions under which a preparation of the collected biological sample occurs. Examples of such conditions may comprise one or more characteristics listed from the group: amount of the biological sample, concentration of the biological sample, quality of the biological sample, temperature, or humidity. Such conditions may include environmental conditions. Environmental conditions may refer to conditions of the sample, and/or the surroundings of the sample. The environmental conditions may be provided prior to, during, and/or after the sample is received by the device, prepared by the device, and/or data is transmitted by the device.

The data may include amounts, concentrations, proportions, purity, or other information of sample, reagents, diluents, wash, dyes or any other material that may be involved in the preparation of a sample, reactions, and/or controls/calibrations on the device. Physical and/or chemical properties of a sample and/or other materials, and/or a chemical reaction may be measured at one or more points in time, and may be aggregated as data. In some embodiments, the data may determine whether a sample, reagent, diluents, wash, dye, or any other material is suitable for use in the device for said sample preparation and/or to permit subsequent qualitative and/or quantitative evaluation. For example, the data may be indicative of any error conditions that may indicate a sample and/or any of the other materials have gone bad, or are otherwise unsuitable. In some instances, data is collected during any processes the device is performing.

In some embodiments, the data may be representative of a chemical reaction which may be run by the device. The chemical reaction may include a chemical reaction with the sample, or without the sample. The chemical reaction may include one or more reagents that may react with the sample. The chemical reaction may include a control or calibration reaction. The data representative of the reaction may include one or more measurement of the chemical reaction. The data may also include the rate or speed of the chemical reaction, and/or the acceleration of the chemical reaction. The data may include how complete a chemical reaction is (e.g., whether the chemical reaction has started, whether the chemical reaction is taking place, whether the chemical reaction is complete, how far along the chemical reaction is—e.g., 10%, 50%, etc.). The data may comprise information about a control reaction and a chemical reaction involving the biological sample. These reactions may occur simultaneously and/or sequentially. The data may pertain to one or more chemical reactions that may or may not occur simultaneously. The data may pertain to one or more sample preparation step that may or may not occur simultaneously. The data may also include physical processing, such as centrifugation, pulveration, or any other actions described herein, which may be represented through bits of data. The data can be utilized for oversight functionally performed on-board, remotely by a health care professional, and/or an external device configured to render such oversight.

In some examples, the data may be one or more image, and/or audio data representative of the sample. An image may be a digital image or an analog image. The audio data may be digital and/or analog. The data may include a video representative of the sample. An image may include a video image. The data may include electronic data representative of a digital image and/or audio data of the sample. In one example, the data may include video imaging that may capture changes over time. For example, a video may be provided to provide evaluation on dynamic actions, such as lysing, agglutination, mixing, movement of cells or other molecules in a sample or matrix, or assays.

The data may be collected at one time, or at a plurality of times. The data may be collected at discrete points in time, or may be continuously collected over time. Data collected over time may be aggregated and/or analyzed. In some instances, data may be aggregated and may be useful for longitudinal analysis over time to facilitate diagnosis, treatment, and/or disease prevention.

Data may be collected from a device over time. The aggregated data from a single device for a given sample may be useful to facilitate the qualitative and/or quantitative evaluation of the sample. For example, it may be useful to determine how a sample reacts and/or changes over time in order to provide a diagnosis, treatment, and/or disease prevention.

In some embodiments, data may be displayed in a lab report, medical record, or any other type of display. The display may show patient health, provider's level of care, disease regression, progression, and/or onset through longitudinal analysis of high integrity data that is may be obtainable more frequently or obtained frequently through the described infrastructure over time.

Data may be collected from multiple devices. The aggregated data from multiple devices may be useful to facilitate the qualitative and/or quantitative evaluation of the sample. The aggregated data may include data relating to samples collected from a single subject, received at the multiple devices. Alternatively, the aggregated data may include data relating to samples collected from other subjects, received at the multiple devices. The aggregated data may be collected and/or stored in a database. The database may be accessed to provide data to perform a longitudinal analysis that takes past collected data into account. Trends, and changes over time may be monitored. The multiple devices may be standardized and/or may provide data that is of sufficient quality, precision, and/or accuracy in order to aggregate the data and perform a longitudinal analysis therefrom. Very little or no variation may be provided between devices. The devices may also create standardized environments in which the sample preparation may occur. The standardized environments may also be provided during a chemical reaction. The devices may also provide standardized pre-analytic steps. The multiple devices may be distributed globally. This may provide a global evaluation infrastructure, which may better permit the monitoring of disease progression and/or regression. By standardizing a device, data may be longitudinally analyzed looking at velocity of markers in one or more subject over time. The data may be analyzed and/or displayed in a form of lab report or electronic medical record or decision support system for consumers, providers, and/or payers (e.g., health plans, employers, governmental payers, etc.). Such display may include displays of data over time, which may include trending analysis or other analysis relating to changes in values, rates of changes, or rates of rates of change.

The data may be of a quality suitable for a longitudinal analysis over time. The suitable quality of data may be useful for lab reports and/or electronic medical records that may incorporate data collected over time. This may include data collected over long periods of time (e.g., multiple visits, or based off multiple samples), or shorter periods of time (within a single visit, or based on single received sample). The data may have a sufficient quality, precision, and/or accuracy for longitudinal analysis. For example, the sample may be collected from a subject a plurality of times. The sample may be collected from the subject at different times. The samples may be collected at predetermined intervals or according to a predetermined schedule. Alternatively, samples may be collected from the subject when one or more condition or event triggers the collection. Multiple collections of samples may permit the sample to be analyzed over a period of time, thereby permitting longitudinal analysis. In some embodiments, in order to permit longitudinal analysis, the data may have a high degree of precision and/or accuracy. In one example, the data may have a coefficient of variation of 20% or less, 15% or less, 10% or less, 9% or less, 8% or less, 7% or less, 6% or less, 5% or less, 4% or less, 3% or less, 2% or less, 1% or less, 0.5% or less, or 0.1% or less over time. In some instances, the multiple devices may provide data having a coefficient of variation of 20% or less, 15% or less, 10% or less, 9% or less, 8% or less, 7% or less, 6% or less, 5% or less, 4% or less, 3% or less, 2% or less, 1% or less, 0.5% or less, or 0.1% or less over time.

The data over time may be analyzed longitudinally. This may include the change in data over time, the rate of change of data over time, the rate of change of the rate of change of data over time, or any derivative thereof. For example, velocity and/or acceleration of data change may be collected and/or analyzed. The increase and/or decrease in the data values and/or the various rates of change may be beneficial in determining a diagnosis, treatment, and/or disease prevention.

The device is capable of processing a sample collected from a subject to yield data for subsequent analysis. The device may be configured to facilitate collection of the sample from the subject. The device may be configured to receive the sample from the subject. The device may be configured to prepare the sample for a clinical test to detect and/or quantitate an analyte of interest. The device may comprise one or more reagents useful for the clinical test. The preparation or the clinical test may include a chemical reaction with the reagents. The device may include one or more detector that may be capable of detecting signals generated from processing the sample. The device may transmit data relating to the sample. The data relating to the sample may include the raw data from the detected signals, such signals relating to unreacted sample, a sample that has undergone a reaction, and/or device configurations. In some instances, the device may pre-process some of the raw data to get it into a desired format, and transmit the pre-processed data. In some instances, the device may perform one or more analysis step, and transmit analyzed data. Alternatively, the device does not perform any pre-processing and/or analysis. The pre-processing and/or analysis may occur at the laboratory. In some instances, pre-processing and/or analysis may occur at both the device and the laboratory. The laboratory may also include a hospital who may be leveraging its pathologists so data can be transmitted to centers of excellence for the analysis of different types of specific conditions.

In one scenario, a device may perform a sample preparation step without performing any analysis or receiving any oversight. The data from the sample preparation step may be sent to the laboratory, which may perform the analysis, and which may be an authorized analytical facility that includes oversight. In another scenario, the device may perform one or more sample preparation step and may perform analysis on board. Data from the analysis may be sent to an authorized analytical facility, which may provide oversight. Alternatively, oversight may occur on board the device.

In some embodiments, oversight may include a review of the data in raw form, pre-processed form, or after analysis. Oversight may occur of a qualitative and/or quantitative evaluation of the sample. Examples of a qualitative evaluation of the sample may include but are not limited to review of an image, video, or audio file. Examples of a quantitative evaluation of the sample may include a numerical value indicating a presence or concentration level of a signal, series of signals, or an analyte. Oversight may include one or more, or two or more of the examples provided elsewhere herein. Oversight may be provided by a health care professional of an authorized analytical facility. In some other instances, oversight may be provided by a software program or automated review system. The software program and/or automated review system may or may not be under the review or care of a qualified person, such as a health care professional (such as a laboratory director).

The device may duplicate manual analytical procedures. In some instances, the device may perform automatically various steps, such as pipetting, preparing filtrates, heating, and/or measuring color intensity. The device may be used in conjunction with materials to measure one or more analytes. The device may measure the presence or concentration of one or more analytes. The device may include reagent-containing components that may serve as reaction units. Examples of device components and steps that may be taken by the device can be described in greater detail elsewhere herein.

The laboratory may communicate with a health care professional. The laboratory may generate a report based on analyzed data. In some instances, the laboratory may analyze raw data or pre-processed data provided from the device. Alternatively, the laboratory may receive analyzed data from the device. The laboratory may or may not perform further analysis and/or oversight from analyzed data received from the device.

The laboratory and/or device may generate a report that may present the analyzed data in a meaningful or desired manner. The report may have a format that may enable a viewer of the report to rely on the report to make a medical determination. The laboratory and/or device may transmit the report to a health care professional (or laboratory director). In some embodiments, a pathologist, other health care professional, or other qualified person may review the report prior to transmitting the report to the health care professional. A reviewing health care professional may review the report or qualitative and/or quantitative evaluation useful for generating the report prior to transmission to an ordering health care professional. Review or oversight may occur of the analyzed data and/or report at the laboratory. Alternatively, review or oversight may occur on-board the device. The health care professional who receives the report may or may not rely on the report for diagnosis, treatment and/or disease prevention of the subject.

The laboratory and/or device may also provide a report to the subject. The report provided to the subject may be the same as or different from the report provided to the health care professional. The report provided to the health care professional may have more detail or vice versa. The formats between the reports provided to the subject and the health care professional may or may not vary. Alternatively, the laboratory and/or device does not provide a report to the subject. The subject may receive information based on the report from the health care professional. A device or laboratory can directly provide a lab report automatically to a consumer upon a test being performed and/or analysis being done, or being sent to a physician for review and/or after the physician's review.

Any transmission of data and/or reports may incorporate the use of a cloud computing infrastructure. The sending party may provide the data to or have the data on a cloud computing infrastructure. The receiving party and/or parties (e.g., health care professional or patient) may access the cloud computing infrastructure. The cloud computing infrastructure may be provided on the sending party side and/or the receiving party side. Alternatively, traditional fixed data storage techniques may be employed.

Figure 1B:
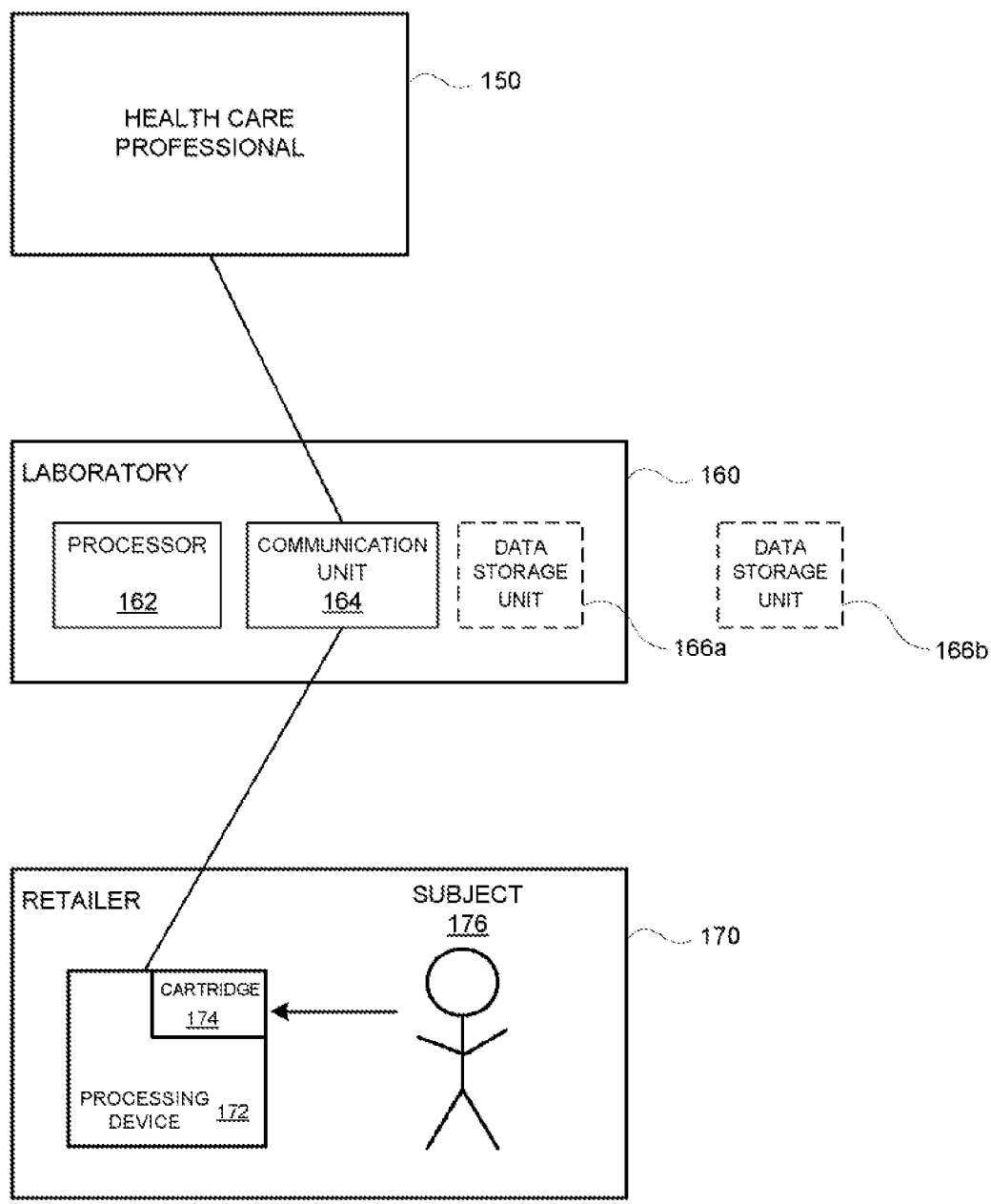
FIG. 1B shows a retailer having a processing device in communication with a laboratory (e.g. a CLIA certified laboratory).

FIG. 1B shows a retailer 170 having a processing device 172 in communication with a laboratory 160. The laboratory or reader device may be in communication with a health care professional 150. As previously described, any discussion herein of retailers or other examples of sample collection sites may apply to any type of sample collection site, and vice versa. A retailer may be provided at a first location and a health care professional may be provided at a second location. The first location and the second location may be different locations. In some embodiments, the first and second locations are not proximate to one another. A laboratory may be provided at a third location. The third location may be a different location from the first and/or second location. For example, the first, second, and third locations need not be proximate to one another. The first, second, and/or third locations may be located in different facilities. Alternatively, the first, second, and/or third could all be the same location (point of service).

A retailer may be an entity that sells a product or service. In some embodiments, the product or service may relate to health or medical care. For example, the retailer may sell medicine or health care supplies and/or insurance. In some embodiments, a retailer may be a pharmacy (e.g., retail pharmacy, clinical pharmacy, hospital pharmacy), drugstore, chain store, supermarket, or grocer. Examples of retailers may include but are not limited to Walgreens, CVS Pharmacy, Duane Reade, Walmart, Target, Rite Aid, Kroger, Costco, Kaiser Permanente, or Sears.

A retailer may be provided at a retailer location. In some embodiments, the retailer may be at a different geographic location than a health care professional and/or laboratory location. Alternatively, the health care professional may be provided at the retailer location.

A retailer 170 may have a sample processing device 172 at the retailer's location. In some embodiments, the retailer may have one or more, two or more, three or more, four or more, five or more, six or more, or ten or more sample processing devices at the retailer's location. The sample processing device may be a point of service device. The sample processing devices may be capable of communication with communication-enabled devices. For example, the sample processing devices at a retailer location may communicate with one another. Alternatively, sample processing devices may communicate with other reader devices at different locations, such as other sample collection sites, or in or on a subject. Sample processing devices may communicate with other types of communication-enabled devices, such as a computer at a laboratory and/or biometric devices. Such communications may be wired or wireless.

The sample processing device 172 may be configured to accept a sample. The sample processing device may be configured to collect the sample directly from a subject. The sample processing device may be configured to perform one or more sample preparation step on the subject. The sample processing device may be configured to run an assay. In some embodiments, the sample processing device may be configured to run one or more assay. The sample processing device may be capable of performing multiplexed assays on a single sample. Where desired, the device is configured to perform at least 2, 3, 4, 5, 6, 7, 8, 9, 10, 20, 30, 40, 50, 100, 200, 500, 1000 or more assays. The plurality of assays may be run simultaneously or in parallel. One or more control assays and/or calibrators (e.g., including a configuration with a control of a calibrator for the assay/tests) can also be incorporated into the device to be performed in parallel if desired. In some instances, assays may be run in sequence, or any combination of in sequence and in parallel, based on the sample. The reader device may be effecting one, two, or more chemical reactions or other processing tests (e.g., pulverizing). The sample processing device may be configured to detect one or more signal relating to the sample. The sample may be a sample of bodily fluid, a biological sample, or any other example as provided elsewhere herein.

In some embodiments, the sample processing device 172 may comprise a cartridge 174. The cartridge may be removable from the sample processing device. In some embodiments, a sample may be provided to the cartridge of the sample processing device. Alternatively, the sample may be provided to another portion of the sample processing device. The cartridge and/or device may comprise a sample collection unit that may be configured to accept a sample. The sample processing device is described in further detail elsewhere herein. The cartridge and device may be integrated into a single device or may be separable devices. A device may include a pill or patch that may link to a mobile device or other network device for processing.

A subject 176 may be provided at the retailer 170. The subject may provide a sample of bodily fluid to the sample processing device 172 and/or cartridge 174 of the device. A bodily fluid may be drawn from a subject and provided to a device in a variety of ways, including but not limited to, fingerstick, lancing, injection, and/or pipetting. The bodily fluid may be collected using venous, or non-venous methods. The bodily fluid may be provided using a bodily fluid collector. A bodily fluid collector may include a lancet, microneedle, porous membrane (e.g., for a pill), capillary, tube, pipette, syringe, venous draw, or any other collector described elsewhere herein. In one embodiment, a lancet punctures the skin and withdraws a sample using, for example, gravity, capillary action, aspiration, or vacuum force. The lancet may be part of the sample processing device, part of the cartridge of the device, part of a system, or a standalone component. Where needed, the lancet may be activated by a variety of mechanical, electrical, electromechanical, or any other known activation mechanism or any combination of such methods. In one example, a subject's finger (or other portion of the subject's body) may be punctured to yield a bodily fluid. The bodily fluid may be collected using a capillary tube, pipette, or any other mechanism known in the art. The capillary tube or pipette may be separate from the device and/or cartridge, or may be a part of a device and/or cartridge. A transfer device may require no additional processing steps, and may be pre-coated with anti-coagulants or other pre-treatments in a single step. In another embodiment where no active mechanism is required, a subject can simply provide a bodily fluid to the device and/or cartridge, as for example, could occur with a saliva sample, or touching a pierced body part to a surface directly. The collected fluid can be placed within the device. A bodily fluid collector may be attached to the device, removably attachable to the device, or may be provided separately from the device.

A cartridge 174 may be inserted into the sample processing device 172 or otherwise interfaced with the sample processing device. The cartridge may be removed from the sample processing device. In one example, a sample may be provided to a sample collection unit of the cartridge. The sample may be provided directly to the cartridge. The sample may or may not be provided to the sample collection unit via a bodily fluid collector. A bodily fluid collector may be attached to the cartridge, removably attachable to the cartridge, or may be provided separately from the cartridge. The bodily fluid collector may or may not be integral to the sample collection unit. The cartridge may then be inserted into the sample processing device. Alternatively, the sample may be provided directly to the sample processing device, which may or may not utilize the cartridge. The cartridge may comprise one or more reagents, which may be used in the operation of the sample processing device. Alternatively, one or more reagents may already be provided onboard the sample processing device.

The cartridge may or may not be disposable. Cartridges may be specially configured for one or more types of clinical tests. For example, a first cartridge may have a first configuration to enable a first set of tests, and a second cartridge may have a second configuration to enable a second set of tests. Alternatively, universal cartridges that may be configured for the same selection of tests may be provided. In some instances, universal cartridges may be dynamically programmed for certain tests through remote or on-board protocols.

When a cartridge is inserted into the sample processing device, one or more components of the cartridge may be brought into fluid communication with other components of the sample processing device. For example, if a sample is collected at a cartridge, the sample may be transferred to other portions of the sample processing device. Similarly, if one or more reagents are provided on a cartridge, the reagents may be transferred to other portions of the sample processing device, or other components of the sample processing device may be brought to the reagents. One or more components of the cartridge may be transferred in an automated fashion to other portions of the sample processing device, and vice versa. In some embodiments, the reagents or components of a cartridge may remain on-board the cartridge. In some embodiments, no fluidics are included that require tubing or maintenance (e.g., manual or automated maintenance).

The sample processing device may be configured to be placed in or on a subject. The sample processing device may receive a sample from the subject through a housing of the device. For example, if the sample processing device is ingestible or implanted within a subject, it may include a housing or a biocompatible coating. The biocompatible coating may be permeable to the desired sample. The sample may penetrate the coating or housing of the sample processing device, thereby being received by the sample processing device. If the sample processing device is on the subject, the sample may be received through the housing and/or coating of the device. Alternatively, the sample may be received using one or more needle or microneedle that may be provided on the device (which may or may not be provided on the cartridge portion of the device).

The sample processing device may be configured to facilitate sample collection, prepare the sample for a clinical test, and/or may comprise one or more reagents useful for a clinical test. In some embodiments, the sample processing device may be configured to run one or more test from the sample. A chemical reaction or other processing step may be performed, with or without the sample. In some embodiments, assays, such as immunoassays or nucleic acid assays may be run. Examples of steps and/or tests that may be prepared or run by the device may include, but are not limited to immunoassay, nucleic acid assay, receptor-based assay, cytometric assay, colorimetric assay, enzymatic assay, electrophoretic assay, electrochemical assay, spectroscopic assay, chromatographic assay, microscopic assay, topographic assay, calorimetric assay, turbidmetric assay, agglutination assay, radioisotope assay, viscometric assay, coagulation assay, clotting time assay, protein synthesis assay, histological assay, culture assay, osmolarity assay, and/or other types of assays, centrifugation, separation, filtration, dilution, enriching, purification, precipitation, pulverization, incubation, pipetting, transport, cell lysis, or other sample preparation steps, or combinations thereof. Sample processing may include chemical reactions and/or physical processing. Sample processing may include the assessment of histology, morphology, kinematics, dynamics, and/or state of a sample, which may include such assessment for cells. The device may perform one or more, two or more, three or more, or four or more of these steps/tests.

The sample processing device may be configured to perform one, two or more assays on a small sample of bodily fluid. One or more chemical reaction may take place on a sample having a volume, as described elsewhere herein. For example one or more chemical reaction may take place in a pill having less than femtoliter volumes. In an instance, the sample collection unit is configured to receive a volume of the bodily fluid sample equivalent to a single drop or less of blood or interstitial fluid. The sample collection unit may be able to collect a volume of bodily fluid sample without piercing a subject's skin. In one example, light may be shined to optically measure a sample. In additional examples, ultrasound, MRI, or a scan may be used to perform analysis non-invasively.

The device may be capable of performing all on-board steps in a short amount of time. For example, from sample collection from a subject to transmitting data and/or to analysis may take about 3 hours or less, 2 hours or less, 1 hour or less, 50 minutes or less, 45 minutes or less, 40 minutes or less, 30 minutes or less, 20 minutes or less, 15 minutes or less, 10 minutes or less, 5 minutes or less, 4 minutes or less, 3 minutes or less, 2 minutes or less, 1 minute or less, 50 seconds or less, 40 seconds or less, 30 seconds or less, 20 seconds or less, 10 seconds or less, 5 seconds or less, 3 seconds or less, 1 second or less, 500 ms or less, 200 ms or less, or 100 ms or less. The amount of time from accepting a sample within the device to transmitting data and/or to analysis from the device may take about 3 hours or less, 2 hours or less, 1 hour or less, 50 minutes or less, 45 minutes or less, 40 minutes or less, 30 minutes or less, 20 minutes or less, 15 minutes or less, 10 minutes or less, 5 minutes or less, 4 minutes or less, 3 minutes or less, 2 minutes or less, 1 minute or less, 50 seconds or less, 40 seconds or less, 30 seconds or less, 20 seconds or less, 10 seconds or less, 5 seconds or less, 3 seconds or less, 1 second or less, 500 ms or less, 200 ms or less, or 100 ms or less.

A laboratory, device, or other entity or software may perform analysis on the data in real-time. Analysis may include qualitative and/or quantitative evaluation of a sample. A laboratory, device, or other entity may analyze the data within 48 hours or less, 36 hours or less, 24 hours or less, 12 hours or less, 8 hours or less, 6 hours or less, 4 hours or less, 3 hours or less, 2 hours or less, 1 hour or less, 45 minutes or less, 30 minutes or less, 20 minutes or less, 15 minutes or less, 10 minutes or less, 5 minutes or less, 3 minutes or less, 1 minute or less, 30 seconds or less, 15 seconds or less, 10 seconds or less, 5 seconds or less, or 1 second or less. The analysis may include the comparison of the data with one or more threshold value. The analysis may or may not include review by a pathologist or other qualified person. The time included for analysis may or may not include time to generate a report based on the data. The time included for analysis may or may not include the time it takes to transmit a report to a health care professional.

A device 172 may be provided to a sample collection site 170 by a laboratory 160. The device may be sold to the sample collection site, leased/rented by the sample collection site, or the sample collection site may be used as a location at which the laboratory may conduct sample collection and/or other steps.

Similarly, one or more cartridge 174 may be provided to the sample collection site 170 by the laboratory 160. Alternatively, the cartridge may be provided by another source. The cartridge may be sold to the sample collection site, leased/rented by the sample collection site, or may be utilized as part of the location where the laboratory may collect samples and/or perform other steps. The cartridge may be from a same or different source as the device.

A laboratory 160 may have a processor 162 and a communication unit 164. A laboratory may be provided within a facility. The processor and communication unit may be provided within the facility. The laboratory may have one or a plurality of processors and one or a plurality of communication units.

A processor 162 may be configured to generate a report for a health care professional 150. The processor may be on a server side with a software performing the processing. The processor may generate the report based on data received from the sample processing device 172 or may provide oversight or analysis. The processor may perform qualitative and/or quantitative evaluation of the sample. In some embodiments, the processor may compare data received from the sample processing device with a threshold value. The threshold value may be for one or more analyte. Said comparison may include a comparison of whether a data value is greater than, equal to, or less than a threshold value. The comparison may include whether the data value is qualitatively and/or quantitatively the same as the threshold value. The comparison may include one or more forms of statistical or physiological analysis of the data in relation to one or more stored values. Examples may include best-fit analysis, and/or analysis such as curve fitting, extrapolation, interpolation, regression analysis, least squares, mean calculations, multivariate, simulation analysis, or variation calculations. The processor may analyze the data received from the sample processing device. The processor may be configured to perform one or more steps for statistical analysis of the data.

In some embodiments, a threshold value may refer to a single value. The threshold value may be a numerical value or an alphanumeric value. The threshold value may be a string or any other form of data. The threshold value may refer to a range of values and/or set of values. A threshold value may refer to a single value or a plurality of values. A plurality of values may fall within one or more continuous spectrum. Alternatively, the plurality of values may be discrete. Examples of threshold ranges may include 1-100 units, or 5-10 units, and examples of threshold sets may include values falling within a list selected from 1 unit, 3 units, 5 units, 8 units, 13 units, 20 units, or 50 units. A unit may refer to any dimension or measureable quantity. Such values are provided by way of example only. In some instances, the processor may compare one or more image, video, or audio file or other data. The processor may make such comparisons against one or more reference image, video, or audio file or other data. An algorithm may be capable of evaluating one or more feature of the files or other data. In some instances, the processor may automatically sort the files for viewing by a health care professional.

The processor may be able to access one or more data storage unit 166a, 166b which may contain stored information. The stored information may include the threshold value for one or more analyte. The threshold value may be useful for determining the presence or concentration of the one or more analyte. The threshold value may be useful for detecting situations where an alert may be useful. The data storage unit may include any other information relating to sample preparation or clinical tests that may be run on a sample. The data storage unit may include records or other information that may be useful for generating a report for a health care professional. The data storage units may also be capable of storing computer readable media which may include code, logic, or instructions for the processor to perform one or more step.

In some embodiments, a data storage unit 166a may be provided at the laboratory 160. The processor may be able to access the local data storage unit. In another embodiment, the data storage unit 166b may be provided remote to the laboratory. For example, the data storage unit may be provided at a sample collection site 170 or with a health care professional 150. The data storage unit may be provided on the device. Alternatively, the data storage unit may be provided at any other location. Any combination of data storage unit locations may be utilized by the processor. For example, the processor may access data storage units that may be provided at the laboratory and external to the laboratory.

In some embodiments, the data storage units may be electronic medical records (EMR) or EMR databases. The data storage units may contain information associated with a subject. The information associated with the subject may include medical records of the subject, health history of the subject, identifying information associated with the subject, payment information associated with the subject, or any other information associated with the subject. The data storage units may be payer databases. The data storage units may include information associated with a payer, such as a health insurance company or governmental payer. Such information may include treatment records, insurance records, or financial information associated with the subject.

One or more communication unit 164 may be provided at the laboratory 160. The laboratory may be at the same location as or different location from, or may actually be the same as the sample collection or processing center or provider or hospital office/location. Any description herein of the laboratory may apply to any other locations provided herein and vice versa. The communication unit may be configured to receive data from a device 172. The communication unit may receive data relating to a sample of a subject from the device at a sample collection site 170. The communication unit may receive information about the subject from the device and/or the sample collection site. The communication unit may receive identifying information about the subject. The communication unit may receive information from the device and/or any other machine (e.g., biometric devices, mobile devices) or entity associated with the sample collection site.

The communication unit 164 may be configured to transmit data to a device 172 and/or any other machine or entity associated with the sample collection site 170. In some embodiments, the communication unit may provide one or more protocol to the device. The communication may provide the protocol in addition to receiving data. The protocol may effect the collection of a sample, prepare the sample for a clinical test, or permit a chemical reaction with one or more reagents on the device. The protocol may effect the running of the clinical test on the device. The protocol may effect the detection of the presence and/or concentration of an analyte at the device. Any description of detection and/or analysis relating to the presence and/or concentration of an analyte may include and/or be applied to assessing a disease condition. The protocol may effect the pre-processing of raw data and/or analysis of data at the device.

The communication unit may permit two-way communication unit between the sample collection site and the laboratory. The communication unit may permit two-way communication between a sample processing device at a sample collection site or in or on a subject, and a processor at the laboratory. In some embodiments, one or more protocol may be sent to a device based on data sent by the device. The data sent by the device may include subject identifying information, information based on signals generated and/or detected relating to the sample or reactions, device identification information, cartridge identification information, or any other information sent from the device. Data may be collected from the device depending on protocols provided to the device. The protocols may govern the type of data that is collected and the actions performed by the device. In some embodiments, one, two, or more subsequent sets of protocols may be sent to a device based on data collected from the device. The data from the device may provide feedback which may govern further actions to be taken by the device, dictated by the protocols.

In alternate embodiments of the invention, the laboratory need not send protocols to the device. The protocols may be stored locally on the device. Alternatively, the system may provide protocols to the device. The protocols may be provided from an entity external to the device. The protocols may be on a cartridge.

The laboratory may have an output unit which may display or transmit the report to the health care professional. The output unit may be a video display. Alternatively, the output unit may be a communication unit. In one example, the output unit may be a touchscreen. The touchscreen may have an intrinsic imaging capability through built-in sensors, which may include LEDs or other light sources.

The device may have one or more identifier. The device may be capable of transmitting the device identifier to the laboratory. One or more components of the device may have an identifier. For example, a cartridge may have one or more identifier. The cartridge identifier may be readable by the device. For example, when a cartridge is provided to the device, the device may automatically read the cartridge identifier. The device may transmit the cartridge identifier or other component identifiers to the laboratory. The device, cartridge, or other component identifiers may provide information about the configuration and/or capabilities of the device, cartridge, or other components respectively. For example, an identifier may indicate which reagents or device components are available. A protocol may be transmitted to the device from the laboratory based on the identification information received or from a device to a laboratory for review. A protocol may be run on the device based on the identification information.

An identifier may be a physical object formed on the device, cartridge, or other component. For example, the identifier may be read by an optical scanner. In some embodiments, a camera may capture an image of the identifier and the image may be analyzed to identify the device, cartridge, or other component. In one example, the identifier may be a barcode. A barcode may be a 1D or 2D barcode. In some embodiments, the identifier may emit one or more signal that may identify the device, cartridge, or component. For example, the identifier may provide an infrared, ultrasonic, optical, audio, electrical, or other signal that may indicate the identity of the device, cartridge, or component. The identifier may utilize a radiofrequency identification (RFID) tag. The identifier may be stored on a memory of the device, cartridge, or other component. In one example, the identifier may be a computer readable medium.

The communication unit 164 may be configured to transmit data to a health care professional 150. In some embodiments, the communication unit may transmit a report or analysis generated based on data relating to the sample. The communication unit may be in communication with a network device used by the health care professional. For example, the communication unit may be capable of communicating with a computer, tablet, or mobile device of the health care professional.

Alternatively, another entity or source may generate a report, and/or transmit a report to the health care professional. For example, a laboratory may analyze data provided by the device at a sample collection site or in or on a subject or by a laboratory, hospital, sample collection center, or any other location described herein. The laboratory, device or another entity may generate a report or analysis based on the analyzed data. The report may include longitudinal data over time, which may include concentration or presence of one or more analytes or changes in disease states over time. The report and/or analysis may make use of clinical outcome assessments, such as those described in U.S. Patent Publication No. 2009/0318775, which is hereby incorporated by reference in its entirety. The laboratory, device, the other entity, or an additional entity may transmit the report to the health care professional. Various rounds of analysis or data processing may occur by one or more entity. The various entities may be provided at different facilities. Alternatively, some of the various entities may be provided at the same facility.

In some embodiments, the processor, communication unit, and data storage unit may be provided on the same machine. Alternatively, two or more of the processor, communication unit, and data storage unit may be provided on the same machine. The machine may be a computer, or any other network device as described elsewhere herein. Two or more of the processor, communication unit, and data storage may be located on a laboratory-located computer. Alternatively, the processor, communication unit, and data storage may all be located on different machines. In some instances, multiple processors, communication units, and data storage units may be provided that may be distributed over one or a plurality of machines.

Figure 2:
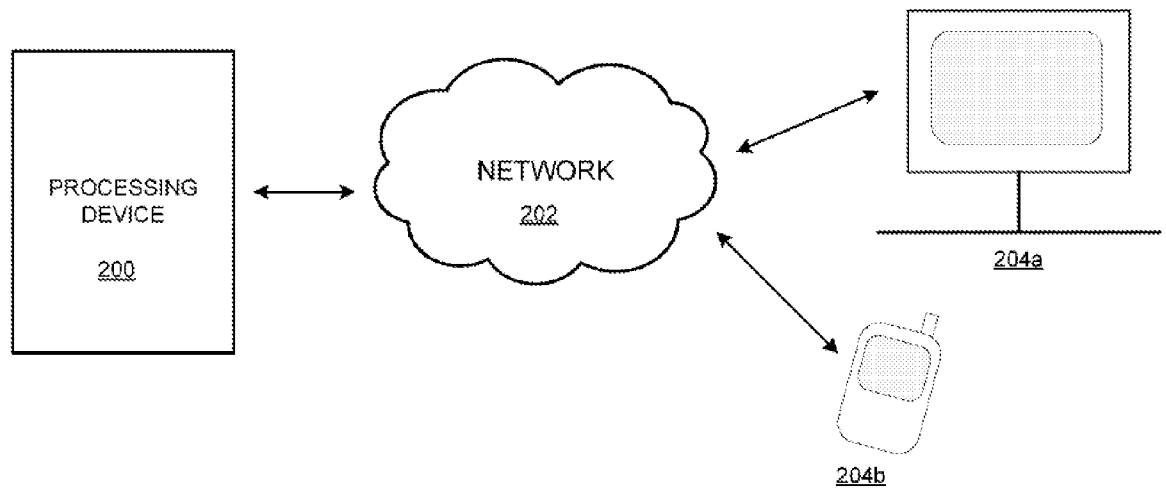
FIG. 2 shows a processing device that can be placed in a designated sample collection site and is configured to be in communication over a network with one or more other devices.

FIG. 2 shows a sample processing device 200 in communication over a network 202 with one or more other devices 204a, 204b.

A sample processing device may be described further elsewhere herein. The sample processing device may be configured to accept one or more cartridge. The sample processing device may be configured to accept a sample from a subject. The sample processing device may be configured to facilitate collection of the sample, prepare the sample for a clinical test, and/or effect a chemical reaction with one or more reagents or other chemical or physical processing. The sample processing device may be configured to detect one or more signals relating to the sample. The sample processing device may be configured to run a test. The test may include running one or more chemical reactions. The sample processing device may be configured to identify one or more properties of the sample. In some embodiments, the device may not be configured to perform a qualitative and/or quantitative evaluation of the sample on board the device. Alternatively, the device may perform such a qualitative and/or quantitative evaluation. For instance, the sample processing device may be configured to detect the presence or concentration of one analyte or a plurality of analytes or a disease condition in the sample (e.g., in or through a bodily fluid, secretion, tissue, or other sample). Alternatively, the sample processing device may be configured to detect signals that may be analyzed to detect the presence or concentration of one or more analytes (which may be indicative of a disease condition) or a disease condition in the sample. The signals may be analyzed on board the device, or at another location. Running a clinical test may or may not include any analysis or comparison of data collected.

A sample processing device 200 may be configured to communicate over a network 202. The sample processing device may include a communication module that may interface with the network. The sample processing device may be connected to the network via a wired connection or wirelessly. The network may be a local area network (LAN) or a wide area network (WAN) such as the Internet. In some embodiments, the network may be a personal area network. The network may include the cloud. The sample processing device may be connected to the network without requiring an intermediary device. Any other description of networks provided herein may be applied.

In some embodiments, the sample processing device 200 may communicate over the network 202 with another device 204a, 204b. The other device may be a communication-enabled device. For example, the other device may be a client computer or a mobile device comprising a video display with at least one display page comprising data. The other device may be any type of networked device, including but not limited to a personal computer, server computer, or laptop computer; personal digital assistants (PDAs) such as a Palm-based device or Windows CE device; phones such as cellular phones, smartphones (e.g., iPhone, Android, Blackberry, etc.), or location-aware portable phones (such as GPS); a roaming device, such as a network-connected roaming device; a wireless device such as a wireless email device or other device capable of communicating wireless with a computer network; or any other type of network device that may communicate possibly over a network and handle electronic transactions. Any discussion of any device mentioned may also apply to other devices, including those described elsewhere herein. The sample processing device may communicate with one or more, two or more, three or more, or any number of other devices. Such communication may or may not be simultaneous. Such communication may include providing data to a cloud computing infrastructure or any other type of data storage infrastructure which may be accessed by other devices.

The other device 204a, 204b that may communicate with the sample processing device 200 may have a video display. Video displays may include components upon which information may be displayed in a manner perceptible to a user, such as, for example, a computer monitor, cathode ray tube, liquid crystal display, light emitting diode display, touchpad or touchscreen display, and/or other means known in the art for emitting a visually perceptible output. Video displays may be electronically connected to a client computer according to hardware and software known in the art.

In one implementation of the invention, a display page may include a computer file residing in memory which may be transmitted from a server over a network to a client computer or other device, which can store it in memory. A client computer may receive tangible computer readable media, which may contain instructions, logic, data, or code that may be stored in persistent or temporary memory of the client computer, or may somehow affect or initiate action by a client computer. Similarly, one or more devices may communicate with one or more client computers across a network, and may transmit computer files residing in memory. One or more devices may communicate computer files or links that may provide access to other computer files.

At a client computer 204a, mobile device 204b, or any other network device as described elsewhere herein, the display page may be interpreted by software residing in memory of the client computer, mobile device, or network device, causing the computer file to be displayed on a video display in a manner perceivable by a user. The display pages described herein may be created using a software language known in the art such as, for example, the hypertext mark up language ("HTML"), the dynamic hypertext mark up language ("DHTML"), the extensible hypertext mark up language ("XHTML"), the extensible mark up language ("XML"), or another software language that may be used to create a computer file displayable on a video or other display in a manner perceivable by a user. Any computer readable media with logic, code, data, instructions, may be used to implement any software or steps or methodology. Where a network comprises the Internet, a display page may comprise a webpage of a type known in the art.

A display page according to the invention may include embedded functions comprising software programs stored on a memory device, such as, for example, VBScript routines, JScript routines, JavaScript routines, Java applets, ActiveX components, ASP.NET, AJAX, Flash applets, Silverlight applets, or AIR routines.

A display page may comprise well known features of graphical user interface technology, such as, for example, frames, windows, scroll bars, buttons, icons, and hyperlinks, and well known features such as a "point and click" interface or a touchscreen interface. Pointing to and clicking on a graphical user interface button, icon, menu option, or hyperlink also is known as "selecting" the button, option, or hyperlink. A display page according to the invention also may incorporate multimedia features, multi-touch, pixel sense, IR LED based surfaces, vision-based interactions with or without cameras.

A user interface may be displayed on a video display and/or display page. The user interface may display a report generated based on analyzed data relating to the sample. The report may include information about the presence or concentration of one or more analyte. The user interface may display raw or analyzed data relating to the sample. The data may include information about the presence or concentration of one or more analyte. The user interface may display an alert. One example of an alert may be if an error is detected on the device, or if an analyte concentration exceeds a predetermined threshold.

In some embodiments, one or more network devices 204a, 204b may be provided at a laboratory facility. The network devices at the laboratory may receive or access data provided by the sample processing device 200. In some other embodiments, one or more network devices may be provided at a health care professional location. In some embodiments, both laboratory devices and health care professional devices may be able to receive or access data provided by the sample processing device. In an additional example, the one or more network devices may belong to the subject. One or more of the laboratory, health care professional, or subject may have a network device able to receive or access data provided by the sample processing device. The one or more laboratory health care professional and/or subject, or the network device of the laboratory, health care professional, and/or subject may be authenticated prior to being granted access to the data. For example, the laboratory personnel, health care professional, and/or subject may have a login ID and/or password in order to access the data. In some embodiments, the data can be sent to the email of the laboratory personnel, health care professional, and/or subject.

In some embodiments, the sample processing device may provide data to a cloud computing infrastructure. The network device (e.g., of a laboratory, health care professional, or other entity) may access the cloud computing infrastructure. In some embodiments, on-demand provision of computational resources (data, software) may occur via a computer network, rather than from a local computer. The network device may contain very little software or data (perhaps a minimal operating system and web browser only), serving as a basic display terminal connected to the Internet. Since the cloud may be the underlying delivery mechanism, cloud-based applications and services may support any type of software application or service. Information provided by the sample processing device and/or accessed by the network devices may be distributed over various computational resources. Alternatively, they may be stored in one or more fixed data storage unit or database.

Figure 3A:
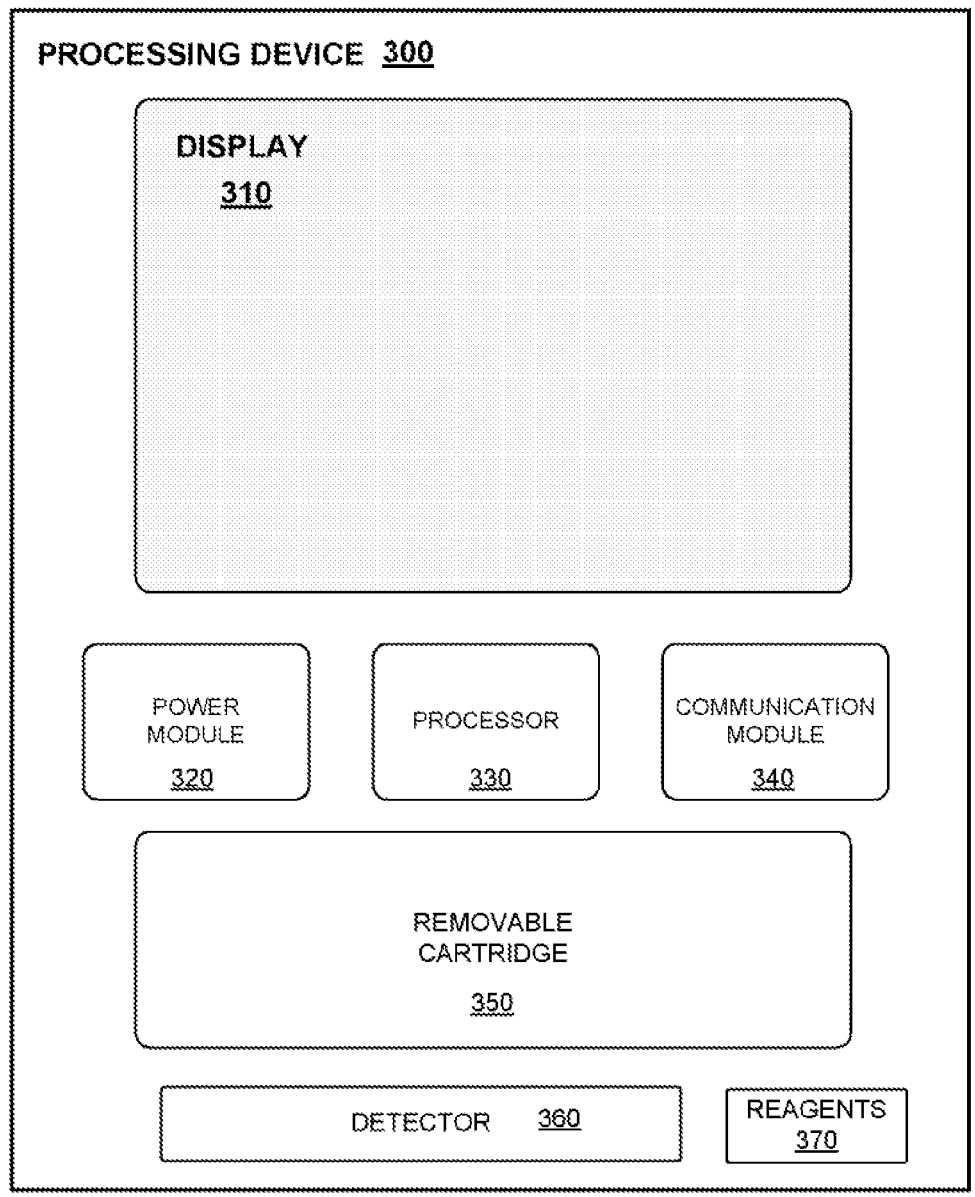
FIG. 3A illustrates various exemplary components of a processing device.

FIG. 3A illustrates a high level example of a sample processing device 300. A sample processing device may be provided at any location, including a sample collection site. The sample processing device may be in or on a subject, or may be carried by the subject. The sample processing device may be easily mobile or transportable. The sample processing device may travel with the subject. The sample processing device may be a benchtop device or a handheld device. The sample processing device may be located remote to a laboratory. Any number of sample processing devices may be distributed geographically in any manner. For example, one or more sample collection sites may have one or more devices.

Figure 3B:
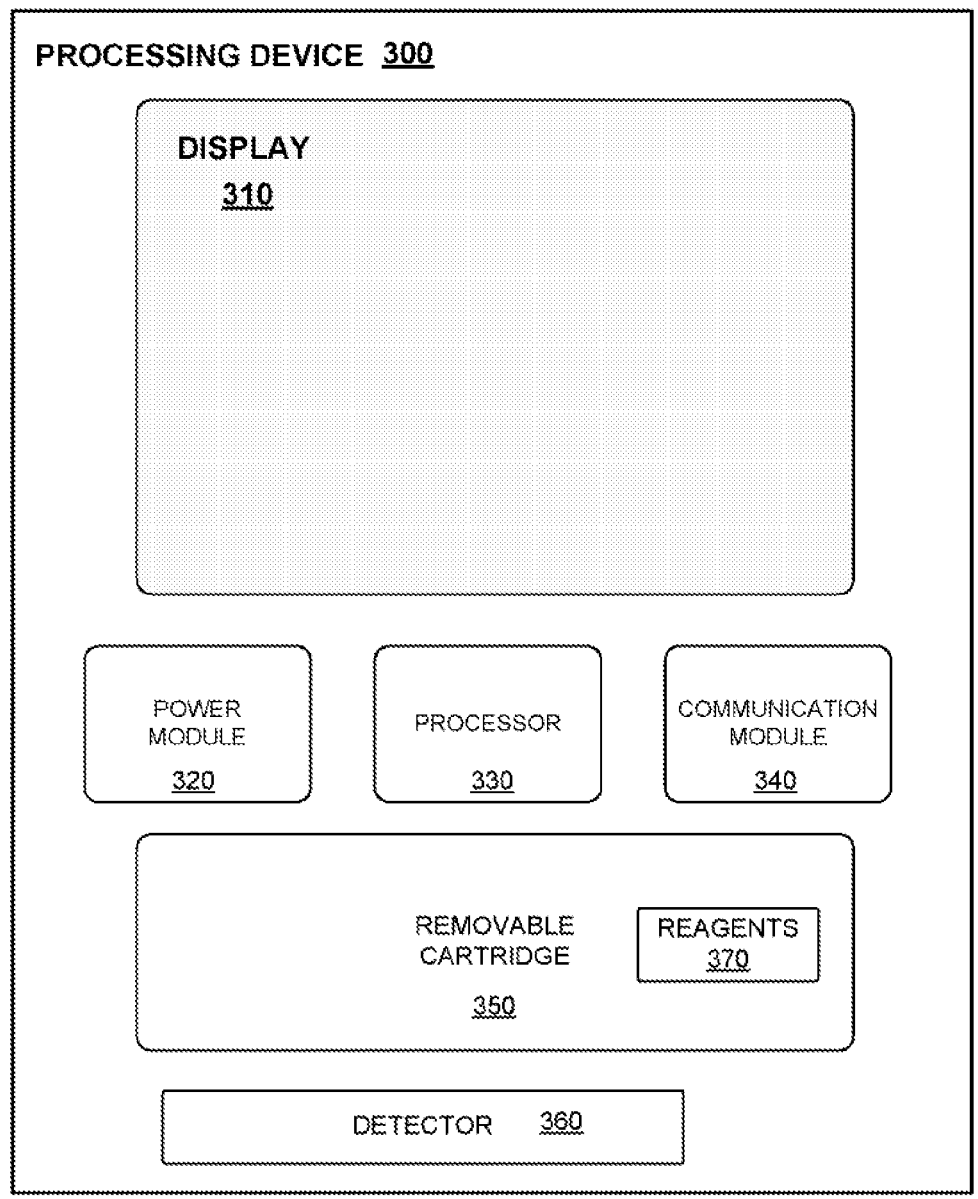
FIG. 3B illustrates another example of a device.

The sample processing device 300 may be configured to accept a removable cartridge 350. The removable cartridge and/or device may have any other characteristics or components as described elsewhere herein. The removable cartridge may be configured to accept a sample and/or deliver the sample to the device. The removable cartridge may have one or more reagents provided thereon. For example FIG. 3B provides an illustration of one or more reagents provided on the removable cartridge. Alternatively, one or more reagents 370 may be provided on board the device, such as shown in FIG. 3A. The device may comprise one or more reagent units that may contain and/or confine one or more reagents. The reagents may originally be provided on the device, the reagents may be provided to the reagent units from or on the cartridge, or both on-board the device and within the cartridge.

In other embodiments, the sample processing device need not have a removable cartridge. One or more functions as described for the cartridge may be provided by the device itself.

The sample processing device and/or a cartridge may comprise all reagents, liquid- and solid-phase reagents, required to perform one or more of the chemical reactions and/or other processing steps, including physical processing, as described elsewhere herein. For example, for a luminogenic ELISA assay the reagents within the device may include a sample diluent, a detector conjugate (for example, three enzyme-labeled antibodies), a surface labeled with antibodies binders, a wash solution, and an enzyme substrate. Additional reagents can be provided as needed. In some embodiments, reagents can be incorporated into a device to provide for sample pretreatment. Examples of pretreatment reagents include, without limitation, white cell lysis reagents, reagents for liberating analytes from binding factors in the sample, enzymes, and detergents. The pretreatment reagents can also be added to a diluent contained within the device.

Reagents according to the present invention include without limitation wash buffers, enzyme substrates, dilution buffers, conjugates, enzyme-labeled conjugates, DNA amplifiers, sample diluents, wash solutions, sample pre-treatment reagents including additives such as detergents, polymers, chelating agents, albumin-binding reagents, enzyme inhibitors, enzymes, anticoagulants, red-cell agglutinating agents, antibodies, or other materials necessary to run an assay on a device. An enzyme-labeled conjugate can be either a polyclonal antibody or monoclonal antibody labeled with an enzyme that can yield a detectable signal upon reaction with an appropriate substrate. Non-limiting examples of such enzymes are alkaline phosphatase and horseradish peroxidase. In some embodiments, the reagents comprise immunoassay reagents. Reagents defining assay specificity may be provided, which may optionally include, for example, monoclonal antibodies, polyclonal antibodies, proteins, nucleic acid probes or other polymers such as affinity matrices, carbohydrates or lipids. In general, reagents, especially those that are relatively unstable when mixed with liquid, are confined separately in a defined region (for example, a reagent unit) within the device and/or cartridge.

In some embodiments, a reagent unit may contain a small volume of reagent. For example, a reagent unit may contain approximately about 5 microliters or less to about 1 milliliter of liquid. In some embodiments, the unit may contain about 20-200 microliters of liquid. In a further embodiment, the reagent unit contains 100 microliters of fluid. In an embodiment, a reagent unit contains about 40 microliters of fluid. A reagent unit may include any volume described elsewhere herein, which may include volumes of sample. The volume of liquid in a reagent unit may vary depending on the type of assay being run or the sample of bodily fluid provided. In an embodiment, the volumes of the reagents do not have to be predetermined, but must be more than a known minimum. In some embodiments, the reagents are initially stored dry and dissolved upon initiation of the assay being run on the device.

The sample processing device may comprise a display 310. The display may be a video display or other type of user interface. The display may function as a user interface. The display may permit a user to operate the sample processing device. The display may be configured to accept an input from the user relating to a subject identity, other information about the subject, information about the sample, information about one or more clinical test, information about sample preparation steps, information about a laboratory, and/or information about a medical care provider.

The display may output information to an operator of the device. The display may prompt the operator to perform one or more steps in the operation of the device. The display may display information about the sample collected, the subject, and/or data relating to one or more preparation step performed or chemical reaction run. The display may output information about one or more automated process that may be implemented by the device. The display may provide one or more alert for an error detected, or when one or more parameters are met (e.g., certain detected signals exceed a predetermined threshold). A display may display results on the device.

The sample processing device 300 may comprise one or more components useful for collecting the sample, preparing the sample for a clinical test, and/or running a chemical reaction, or other test or analysis. The sample processing device may also comprise one or more components useful for detecting one or more signal relating to the sample or components of the device. For example, the sample processing device may include, but is not limited to, a sample collection unit, centrifuge, magnetic separator, filter, pipette or other fluid handling system, vessels, containers, assay units, reagent units, heater, thermal block, cytometer, spectrophotometer, imaging systems, microscopy station, light source, optical detector, photometer, temperature sensor, motion sensor, or sensor for electrical properties. Fluid may be transferred from one component to another via a fluid handling system, such as a pipette, channels, or pumps.

In some embodiments, the fluid handling system may be a pipettor. The pipettor may be a multi-head pipettor. In some instances, each of the pipette heads may be of the same type or may be of different types. For example, the pipette heads may be air displacement pipettes and/or positive displacement pipettes. In some instances, the fluid handling system may be capable of picking up and/or removing one or more pipette tip. The pipette tips may be individually added or removed from the pipette head. The pipette head may transfer the pipette tip from a first location to a second location. A pipette tip may be capable of connecting to and forming a fluid-tight seal with a pipette head or screwing into it or attaching in other ways. A sample or other fluid may be aspirated and/or dispensed by the pipette tip.

The pipette tip may have an interior surface and an exterior surface. The pipette tip may have a first end and an opposing second end. In some embodiments, both the first and second ends may be open. In some embodiments, the first end may have a diameter that is greater than the diameter of the second end. The pipette tip may or may not be coated with reagents and/or capturing binders such as antibodies. In some instances, an interior surface of the pipette tip may be coated with a reagent and/or capturing binders. A chemical reaction may take place within the pipette tip. The chemical reaction may take place within the pipette tip while the tip is attached to a pipette head, or when the tip is separated from the pipette head. Alternatively, chemical reactions may take place within one or more vessel. The pipette may deliver a sample or other fluid to, or aspirate a sample or other fluid from, a vessel. The pipette tip may be capable of being at least partially inserted into a vessel.

The pipettor may be utilized to transfer a sample or other fluid within the device. The pipettor may assist with the preparation of a sample. The pipettor may assist with the running of a chemical reaction.

The sample processing device may be capable of performing at least one sample preparation step and/or running one or more, two or more, three or more, four or more, five or more, six or more, seven or more, eight or more, nine or more, ten or more, twenty or more, thirty or more, or fifty or more chemical reactions. The device may be capable of performing one or more, two or more, three or more, four or more, five or more, six or more, seven or more, eight or more, nine or more, ten or more, twenty or more, thirty or more, or fifty or more different types of assays. These may occur simultaneously and/or in sequence. The sample preparation and/or chemical reactions that may occur may be governed by protocols that may be individualized to a subject's needs and/or sent back and forth from a server and/or stored or inputted locally. The subject's needs may be based on a prescription or instructions that the subject has received from a health care professional. The device may be configured to accommodate a wide range of sample preparation and/or chemical reactions.

The sample processing device 300 may include one or more detector 360 which may be capable of detecting one or more signal relating to the sample. The detector may be able to detect all emissions from the electromagnetic spectrum. Alternatively the detector may be able to detect a selected range of emission from the electromagnetic spectrum. For example, an optical detector may detect an optical signal relating to a chemical reaction that had taken place on the device. An electrical property sensor or other sensor may detect the voltage, current, impedance, resistance, or any other electrical property of a sample. A temperature sensor may determine the temperature of a thermal block, upon which a sample may rest. A sensor may determine the speed of a centrifuge. A sensor may determine the position, velocity, and/or acceleration of a pipette and/or the successful execution of a protocol.

One or more detectable signal may be detected by a detector 360. The detectable signal can be a luminescent signal, including but not limited to photoluminescence, electroluminescence, chemiluminescence, fluorescence, phosphorescence or any emission from the electromagnetic spectrum. In some embodiments, one or more label may be employed during a chemical reaction. The label may permit the generation of a detectable signal. Methods of detecting labels are well known to those of skill in the art. Thus, for example, where the label is a radioactive label, means for detection may include a scintillation counter or photographic film as in autoradiography. Where the label is a fluorescent label, it may be detected by exciting the fluorochrome with the appropriate wavelength of light and detecting the resulting fluorescence by, for example, microscopy, visual inspection, via photographic film, by the use of electronic detectors such as digital cameras, charge coupled devices (CCDs) or photomultipliers and phototubes, or other detection device. In some instances, cameras may utilize CCDs, CMOS, may be lensless cameras (e.g., Frankencamera), open-source cameras, or may utilize or any other visual detection technology known or later developed in the art. In some embodiments, imaging devices may employ 2-d imaging, 3-d imaging, and/or 4-d imaging (incorporating changes over time). Similarly, enzymatic labels are detected by providing appropriate substrates for the enzyme and detecting the resulting reaction product. Finally, simple colorimetric labels are often detected simply by observing the color associated with the label. For example, conjugated gold often appears pink, while various conjugated beads appear the color of the bead.

In some embodiments, an imaging unit may be provided. Examples of imaging units may include any of the detectors and/or optical detection devices as described elsewhere herein. For example, imaging units may be cameras which may utilize CCDs, CMOS, may be lensless cameras (e.g., Frankencamera), open-source cameras, or may utilize or any other visual detection technology known or later developed in the art. An imaging unit may capture static images and/or may capture moving images. For example, the imaging unit may capture a series of digital images. An imaging unit may capture video images. An imaging device may be a camera or a sensor that detects and/or records electromagnetic radiation and associated spatial and/or temporal dimensions.

In one example, the imaging unit may capture one or more digital image of a sample. For example, the imaging unit may capture an image of a tissue sample. The picture of the tissue sample may be transmitted to a pathologist or other health care professional. Analysis and/or oversight may occur for the image of the tissue sample. Analysis and/or oversight may occur on-board or remotely, by a health care professional or a software program. In other examples, the imaging unit may capture images of a sample, and/or any form of preparation of the sample such as chemical reactions or physical processing steps occurring with the sample. For example, a video may be taken of a chemical reaction. Any description herein of data may also apply to data representative of images, and vice versa.

The sample processing device 300 may have a processor 330 that may provide instructions to one or more components of the device. The processor may act as a controller that may instruct one or more component of the device. For example, the processor may provide an instruction to a pipette to aspirate or dispense a fluid. The processor may provide an instruction that controls the temperature of a heater (which may optionally heat and/or cool the device). The processor may provide an instruction to an optical detector to detect one or more signal. The processor may also receive instructions and/or collected data. For example, a processor may act in accordance with one or more protocol. The protocol may be provided on board the device or may be provided from a source external to the device. The processor may also receive data regarding signals detected by the device. The processor may or may not analyze signals that have been detected by the device. The processor may or may not compare one or more detected signal with a threshold value.

A communication module 340 may be provided on the device 300. A communication unit may be part of a laboratory or set-up which includes the device. The communication module may permit the device to communicate with an external machine. For example, the communication module may receive one or more protocol or set of instructions from an external source. In some embodiments, the external source may be a laboratory. The communication module may also permit the device to transmit data to an external machine. Data may be transmitted via a transmission unit. For example, the device may transmit data to a laboratory or to a health care professional. The device may transmit data to a cloud computing infrastructure, which may be accessed by a laboratory, health care professional, or other entity. The communication module may permit wireless and/or wired communication.

The sample processing device 300 may also comprise a power module 320. The power module may connect the device to an external power source, or may be provided as an internal local power source. For example, the power module may connect the device to a grid or utility. The device may include a plug that may be connected to an electric socket. The device may be connected to any other external power source, which may include an electricity generation device, such as a generator, or any renewable energy source (e.g., solar, wind, water, geothermal), or energy storage source (e.g., battery, ultracapacitor). The power module may be a local power source. For example, the power module may be an energy storage device, such as a battery or ultracapacitor. Any battery chemistry known or later developed in the art may be used. Alternatively, a local power source may include a local energy generation device, such as a device that utilizes renewable energy. The power module may provide electricity to run the rest of the sample processing device.

One or more component of the device may be contained within a housing. The housing may partially or completely surround components of the device. A display may be provided on the housing so that the display may be visible.

The device may be a benchtop device. The device may be portable or worn. A plurality of devices may fit within a room. The device may have a total volume of less than, greater than, or equal to about $4 m^3$, $3 m^3$, $2.5 m^3$, $2 m^3$, $1.5 m^3$, $1 m^3$, $0.75 m^3$, $0.5 m^3$, $0.3 m^3$, $0.2 m^3$, $0.1 m^3$, $0.08 m^3$, $0.05 m^3$, $0.03 m^3$, $0.01 m^3$, $0.005 m^3$, $0.001 m^3$, $500 cm^3$, $100 cm^3$, $50 cm^3$, $10 cm^3$, $5 cm^3$, $1 cm^3$, $0.5 cm^3$, $0.1 cm^3$, $0.05 cm^3$, or $0.01 cm^3$. The device may have a footprint covering a lateral area of the device. In some embodiments, the device footprint may be less than, greater than, or equal to about $4 m^2$, $3 m^2$, $2.5 m^2$, $2 m^2$, $1.5 m^2$, $1 m^2$, $0.75 m^2$, $0.5 m^2$, $0.3 m^2$, $0.2 m^2$, $0.1 m^2$, $0.08 m^2$, $0.05 m^2$, $0.03 m^2$, $100 cm^2$, $80 cm^2$, $70 cm^2$, $60 cm^2$, $50 cm^2$, $40 cm^2$, $30 cm^2$, $20 cm^2$, $15 cm^2$, $10 cm^2$, $7 cm^2$, $5 cm^2$, $1 cm^2$, $0.5 cm^2$, $0.1 cm^2$, $0.05 cm^2$, or $0.01 cm^2$. The device may have a lateral dimension (e.g., width, length, or diameter) or a height less than, greater than, or equal to about 4 m, 3 m, 2.5 m, 2 m, 1.5 m, 1.2 m, 1 m, 80 cm, 70 cm, 60 cm, 50 cm, 40 cm, 30 cm, 25 cm, 20 cm, 15 cm, 12 cm, 10 cm, 8 cm, 5 cm, 3 cm, 1 cm, 0.5 cm, 0.1 cm, 0.05 cm, or 0.01 cm. The lateral dimensions and/or height may vary from one another. Alternatively, they may be the same. In some instances, the device may be a tall and thin device, or may be a short and squat device. The height to lateral dimension ratio may be greater than or equal to 100:1, 50:1, 30:1, 20:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:20, 1:30, 1:50, or 1:100.

The device may have any weight. The device may be capable of being lifted manually by a human. The device may be capable of being on or in a human. The device may be molted or mounted to a ground, wall, ceiling, and/or wall. The device may be sized and/or shaped to be ingestible by a human. Examples of device weights may include but are not limited to less than, greater than, or equal to about 20 kg, 15 kg, 10 kg, 8 kg, 6 kg, 5 kg, 4 kg, 3 kg, 2 kg, 1 kg, 0.7 kg, 0.5 kg, 0.3 kg, 0.1 kg, 0.05 kg, 0.01 kg, 5 g, 1 g, 0.5 g, 0.1 g, 0.05 g, or 0.01 g.

In some embodiments, methods above, alone or in combination, are implemented with the aid of one or more systems and devices provided in Patent Cooperation Treaty Application No. PCT/US11/53188, the content of which is incorporated herein in its entirety.

Figure 4:
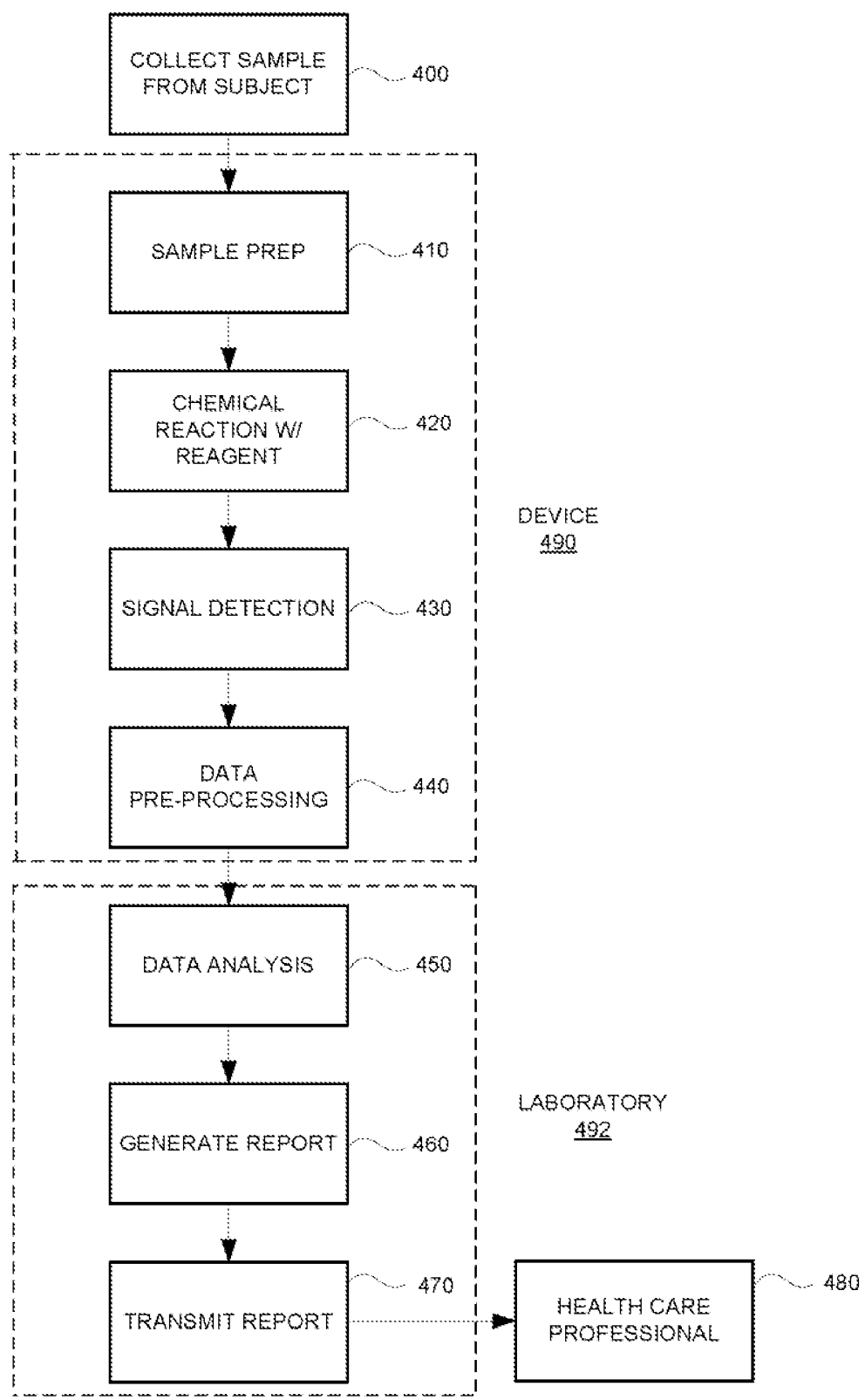
FIG. 4 shows an example of a sample collection, processing, and analysis method.

FIG. 4 shows an example of a sample collection, processing, and analysis method. One or more of the following steps may occur in such a method. The order of the steps may be modified, or one or more step may be optional or may be substituted by another step.

The method may include collecting a sample from a subject 400, preparing the sample for running a chemical reaction 410, permitting a chemical reaction with one or more reagent 420, detecting a signal relating to the sample, chemical reaction, and/or component of the device 430, pre-processing the detected signals without performing analysis, analyzing the data 450, generating a report based on the data 460, transmitting a report 470, providing the report to a health care professional 480, and/or displaying a report on the device and/or screen or other display device.

One or more of these steps may be provided by any device or entity. The demarcations illustrated in the figures are provided by way of example only, and are in no way limiting. For example, a sample may be collected 400 external to a device 490. Alternatively, the sample may be collected directly at the device, or may be collected by the device. This may occur at a sample collection site. The sample prep 410, chemical reaction 420, or signal detection steps 430, may be performed by the device 490.

In some embodiments, a sample may be prepared for a subsequent qualitative and/or quantitative evaluation. Such a sample preparation for evaluation step may include one or more of the sample prep 410, chemical reaction 420, and/or signal detection 430 steps. In some embodiments, a sample may be processed by receiving the sample 400, and/or preparing the sample for a subsequent qualitative and/or quantitative evaluation, to yield data necessary for the subsequent qualitative and/or quantitative evaluation. Sample processing may also include transmitting the data from the device. In some instances, the data may be transmitted to a health care professional of an authorized analytical facility.

One, two or all these of these steps may take place, and one, two, or all of the steps that take place may occur at the device at a sample collection site. Alternatively, they may take place at another entity, such as a laboratory. The point of service site near or on the body (such as the home) of the subject may be a laboratory or sample collection site.

Data collected by the device may be in a raw state. This may include signals detected at the device. The data may optionally undergo pre-processing 440. Data pre-processing does not perform actual data analysis or comparison with any threshold values. Data pre-processing may involve modifying the format of data. In some instances, data pre-processing may occur at a device 490 at a sample collection site. Then the pre-processed data may be transmitted to a laboratory. Alternatively, data pre-processing 440 may occur at a laboratory 492. Raw data may be sent from a device to the laboratory where pre-processing may occur. Alternatively, no pre-processing occurs within the method.

Data analysis may occur 450 in accordance with an embodiment of the invention. Data analysis may include a subsequent qualitative and/or quantitative evaluation of a sample. The quantitative and/or qualitative analysis may involve a determination of clinical relevance of the biological sample or lack thereof. Data analysis may include one or more comparison of the data with a threshold value. Said comparison may be used to determine the presence or concentration of one or more analyte, or may be useful for analytical methods and/or pathological analysis described elsewhere herein. Data analysis may occur at a laboratory 492. In some embodiments, the laboratory may be a certified laboratory. The data that may be analyzed may be raw data or pre-processed data. A device may process a sample without analyzing the sample. Data analysis does not occur on the device in this scenario. In some embodiments, processing the sample on the device does not yield a determination of the presence or concentration level of one or more analytes, two or more analytes, three or more analytes, four or more analytes, five or more analytes, six or more analytes, seven or more analytes, eight or more analytes, nine or more analytes, ten or more analytes, twelve or more analytes, fifteen or more analytes, or twenty or more analytes. In some instances, processing the sample on the device does not yield a determination of the presence or concentration of one or more, or any number of analytes (including those described elsewhere herein), belonging to the categories of cardiac marker, blood gas, electrolyte, lactate, hemoglobin, or coagulation factors. In some embodiments, processing the sample on the device does not yield a determination of the presence or concentration of one or more, two or more, three or more, or any number of analytes (including those described elsewhere herein), belonging to the following: sodium, potassium, chloride, $TCO_2$, anion Gap, ionized calcium, glucose, urea nitrogen, creatinine, lactate, hematocrit, hemoglobin, pH, $PCO_2$, $PO_2$, $HCO_3$, base excess, $sO_2$, ACT Kaolin, ACT Celite, PT/INR, cTnl, CK-MB, and BNP. In some instances, processing the sample does not include a display of the presence or concentration of one or more, or any number of analytes (including those described elsewhere herein), belonging to the categories of cardiac marker, blood gas, electrolyte, lactate, hemoglobin, or coagulation factors. Similarly, in some instances, processing the sample does not include a display of the presence or concentration of one or more, or any number of analytes (including those described elsewhere herein), belonging to the following: sodium, potassium, chloride, $TCO_2$, anion Gap, ionized calcium, glucose, urea nitrogen, creatinine, lactate, hematocrit, hemoglobin, pH, $PCO_2$, $PO_2$, $HCO_3$, base excess, $sO_2$, ACT Kaolin, ACT Celite, PT/INR, cTnl, CK-MB, and BNP.

Data analysis may include a qualitative and/or quantitative evaluation of the sample. Said qualitative and/or quantitative evaluation of the sample may yield a determination of the presence or concentration of one or more, two or more, three or more, four or more, five or more, six or more, ten or more, fifteen or more, or twenty or more analytes. In some examples, analytes may belong to categories involved in one or more of the following types of research and/or analyses: immunoassay, nucleic acid assay, receptor-based assay, cytometric assay, colorimetric assay, enzymatic assay, electrophoretic assay, electrochemical assay, spectroscopic assay, chromatographic assay, microscopic assay, topographic assay, calorimetric assay, turbidmetric assay, agglutination assay, radioisotope assay, viscometric assay, coagulation assay, clotting time assay, protein synthesis assay, histological assay, culture assay, osmolarity assay, and/or other types of assays or combinations thereof. Analytes being tested may be involved in one or more types of reactions selected from the following: Chemistry—Routine Chemistry, Hematology (includes cell-based assays, coagulation and andrology), Microbiology—Bacteriology (includes "Molecular Biology"), Chemistry—Endocrinology, Microbiology—Virology, Diagnostic Immunology—General Immunology, Chemistry—Urinalysis, Immunohematology—ABO Group & Rh type, Diagnostic Immunology—Syphilis Serology, Chemistry—Toxicology, Immunohematology—Antibody Detection (transfusion), Immunohematology—Antibody Detection (non-transfusion), Histocompatibility, Microbiology—Mycobacteriology, Microbiology—Mycology, Microbiology—Parasitology, Immunohematology—Antibody Identification, Immunohematology—Compatibility Testing, Pathology—Histopathology, Pathology—Oral Pathology, Pathology—Cytology, Radiobioassay, and/or Clinical Cytogenetics. One or more measurement may include: proteins, nucleic acids (DNA, RNA, hybrids thereof, microRNA, RNAi, EGS, Antisense), metabolites, gasses, ions, particles (including crystals), small molecules and metabolites thereof, elements, toxins, enzymes, lipids, carbohydrates, prion, formed elements (e.g., cellular entities (e.g., whole cell, cell debris, cell surface markers)). In some embodiments, one or more analytes belonging to categories of cardiac marker, blood gas, electrolyte, lactate, hemoglobin, or coagulation factors. In some embodiments, one or more analytes may include sodium, potassium, chloride, $TCO_2$, anion Gap, ionized calcium, glucose, urea nitrogen, creatinine, lactate, hematocrit, hemoglobin, pH, $PCO_2$, $PO_2$, $HCO_3$, base excess, $sO_2$, ACT Kaolin, ACT Celite, PT/INR, cTnl, CK-MB, and/or BNP.

The data that may be analyzed may be provided from a device 490 or may be modified at the laboratory 492 or other entity prior to being analyzed. In another embodiment of the invention, the data analysis 450 may occur on the device without occurring at a laboratory. Alternatively, data analysis may occur on both the device and at the laboratory or the device may be the laboratory. The analysis may occur at a point of service location, such as a home, office, doctor's office/hospital, retailer site, or other point of service location. Any description herein of a laboratory location or other location, may apply to any other point of service location described elsewhere herein.

A report may be generated 460 based on the data. A report may be based on analyzed data 450 or may be based on data in its raw or pre-processed form. The report may be generated based on a qualitative and/or quantitative evaluation of the sample. The report may be generated at a laboratory 492, such as an authorized analytical facility. Alternatively, the report can be generated at the device, or by any other entity. The report may be transmitted 470. The report may be transmitted by the same entity that generated the report. Alternatively, a different entity can transmit the report. The report may be transmitted by a laboratory 492, such as an authorized analytical facility, a device 490, cartridge, or any other entity.

The report may be received by a health care professional 480. The health care professional may be provided at a location separate from the device 490 and/or the laboratory 492. The health care professional may be capable of relying on the report in order to diagnose, treat, and/or provide disease prevention for the subject.

Thus, as previously described, any one or more of these steps may be optional. Any one or more of these steps may be performed at a sample collection site or in or on a subject by a device 490 or may be performed at a laboratory 492, or at any other entity. In some embodiments, the location where a data analysis 450 step may be performed may be certified, or may undergo review or oversight.

A device may be configured to process a sample. Sample processing may include receiving a sample 400 and/or preparing a sample for subsequent qualitative and/or quantitative evaluation, to yield necessary for the subsequent qualitative and/or quantitative evaluation. Preparing the sample for subsequent qualitative and/or quantitative evaluation may include one or more sample preparation step 410, chemical reaction step or physical processing step 420, and/or detection step 430. Processing the sample may include adding one or more reagent or fixatives. Sample processing may optionally also include transmitting data electronically. The data may be transmitted to a health care professional of an authorized analytical facility and/or displayed on the screen. The data may be transmitted and/or displayed simultaneously.

The sample may be collected from a subject 400 in any manner described elsewhere herein. For example, a fingerstick may collect the sample from the subject. In other examples, feces, urine, or tissue may be collected in an operating and/or emergency room, or any other sample collection mechanism described elsewhere herein may be utilized. The collected sample may be provided to a device 490. The sample collection may occur at a sample collection site, or elsewhere. The sample may be provided to the device at a sample collection site.

Optionally, the sample may be prepared for a chemical reaction and/or physical processing step 410. The sample preparation step may include one or more of the following: centrifugation, separation, filtration, dilution, enriching, purification, precipitation, incubation, pipetting, transport, chromatography, cell lysis, cytometry, pulverization, grinding, activation, ultrasonication, micro column processing, processing with magnetic beads or nanoparticles, or other sample preparation steps. The sample may be transferred within a device. Sample preparation may include one or more step to separate blood into serum and/or particulate fractions, or to separate any other sample into various components. Sample preparation may include one or more step to dilute and/or concentrate blood, or other biological samples. Sample preparation may include adding an anti-coagulant or other ingredients to a sample. Sample preparation may also include purification of a sample. Sample preparation may involve altering the density of a sample, and/or creating a density profile of a sample. In some instances, denser portions of a sample may be separated from less dense portions of a sample. Sample preparation may include separating solid components of a sample from aqueous components of a sample. In some examples, sample preparation may involve centrifugation, incubation and/or cell lysis. Sample preparation may include causing the sample to flow, such as a laminar flow. Sample preparation may include transporting a sample from one portion of a device to another. Sample preparation may include incubating a sample. The sample preparation may include a process to render a biological sample applicable prior to undergoing a chemical reaction and/or running an assay. The sample preparation step may render a biological sample ready for running one or more clinical test, which may include adding a series of reagents, running a protocol and/or running an assay.

Optionally, the sample may undergo a chemical reaction with a reagent 420. The chemical reaction may occur following a sample preparation step. Alternatively, the chemical reaction need not follow a sample preparation step. Sample preparation steps may occur prior to, concurrently with, and/or after a chemical reaction. In some embodiments, preparing a sample for qualitative and/or quantitative evaluation may include permitting a chemical reaction. One or more type of assay, as described elsewhere herein may occur. For example, a sample preparation step (or e.g., a chemical reaction that may occur while preparing a sample for qualitative and/or quantitative evaluation) may include one or more of the types of chemical reactions selected from immunoassay, nucleic acid assay, receptor-based assay, cytometric assay, colorimetric assay, enzymatic assay, electrophoretic assay, electrochemical assay, spectroscopic assay, chromatographic assay, microscopic assay, topographic assay, calorimetric assay, turbidmetric assay, agglutination assay, radioisotope assay, viscometric assay, coagulation assay, clotting time assay, protein synthesis assay, histological assay, culture assay, osmolarity assay, and/or other types of assays or combinations thereof. In some embodiments, a heater and/or thermal block may be employed. The chemical reaction may include providing the sample at a desired temperature. The chemical reaction may also include maintaining and/or varying the temperature of the sample before, during, and/or after the chemical reaction. Any description herein of chemical reaction may include any type of reaction that may occur in the device. For instance, chemical reactions may include physical interactions, chemical interactions, and/or other physical interactions or transformations. In some embodiments, a display (such as a screen) or sensors in a device may conduct imaging externally. For example, the device may be capable of conducting MRI, ultrasound, or other scans.

The sample preparation and/or chemical reaction may occur in response to one or more instructions. The instructions may be stored locally on the device or may be provided from an external source. In some embodiments, the external source is a laboratory. In some embodiments, the sample preparation and/or chemical reaction procedures may be self-educated. For example, they may be capable of picking up different ways of preparing a sample and/or making it ready for analysis. In some embodiments, the sample preparation procedures may be able to self adjust to utilize various sample preparation techniques given a set of parameters. The sample preparation adjustment or maintenance may or may not rely on signals detected relating to a sample, and/or to parameters and/or instructions provided by an operator. The sample preparation procedures may be self-learning. One or more controller that may provide instructions to conduct a sample preparation and/or chemical reaction may be capable of self-learning.

The adjustments may be made in response to new instructions that may be generated locally on the device or that may be provided from the external source. For example, new instructions may be updated and/or pushed down from the external source. There may be a dynamic process in which the sample preparation and/or chemical reaction and/or physical processing steps are performed in accordance with changeable instructions. Any description herein relating to a sample preparation and/or chemical reaction may also include any physical processing steps.

One or more signal may be detected 430 from the device. The signal may be detected after a sample preparation step has been done and/or after a chemical reaction and/or physical processing step has taken place. In some embodiments, one or more signal may be detected even if no sample preparation and/or chemical reaction has taken place on the sample. The signals may be based on a reading of a sample that may or may not have undergone an assay. The signals may be based on a measurement relating to the device.

In some instances, one or more additional sample preparation steps may occur. For instance, an additional sample preparation for qualitative and/or quantitative evaluation may occur. Such preparation may be made based on at least one of: prior preparation of the biological sample and/or analysis of the data by the health care professional. Reflex testing may occur based on earlier results. The reflex testing may occur in an automatic and dynamic manner before, during, or after the test/analyses. Earlier evaluation may yield further testing, which may be automated.

Optionally, data may undergo pre-processing 440. Raw data of detected signals may or may not undergo pre-processing. Pre-processing may affect the format of the raw data. For example, the pre-processing may normalize a format of the data. The pre-processing may put the data into a desired form. Pre-processing may occur without performing any analysis of the data. In some embodiments, the pre-processing may alter the form of the data without altering the content of the data. In some instances, pre-processing does not compare the data with any threshold values or perform any valuation judgments.

The data may be analyzed 450, as described elsewhere herein. Data analysis may include a subsequent qualitative and/or quantitative evaluation of a sample. Optionally, a report may be generated based on the raw data, pre-processed data, or the analyzed data. The report and/or the data may be transmitted to a health care professional. A software system may perform chemical analysis and/or pathological analysis, or these could be distributed amongst combinations of lab, clinical, and referenced/contracted specialty personnel (e.g., lab and John's Hopkins laboratory for specialty experts of some diseases or to engage them as part of/in a certified laboratory).

In some embodiments, the report may be reviewed before being transmitted to the health care professional. In some instances, the data may be reviewed before or after the report is generated. The review may occur by one or more pathologist or other qualified person. The pathologist may be associated with a laboratory 492. The pathologist may or may not be physically located at the laboratory facility. The pathologist may be employed by the laboratory. For an authorized analytical facility, oversight may be provided via a regulatory body. In some embodiments, the laboratory may be a CLIA certified laboratory. A board certified entity (which may include board-certified personnel) may review the data/reports and provide a measure of quality control and verification. In some embodiments, the board certified entity may include one or more pathologist.

In some embodiments, a device may be a certified device. The device may be under the oversight of a regulatory body. A board certified entity may review the data/reports of the device and provide a measure of quality control, performance of calibrators, of a test, and verification. A health care professional may review and/or provide oversight of the data/reports from the device. Alternatively, a software program may be provided that may review data generated by the device. The software program may be created by or under the review of a health care professional. The software program may be maintained by an authorized person, such as a health care professional.

Figure 8:
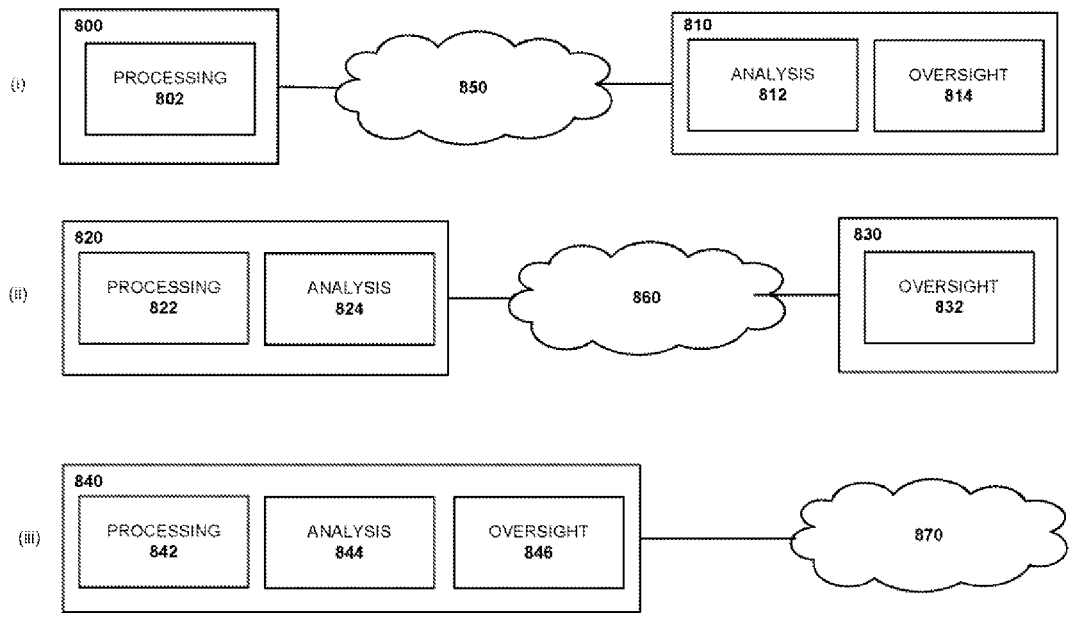
FIG. 8 shows examples of a system providing sample processing, analysis, and oversight.

FIG. 8 shows examples of a system providing sample processing, analysis, and oversight.

FIG. 8(*i*) shows an example of a device 800 which may be capable of performing a sample processing 802 step. The device may be capable of communicating with a laboratory 810. The laboratory may be capable of performing a subsequent analysis 812 step and may provide oversight 814. Oversight and/or analysis may be provided by a health care professional and/or software program. The device may communicate with the laboratory across a network 850, including any of those described elsewhere herein. A cloud computing infrastructure may be provided. The device may be provided in or on a subject, or at a sample collection site. The laboratory may be an authorized analytical facility, such as a CLIA certified facility which could be the device or cartridge.

FIG. 8(*ii*) shows an example of a device 820 which may be capable of performing a sample processing 822 step and an analysis step 824. The device may be capable of communicating with a laboratory 830. The laboratory may be capable of providing oversight 832. Oversight may be provided by a health care professional and/or a software program. The device may communicate with the laboratory across a network 860, including any of those described elsewhere herein. A cloud computing infrastructure may be provided. The cloud computing infrastructure may be part of the system/infrastructure/device. The device may be provided in or on a subject, or at a sample collection site. The laboratory may be an authorized analytical facility, such as a CLIA certified facility.

FIG. 8(*iii*) shows an example of a device 840 which may be capable of performing a sample processing 842 step, analysis step 844, and providing oversight 846. In some embodiments, the oversight may be provided by an oversight software program on the device. The device may communicate with a network 870, including any of those described elsewhere herein. A cloud computing infrastructure may be provided. The device may be provided in or on a subject, or at a sample collection site. In some embodiments, the device may be certified by a regulatory body. In some instances, the device may be CLIA certified.

In some embodiments, a method for evaluating a biological sample may be provided. The method may include receiving and/or preparing a sample on board a device. The method may include performing analysis on-board the device. Alternatively, the method may include performing analysis external and/or remote to the device. For example, the analysis may occur at a laboratory or by an affiliate of the laboratory. In some embodiments, the analysis may occur both on-board the device and external to the device.

The analysis may be performed by a health care professional of a laboratory, or any other affiliate of the laboratory. The analysis may be performed by a software program. A processor may perform one or more steps of the software program, thereby effecting such analysis. In some embodiments, one, two or more types of analysis may be provided by the analysis software program. In some embodiments, the analysis may be performed by both the health care professional and the software program. In some examples, the analysis may be performed by a software program on-board the device, by a health care professional external to the device, and/or by a software program external to the device.

The method may further include providing oversight of the analysis. The method may include performing oversight on-board the device. Alternatively, the method may include performing oversight external and/or remote to the device. For example, the oversight may occur at a laboratory or by an affiliate of the laboratory. In some embodiments, the oversight may occur both on-board the device and external to the device.

In some embodiments, analysis may be conducted by a health care professional and oversight may be conducted by a health care professional, analysis may be conducted by a health care professional and oversight may be conducted by a software program, analysis may be conducted by a software program and oversight may be conducted by a health care professional, or analysis may be conducted by a software program and oversight may be conducted by a software program. The same health care professional or different health care professionals may be used for analysis and/or oversight. The same software program or different software programs may be used for analysis and/or oversight. Any description of laboratories, health care professionals, software, and/or infrastructure that may perform oversight may also apply to analysis, or vice versa.

The oversight may be performed by a health care professional of a laboratory, or any other affiliate of the laboratory. The oversight may be performed by a software program. A processor may perform one or more steps of the software program, thereby effecting such oversight. In some embodiments, the oversight may be performed by both the health care professional and the software program. In some examples, the oversight may be performed by a software program on-board the device, by a health care professional external to the device, and/or by a software program external to the device. Any combination of analysis and oversight may be provided.

Figure 5:
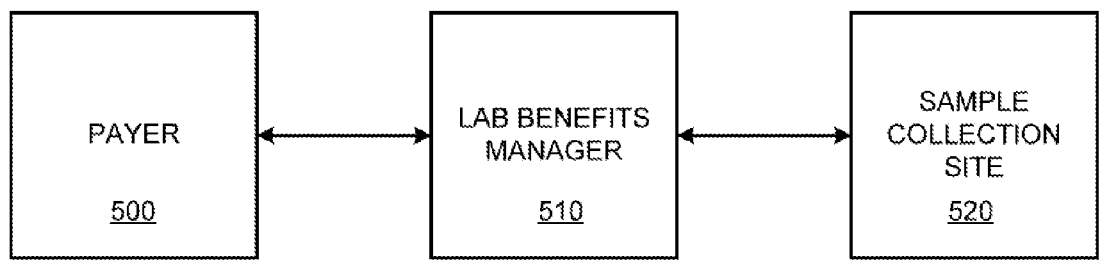
FIG. 5 shows a laboratory benefit manager in communication with a payer and a sample collection site.

FIG. 5 shows a laboratory benefit management (LBM) entity 510 in communication with a payer 500 and sample collection site 520. The LBM may be in communication with a payer at a payer location and the sample collection site at a point of service location. The LBM may be provided at a facility at the LBM location. The LBM may be at a different location than the payer and the sample collection site. In some embodiments, the sample collection site may be a retailer, insurance company, entity, or any sample collection site as described elsewhere herein. For example, the payer, LBM, and point of service may be provided in different facilities.

The LBM 510 may be an entity. For example, the LBM may be a company, corporation, organization, partnership, business, or one or more individuals that form an entity. The LBM may be configured to communicate with one or more other entity regarding financial transactions and services. The LBM may provide instructions regarding financial transactions and services and manage financial processes.

The payer 500 may be an entity that may pay or partially pay for one or more health or medical related services for a subject. The payer may have a contract or agreement with the subject or a sponsor of the subject to provide some form of medical coverage. The payer may be a public payer or private payer. In some instances, the payer may be a government payer or a health insurance company. Examples of government payers may include, but are not limited to Medicare, Medicaid, Federal Employees Health Benefits Program, Veterans Health Administration, State Children's Health Insurance Program, Military Health System/TRICARE, Indian Health Service, or other publicly funded health insurance programs. Examples of types of private payers may include, but are not limited to, health maintenance organizations (HMO), preferred provider organization (PPO), independent practice association (IPA), point of service (POS) plans, or managed care or indemnity insurance plans. Examples of health insurance companies may include but are not limited to Aetna, Blue Cross Blue Shield Association, CIGNA, Kaiser Permanente, Humana, Health Net, UnitedHealth Group, or Wellpoint.

The sample collection site 520 may be a point of service location. A sample collection site may be provided at a point of service location. Any discussion of a point of service may also apply to a sample collection site at a point of service location. A point of service location may be a location remote to the LBM where a sample may be collected from a subject or provided by a subject. In some embodiments, a sample collection site may be a retailer. Examples of point of service locations and retailers are provided in further detail elsewhere herein. In some embodiments, the sample collection site may comprise a device, as described in further detail elsewhere herein.

The LBM may receive information from a sample collection site, and/or may receive information from a payer. The LBM may provide information to a sample collection site, and/or may provide information to a payer. The LBM may communicate with the payer and sample collection site in any manner known or later developed in the art, including, but not limited to using a sample processing device, network device, mobile device, telephone, postage, courier, delivery, or any other communication techniques described elsewhere herein. The communication may occur over a network, including any form of network as described elsewhere herein. One-way or two-way communication may be provided between the LBM and the payer, and between the LBM and the sample collection site. The LBM, payer, and sample collection site may have one or more communication unit. The communication unit may be configured to provide communication between the LBM, payer, and sample collection site. The communication unit may be configured to provide wireless or wired communication.

The LBM may also perform financial transactions with the payer and with the sample collection site. In some instances, the financial transactions may be two-way financial transactions, or may be one-way financial transactions. In one example, the payer may pay the LBM. The LBM may pay the sample collection site. The payment the LBM provides the sample collection site may be derived from the payment the LBM receives from the payer.

The LBM, payer, and sample collection site may have a processor and memory that may keep track of the communications and/or payments. The LBM, payer, and/or sample collection site may interact with one or more third party that may keep track of the communications and/or payments. The one or more third parties may be financial institutions. A processor may have access to one or more memory that may contain information about payments received or disbursed. For example, an LBM may have a processor that accesses one or more memory or data storage unit containing information about a payment received from the payer and a payment provided to a sample collection site.

The payments may be provided based on use of a device provided at the sample collection site. The LBM may request a payment from the payer based on use of the device. The LBM may provide a payment to the sample collection site based on use of the device. Alternatively, the LBM may request a payment from the sample collection site based on use of the device.

The LBM may comprise one or more data storage unit comprising information of the subject, or may have the ability to access information of the subject, said informing comprising insurance status of said subject, copayment status of prior and pending clinical test(s), medical records relating to the subject, payment information relating to the subject, identification information of the subject, or other information associate with the subject or financial transactions associated with the subject.

In some alternate embodiments, a payer may receive an electronic bill from a sample collections site and/or an LBM. In some instances, a health care professional may receive an electronic payment from the sample collection site and/or the LBM.

Figure 6:
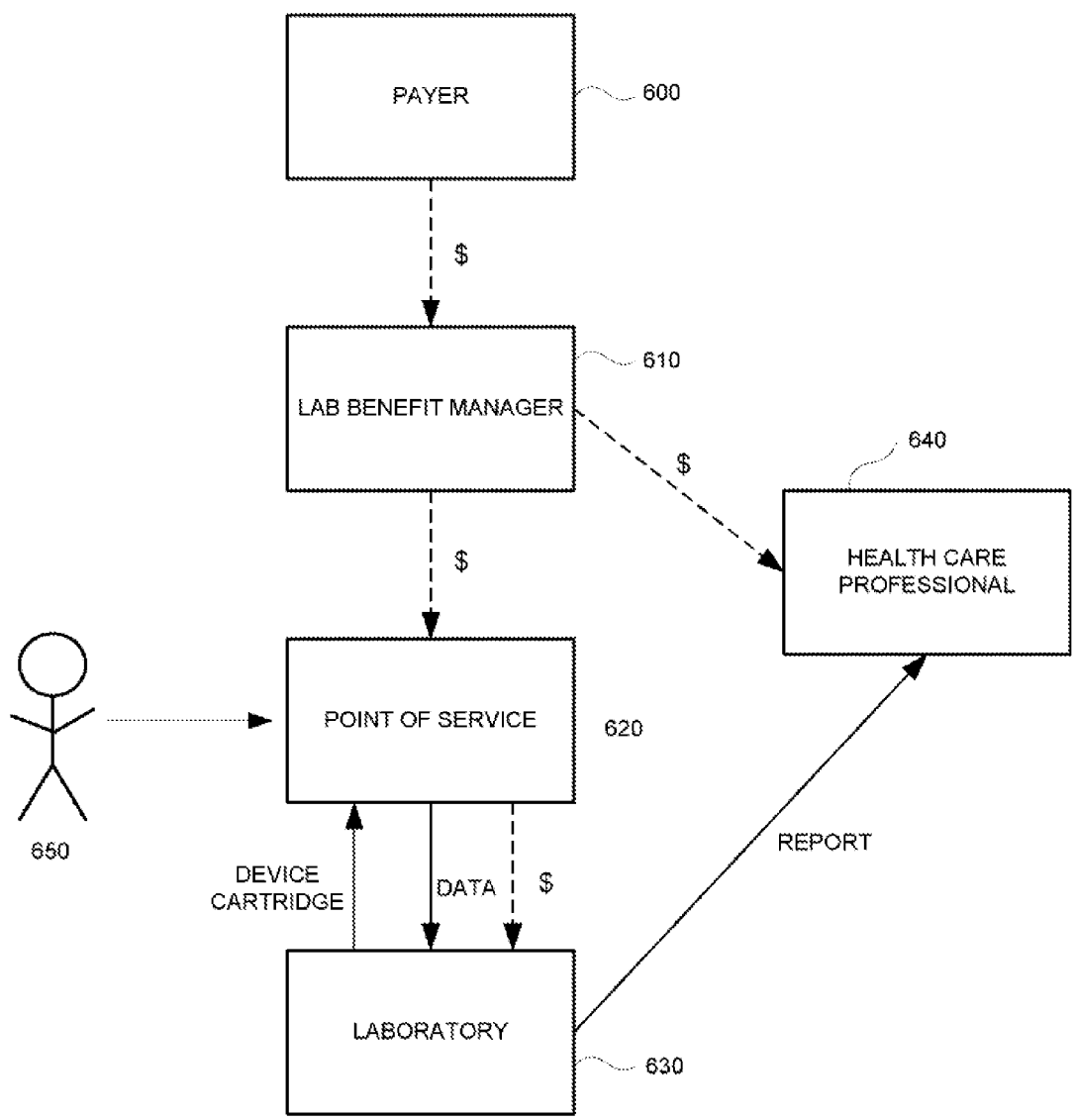
FIG. 6 shows a laboratory benefit system provided in accordance with an embodiment of the invention.

FIG. 6 shows a laboratory benefit system provided in accordance with an embodiment of the invention. A point of service 620 may be in communication with a laboratory 630. The point of service may be a sample collection site and any description herein of a point of service may also apply to a sample collection site and vice versa. The point of service may also be in communication with an LBM 610 who may also be in communication with a payer 600. The LBM and the laboratory may be in communication with a health care professional 640. A subject 650 may provide a sample to a point of service.

A point of service 620 may be a sample collection center that may have a device that may be configured to facilitate collection of a biological sample from a subject 650. As previously described, the sample may be collected from the subject at the point of service, or may be provided to the device at the point of service.

The sample collection center may be capable of communicating with a laboratory 630. The laboratory may be a certified laboratory. The sample collection center may communicate with the laboratory via a sample processing device located at the sample collection center. The sample collection center may communicate with the laboratory in additional ways. Data collected by the device may be transmitted from the point of service 620 to the laboratory. Such data may be related to the sample collected from the subject. Any type of data described previously herein, including raw data, preprocessed data, or analyzed data may be provided to the laboratory.

The laboratory may provide the device to the point of service location. In one example, the laboratory may either sell or lease/rent the device to the sample collection center. The laboratory may request a payment from the sample collection center for the sales and/or leasing of the device to the sample collection center. The sample collection center may provide a payment to the laboratory for the ownership or use of the device. The device may be operated by a device operator. The operator may be affiliated with the point of service location. The operator may be an employee or otherwise affiliated with the sample collection center. The operator may or may not be trained in the use of the device. The sample collection center may be another entity separate from the laboratory. The sample collection center may be affiliated with the point of service location or may be operated by a separate entity. The sample collection center may be any of the point of service locations described elsewhere herein, including but not limited to retailers (e.g., Blue Cross, Blue Shield, Health Net, Aetna, Cigna), medical facilities, and any other point of service. In one example, the device may be operated by a technician or other individual associated with a retailer or other point of service. The laboratory may be functioning as a wholesaler of the device. Alternatively, one or more intermediary entities may be provided that may purchase devices from the laboratory, and in turn provide/sell devices to point of service locations.

In an alternate example, the laboratory may pay the point of service location for providing the device at the sample collection center, which may be located at the point of service location. The laboratory may pay the point of service location for permitting use of the device at the point of service location and for permitting the setup of the sample collection center at the point of service. For example, the laboratory may be permitted to rent out space at a retailer, where the laboratory may setup a sample collection center having one or more devices. The device may be operated by personnel who is or is not trained in the use of the device. The device operator may be affiliated with the laboratory. The device operator may or may not be an employee of the laboratory. The device and device operator may be using the point of service location as a sample collection site that is remote to the laboratory.

The laboratory may provide a cartridge to a point of service location. The cartridge may be configured to be inserted into, or otherwise interface with the device. The cartridge may or may not be disposable. The laboratory may or may not provide disposables to the service location for use with the device. Any description herein of cartridges may also apply to the disposables and vice versa. In one example, the laboratory may either sell the cartridge to the sample collection center. The sample collection center may be affiliated with the point of service location and/or with a separate entity. The sample collection center may be run by the point of service location and/or a separate entity. The laboratory may request a payment from the sample collection center for the sales of the cartridge to the sample collection center. The sample collection center may provide a payment to the laboratory for the cartridges. The operator of the device may be affiliated with the point of service location. The laboratory may be functioning as a wholesaler of the cartridge. Alternatively, one or more intermediary entities may be provided that may purchase cartridges from the laboratory, and in turn provide/sell cartridges to point of service locations.

In an alternate example, the laboratory need not request payment from the sample collection center for providing the cartridge at the sample collection center. The device may be operated by personnel who is or is not trained in the use of the device. The device operator may be affiliated with the laboratory. The device operator may or may not be an employee of the laboratory. The device and device operator may be using the point of service location as a sample collection site that is remote to the laboratory. The cartridge may be used as part of the sample collection service at the point of service location, for a device that may be operated by a laboratory-affiliated individual.

The laboratory 630 may be capable of communicating with a health care professional 640. The health care professional may be at a location separate from the laboratory and the point of service. The health care professional may or may not have an existing relationship with the subject 650. The health care professional may have issued a prescription for the subject to go to the point of service location and perform one or more test. The health care professional may or may not have a relationship with point of service or with the laboratory. In some embodiments, the laboratory may send a report to the health care professional. The medical report may be based on data collected from a device at the point of service. The medical report may be based on an analysis of the data collected from the device. In some embodiments, analysis of data may include the comparison of collected data with one or more threshold value to determine the presence or concentration of at least one analyte. In some embodiments, the laboratory may have a processor that may be configured to access a data storage unit that may have information relating to the one or more threshold value. The analysis may occur at the laboratory 630 and the report may be generated at the laboratory. Alternatively, the analysis may occur at the device and the report may be generated by the device or at the laboratory.

In some embodiments, a report may be provided to a subject 650. The report transmitted to the subject may or may not be the same as the report provided to the health care professional 640. The reports may be sent simultaneously, or the health care professional may receive the report first, or vice versa.

An LBM 610 may be provided that may communicate with a payer 600 and a point of service 620. The LBM may or may not communicate with a health care professional 640 and/or a laboratory 630.

The laboratory 630 and LBM 610 may be separate entities. The laboratory and LBM may be separate corporations, companies, organizations, institutions, partnerships, one or more individuals, or any other type of entity as described elsewhere herein. The laboratory and LBM may be incorporated as separate legal entities. The LBM may be a laboratory benefits manager, and the laboratory may be a wholesaler. The laboratory and LBM may be housed in separate facilities. Alternatively, they may share facilities.

The LBM 610 may charge a payer 600 based on use of the device at the point of service 620. For example, per use of the device, the LBM may charge the payer a fee. The size of the fee may depend on one or more factors, such as the type of use of the device (e.g., number of analytes whose presence or concentration were detected, the number of chemical reactions, the amount of sample preparation, the types of reactions that take place, the number of device components that are used), the analysis conducted in relationship to the data collected from the device (e.g., more complex analysis may result in a different fee from more straightforward analysis), the payer relationship with the subject, the payer relationship with the point of service if any. The LBM and payer may have an agreement in place that may determine the payment plan between the payer and the LBM.

The LBM 610 may provide a payment to a point of service 620 based on use of the device at the point of service. For example, per use of the device, the LBM may provide a payment to the point of service. In another example, for the amount of time that the device is located at the point of service, the LBM may provide a payment to the point of service. The size of the fee may depend on one or more factors, such as the type of use of the device (e.g., number of analytes whose presence or concentration were detected, the number of chemical reactions, the amount of sample preparation, the types of reactions that take place, the number of device components that are used), the analysis conducted in relationship to the data collected from the device (e.g., more complex analysis may result in a different fee from more straightforward analysis). The LBM and point of service may have an agreement in place that may determine the payment plan between the point of service and the LBM and the LBM. In alternate embodiments, the LBM may provide a payment to a laboratory 630. Any description herein of providing payment to a point of service may also apply to a laboratory. The LBM may provide a payment to the laboratory instead of providing a payment to the point of service, or in addition to providing a payment to the point of service.

In some embodiments, the LBM 610 may divide a payment received from the payer 600 into a technical fee and a professional fee. In one example, the LBM may provide a payment to a health care professional 640 based on the professional fee. The LBM may provide a payment to the sample collection center 620 based on the technical fee. In some embodiments, the sample collection center may be operated by a point of service, such as a retailer, hospital, or any other point of service. In some embodiments, the sample collection center may be operated by a laboratory. The payment may be provided to the entity for the point of service location, or to a laboratory who may be operating a sample collection center at a point of service location.

The LBM may make the determination of how to divide the payment from the payer. The technical fee and/or professional fees may be based on agreements that the LBM may have with the health care professional, point of service, and/or laboratory. The professional fee may also or alternatively be based on agreements that the health care professional may have with the payer and/or laboratory.

The LBM may further divide the payment from the payer into a transaction fee. The transaction fee may be an amount that goes to the LBM. The LBM may be able to keep a fraction of the payment made by the payer.

Figure 7:
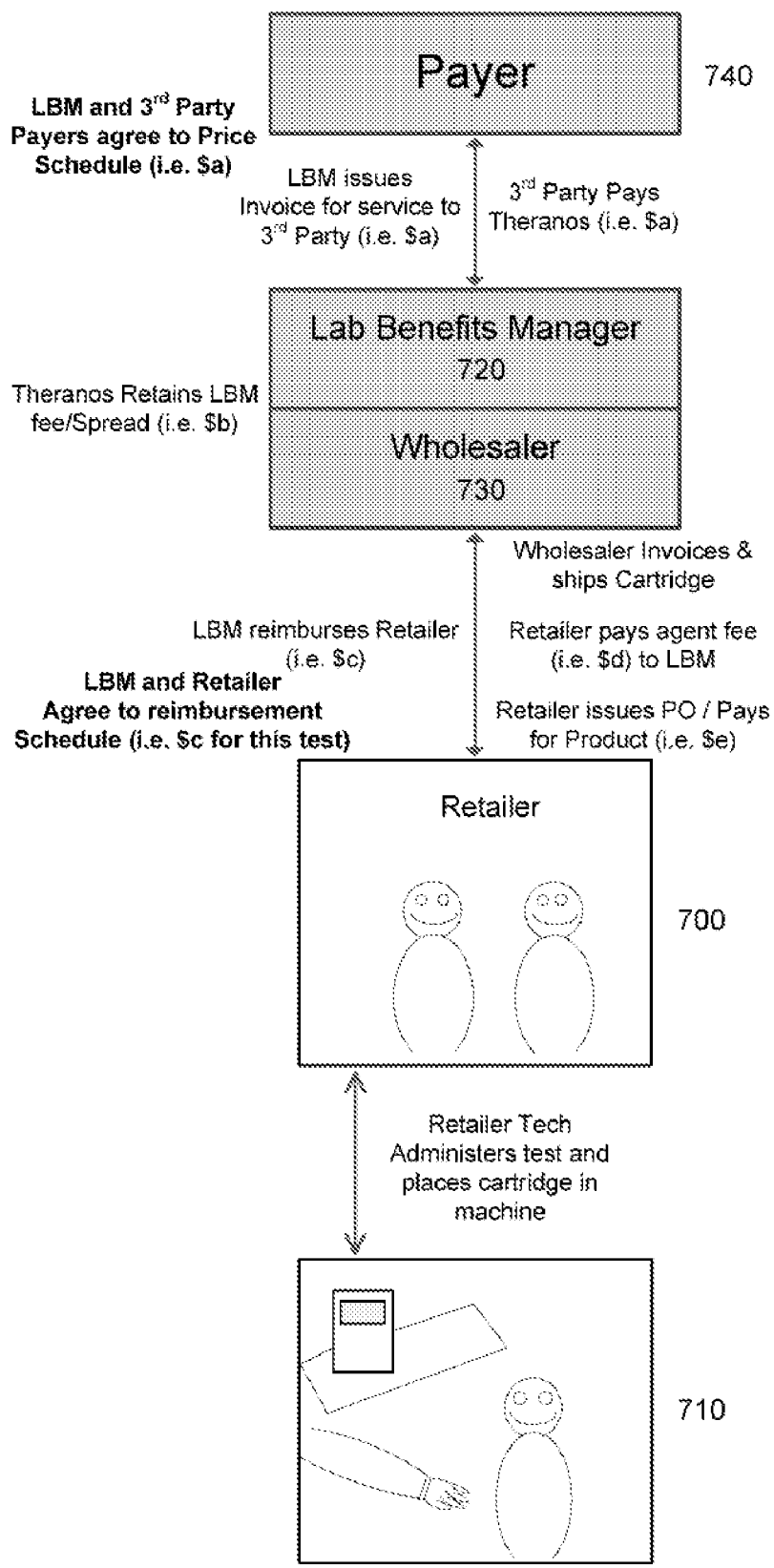
FIG. 7 shows an example of a laboratory benefit manager/wholesaler model in accordance with an embodiment of the invention.

FIG. 7 shows an example of a lab benefits manager/wholesaler model in accordance with an embodiment of the invention. A retailer 700 (or other point of service), such as a pharmacy, may have one or more sample processing device located at the retailer site. A retailer technician may operate the sample processing device, and may place a cartridge into the device 710. The cartridge may or may not contain a sample from a subject collected at the retailer site.

A laboratory benefit manager 720 may be an LBM as described elsewhere herein. The laboratory benefit manager may be an entity.

A laboratory benefit manager 720 and a wholesaler 730 may be provided within the model. The laboratory benefit manager and the wholesaler may be separate entities. The laboratory benefit manager and the wholesaler may be separate legal entities, corporate entities, corporations, partnerships, organizations, and/or groups of one or more individuals. The laboratory benefit manager and the wholesaler may be housed in different facilities or in the same facility.

A laboratory benefit manager 720 may be in communication with one or more payers 740. The laboratory benefit manager may issue an invoice for a service to the payers. The payer may pay the laboratory benefit manager. For example, the laboratory benefit manager may request a $a (e.g., $28 to provide a numerical example) fee from the payer, who pays the laboratory benefit manager, the $a. The laboratory benefit manager may retain a LBM fee. For example, a $b (e.g., $1 to provide a numerical example) fee may be retained by the laboratory benefit manager.

The laboratory benefit manager 720 may reimburse the retailer 700 for the balance of the amount. For example, the laboratory benefit manager may pay the retailer the remaining $c, (e.g., $27). $c may equal $a minus $b.

The retailer may also have fees associated with the laboratory benefit manager and/or the wholesaler. For example, the retailer may have an agent fee that the retailer may pay the laboratory benefit manager. In one example, the agent fee is $d (e.g., $8 to provide a numerical example). The retailer may also issue a purchase order or pay for a product. For example, the retailer may pay for the purchase or use of the device at the retailer site and/or cartridges. The retailer may pay the laboratory benefit manager. Alternatively, the retailer may pay the wholesaler for the purchase or use of the device and/or cartridges. In one example, the payment for the product may be $e (e.g., $9 to provide a numerical example).

From a laboratory benefit manager perspective, there may be a financial benefit to following the model. For example, the laboratory benefit manager may receive an LBM fee based on the device use. For example, the LBM fee may be $b per transaction. The laboratory benefit manager may also receive an agent fee from the retailer. For example, the laboratory benefit manager may receive an $d admin fee. In some instances, the laboratory benefit manager may also receive a product fee from the retailer. For example, the laboratory benefit manager may receive a $e product fee.

From a retailer perspective, there may be financial benefit to following the model. For example, the retailer may receive a service income of $c. The service income may be provided through the laboratory benefit manager. The laboratory benefit manager may provide the service income based on a payment received from a payer. The laboratory benefit manager may subtract an LBM fee from the amount received from the payer, and may pass the rest on to the retailer as a service income. In additional embodiments, the laboratory benefit manager may also subtract a professional fee, which may be provided to a health care professional or other entity, with the remainder of the balance going to the retailer as a service income. Thus, as shown in FIG. 7, the total revenue may be provided from a $c service income. Costs to the retailer may include an administration fee (e.g., the $d fee shown), and/or a product fee (e.g., the $e fee shown). The costs may be about $f (e.g., $17 to provide a numerical example). $f may equal $d plus $e. The costs to the retailer may be lower than the service income. For example, a $g (e.g., $10 to provide a numerical example) gross margin is illustrated for the retailer. In some instances, $g=$c minus $f.

The table below illustrates examples of the model.

| P & L Impacts | Retailer |
| --- | --- |
| Service Income | $c |
| Total Revenue | $c |
| COGS | $f ($d admin fee + $e product cost) |
| Gross Margin | $g |

Any of the dollar amounts are provided by way of example only and shall not be construed as limiting. Any numerical value may be inserted for the various dollar values.

In some embodiments, a subject may be associated with a payer. For example, a payer, such as a health insurance company, government payer, or any other payer as described herein, may provide coverage for the subject. A payer may pay some or all of the subject's medical bills. In some embodiments, when a subject arrives at a point of service, the identification of the subject may be verified. The identification of the subject may be verified using the device, and/or verified by personnel at the point of service. For example, the personnel at the point of service may view the subject's identification and/or insurance card. The device may or may not capture an image of the subject and/or collect one or more biometric parameter from the subject. Verification may occur on-board the device. Alternatively, the identification of the subject may be collected at the point of service and may be further verified at another entity or location. For example, a laboratory, health care professional, or payer may verify the subject identity. The device, laboratory, health care professional, and/or payer may be capable of accessing subject information, such as electronic health records. Verification may occur rapidly and/or in real-time. For example, verification may occur within 10 minutes or less, 5 minutes or less, 3 minutes or less, 1 minute or less, 45 seconds or less, 30 seconds or less, 20 seconds or less, 15 seconds or less, 10 seconds or less, 5 seconds or less, 3 seconds or less, 1 second or less, 0.5 seconds or less, or 0.1 seconds or less. The verification may be automated without requiring any human intervention.

The system may verify the identity of the subject for the system's records, insurance coverage, to prevent fraud, or any other purpose. The verification may be performed by the device. The verification may occur at any time. In one example, the subject's identity may be verified prior to preparing the subject's sample for the test. The subject's identity may be verified prior to providing a sample to the device and/or cartridge. The verification of the subject's identity may be provided prior to, currently with, or after verifying the subject's insurance coverage. The verification of the subject's identity may be provided prior to, currently with, or after verifying the subject has received a prescription to undergo said qualitative and/or quantitative evaluation. The verification may take place through communications with the medical care provider, laboratory, payer, laboratory benefits manager, or any other entity. Verification may occur by accessing one or more data storage units. The data storage units may include an electronic medical records database and/or a payer database. Verification may occur rapidly and/or in real-time. For example, verification may occur within 10 minutes or less, 5 minutes or less, 3 minutes or less, 1 minute or less, 45 seconds or less, 30 seconds or less, 20 seconds or less, 15 seconds or less, 10 seconds or less, 5 seconds or less, 3 seconds or less, 1 second or less, 0.5 seconds or less, or 0.1 seconds or less. The verification may be automated without requiring any human intervention.

The verification may include information provided by the subject. For example, the verification may include scanning an identification card and/or insurance card of the subject. The verification may include taking a picture of the subject and/or the subject's face. For example, the verification may include taking a two-dimensional or three-dimensional snapshot of the subject. Cameras may be used which may provide a two-dimensional digital image of the subject and/or that may be capable of formulating a three-dimensional or four-dimensional image of the subject. A four-dimensional image of the subject may incorporate changes over time. The verification may include taking a picture of the subject's face for identification. The verification may include taking a picture of another portion of the subject's face for identification, including but not limited to the patient's whole body, arm, hand, leg, torso, foot, or any other portion of the body. The verification may employ a video camera and/or a microphone that may capture additional visual and/or audio information. The verification may include comparing the subject's movements (e.g., gait), or voice.

The verification may include entering personal information related to the subject, such as the subject's name, insurance policy number, answers to key questions, and/or any other information. The verification may include collecting one or more biometric read-out of the subject. For example, the verification may include a fingerprint, handprint, footprint, retinal scan, temperature readout, weight, height, audio information, electrical readouts, or any other information. The biometric information may be collected by the device. For example, the device may have a touchscreen upon which the subject may put the subject's palm to be read by the device. The touchscreen may be capable of scanning one or more body part of the subject, and/or receiving a temperature, electrical, and/or pressure readout from the subject. Alternatively, the device may receive the biometric information from other devices. For example, the device may receive the subject's weight from a scale that may be separate from the device. The information may be sent directly from the other devices (e.g., over wired or wireless connection) or may be entered manually.

The verification may also include information based on a sample collected from the subject. For example, the verification may include a genetic signature of the subject. When the sample is provided to the device, the device may use at least part of the sample to determine the genetic signature of the subject. For example, the device may perform one or more nucleic acid amplification step and may determine key genetic markers for the subject. This may form the subject's genetic signature. The subject's genetic signature may be obtained prior to, concurrently with, or after processing the sample on the device. The subject's genetic signature may be stored on one or more data storage unit. For example, the subject's genetic signature may be stored in the subject's electronic medical records. The subject's collected genetic signature may be compared with the subject's genetic signature already stored in the records, if it exists. Any other unique identifying characteristic of the subject may be used to verify the subject's identity.

Methods for the amplification of nucleic acids, including DNA and/or RNA, are known in the art. Amplification methods may involve changes in temperature, such as a heat denaturation step, or may be isothermal processes that do not require heat denaturation. The polymerase chain reaction (PCR) uses multiple cycles of denaturation, annealing of primer pairs to opposite strands, and primer extension to exponentially increase copy numbers of the target sequence. Denaturation of annealed nucleic acid strands may be achieved by the application of heat, increasing local metal ion concentrations (e.g. U.S. Pat. No. 6,277,605), ultrasound radiation (e.g. WO/2000/049176), application of voltage (e.g. U.S. Pat. No. 5,527,670, U.S. Pat. No. 6,033,850, U.S. Pat. No. 5,939,291, and U.S. Pat. No. 6,333,157), and application of an electromagnetic field in combination with primers bound to a magnetically-responsive material (e.g. U.S. Pat. No. 5,545,540), which are hereby incorporated by reference in their entirety. In a variation called RT-PCR, reverse transcriptase (RT) is used to make a complementary DNA (cDNA) from RNA, and the cDNA is then amplified by PCR to produce multiple copies of DNA (e.g. U.S. Pat. No. 5,322,770 and U.S. Pat. No. 5,310,652, which are hereby incorporated by reference in their entirety).

One example of an isothermal amplification method is strand displacement amplification, commonly referred to as SDA, which uses cycles of annealing pairs of primer sequences to opposite strands of a target sequence, primer extension in the presence of a dNTP to produce a duplex hemiphosphorothioated primer extension product, endonuclease-mediated nicking of a hemimodified restriction endonuclease recognition site, and polymerase-mediated primer extension from the 3' end of the nick to displace an existing strand and produce a strand for the next round of primer annealing, nicking and strand displacement, resulting in geometric amplification of product (e.g. U.S. Pat. No. 5,270,184 and U.S. Pat. No. 5,455,166, which are hereby incorporated by reference in their entirety). Thermophilic SDA (tSDA) uses thermophilic endonucleases and polymerases at higher temperatures in essentially the same method (European Pat. No. 0 684 315, which is hereby incorporated by reference in its entirety).

Other amplification methods include rolling circle amplification (RCA) (e.g., Lizardi, "Rolling Circle Replication Reporter Systems," U.S. Pat. No. 5,854,033); helicase dependent amplification (HDA) (e.g., Kong et al., "Helicase Dependent Amplification Nucleic Acids," U.S. Pat. Appln. Pub. No. US 2004-0058378 A1); and loop-mediated isothermal amplification (LAMP) (e.g., Notomi et al., "Process for Synthesizing Nucleic Acid," U.S. Pat. No. 6,410,278), which are hereby incorporated by reference in their entirety. In some cases, isothermal amplification utilizes transcription by an RNA polymerase from a promoter sequence, such as may be incorporated into an oligonucleotide primer. Transcription-based amplification methods commonly used in the art include nucleic acid sequence based amplification, also referred to as NASBA (e.g. U.S. Pat. No. 5,130,238); methods which rely on the use of an RNA replicase to amplify the probe molecule itself, commonly referred to as Qβ replicase (e.g., Lizardi, P. et al. (1988) *BioTechnol.* 6, 1197-1202); self-sustained sequence replication (e.g., Guatelli, J. et al. (1990) *Proc. Natl. Acad. Sci. USA* 87, 1874-1878; Landgren (1993) *Trends in Genetics* 9, 199-202; and HELEN H. LEE et al., NUCLEIC ACID AMPLIFICATION T ECHNOLOGIES (1997)); and methods for generating additional transcription templates (e.g. U.S. Pat. No. 5,480,784 and U.S. Pat. No. 5,399,491), which are hereby incorporated by reference in their entirety. Further methods of isothermal nucleic acid amplification include the use of primers containing non-canonical nucleotides (e.g. uracil or RNA nucleotides) in combination with an enzyme that cleaves nucleic acids at the non-canonical nucleotides (e.g. DNA glycosylase or RNaseH) to expose binding sites for additional primers (e.g. U.S. Pat. No. 6,251, 639, U.S. Pat. No. 6,946,251, and U.S. Pat. No. 7,824,890), which are hereby incorporated by reference in their entirety. Isothermal amplification processes can be linear or exponential.

Nucleic acid amplification for subject identification may comprise sequential, parallel, or simultaneous amplification of a plurality of nucleic acid sequences, such as about, less than about, or more than about 10, 11, 12, 13, 14, 15, 20, 25, 30, 35, 40, 50, 100, or more target sequences. In some embodiments, a subjects entire genome or entire transcriptome is non-specifically amplified, the products of which are probed for one or more identifying sequence characteristics. An identifying sequence characteristic includes any feature of a nucleic acid sequence that can serve as a basis of differentiation between individuals. In some embodiments, an individual is uniquely identified to a selected statistical significance using about, less than about, or more than about 10, 11, 12, 13, 14, 15, 20, 25, 30, 35, 40, 50, 100, or more identifying sequences. In some embodiments, the statistical significance is about, or smaller than about $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, $10^{-12}$, $10^{-13}$, $10^{-14}$, $10^{-15}$, or smaller. Examples of identifying sequences include Restriction Fragment Length Polymorphisms (RFLP; Botstein, et al., Am. J. Hum. Genet. 32: 314-331, 1980; WO 90/13668), Single Nucleotide Polymorphisms (SNPs; Kwok, et al., Genomics 31: 123-126, 1996), Randomly Amplified Polymorphic DNA (RAPD; Williams, et al., Nucl. Acids Res. 18: 6531-6535, 1990), Simple Sequence Repeats (SSRs; Zhao & Kochert, Plant Mol. Biol. 21: 607-614, 1993; Zietkiewicz, et al. Genomics 20: 176-183, 1989), Amplified Fragment Length Polymorphisms (AFLP; Vos, et al., Nucl. Acids Res. 21: 4407-4414, 1995), Short Tandem Repeats (STRs), Variable Number of Tandem Repeats (VNTR), microsatellites (Tautz, Nucl. Acids. Res. 17: 6463-6471, 1989; Weber and May, Am. J. Hum. Genet. 44: 388-396, 1989), Inter-Retrotransposon Amplified Polymorphism (IRAP), Long Interspersed Elements (LINE), Long Tandem Repeats (LTR), Mobile Elements (ME), Retrotransposon Microsatellite Amplified Polymorphisms (REMAP), Retrotransposon-Based Insertion Polymorphisms (RBIP), Short Interspersed Elements (SINE), and Sequence Specific Amplified Polymorphism (SSAP). Additional examples of identifying sequences are known in the art, for example in US20030170705, which is incorporated herein by reference. A genetic signature may consist of multiple identifying sequences of a single type (e.g. SNPs), or may comprise a combination of two or more different types of identifying sequences in any number or combination.

Genetic signatures can be used in any process requiring the identification of one or more subjects, such as in paternity or maternity testing, in immigration and inheritance disputes, in breeding tests in animals, in zygosity testing in twins, in tests for inbreeding in humans and animals; in evaluation of transplant suitability such as with bone marrow transplants; in identification of human and animal remains; in quality control of cultured cells; in forensic testing such as forensic analysis of semen samples, blood stains, and other biological materials; in characterization of the genetic makeup of a tumor by testing for loss of heterozygosity; and in determining the allelic frequency of a particular identifying sequence. Samples useful in the generation of a genetics signature include evidence from a crime scene, blood, blood stains, semen, semen stains, bone, teeth, hair, saliva, urine, feces, fingernails, muscle or other soft tissue, cigarettes, stamps, envelopes, dandruff, fingerprints, items containing any of these, and combinations thereof. In some embodiments, two or more genetic signatures are generated and compared. In some embodiments, one or more genetics signatures are compared to one or more known genetic signatures, such as genetic signatures contained in a database.

A system may also verify whether the subject has received instruction to undergo a clinical test from a health care professional. The system may thus verify whether a subject has received an order from a health care professional to undertake a qualitative and/or quantitative evaluation of a biological sample. For example, the system may verify whether the subject has received a prescription from the health care professional to take the test. The system may verify whether the subject has received instructions from the health care professional to provide a sample to the device. The system may also verify whether the subject was authorized to go to a particular point of service to undergo the test. The verification may occur with aid of the device. The verification may occur at any time. In one example, the subject's authorization to take the test may be verified prior to preparing the subject's sample for the test. The subject's authorization to take the test may be verified prior to providing a sample to the device and/or cartridge. The verification of the subject's authorization may be provided after verifying the subject's identification. The verification of the subject's authorization may be provided before or after verifying the subject has insurance coverage for the clinical test. The system may verify whether the subject is covered by health insurance for a qualitative and/or quantitative evaluation of a sample, within the verifying step is performed prior to, concurrently with, or after processing a biological sample with the aid of a device, or transmitting the data from the device. The verification may take place through communications with the medical care provider, laboratory, payer, laboratory benefits manager, or any other entity. Verification may occur rapidly and/or in real-time. For example, verification may occur within 10 minutes or less, 5 minutes or less, 3 minutes or less, 1 minute or less, 45 seconds or less, 30 seconds or less, 20 seconds or less, 15 seconds or less, 10 seconds or less, 5 seconds or less, 3 seconds or less, 1 second or less, 0.5 seconds or less, or 0.1 seconds or less. The verification may be automated without requiring any human intervention.

The system may also verify whether the subject has insurance coverage for the clinical test. The system may verify whether the subject has insurance coverage to provide a sample to the device. The system may also verify whether the subject has insurance coverage for going to the point of service and undergoing the test. The verification may occur at any time. In one example, the subject's insurance coverage may be verified prior to preparing the subject's sample for the test. The subject's insurance coverage may be verified prior to providing a sample to the device and/or cartridge. The verification of the subject's insurance coverage may be provided after verifying the subject's identification. The verification of the subject's insurance coverage may be provided before or after verifying the subject has received a prescription to take the clinical test. The verification may take place through communications with the medical care provider, laboratory, payer, laboratory benefits manager, or any other entity. The verification may occur with the aid of the device. Verification may occur rapidly and/or in real-time. For example, verification may occur within 10 minutes or less, 5 minutes or less, 3 minutes or less, 1 minute or less, 45 seconds or less, 30 seconds or less, 20 seconds or less, 15 seconds or less, 10 seconds or less, 5 seconds or less, 3 seconds or less, 1 second or less, 0.5 seconds or less, or 0.1 seconds or less. The verification may be automated without requiring any human intervention.

The system may also verify whether the clinical test is appropriate for the subject. The system may verify whether an order for a qualitative and/or quantitative evaluation is within a set of policy restrictions. Such policy restrictions may form guidelines. Such policy restrictions may be policy restriction of a payer, prescribing physician or other ordering health care professional, laboratory, governmental or regulatory body, or any other entity. Such verification may depend on one or more known characteristic of the subject including but not limited to gender, age, or past medical history. A clinical decision support system may be provided. The system may be capable of accessing one or more medical records, or information associated with the subject. The system may be able to access records relating to the identity of the subject, insurance coverage of the subject, past and present medical treatments of the subject, biological features of the subject, and/or prescriptions provided to the subject. The system may be able to access electronic health records and/or pull up patient records and history. The system may also be able to pull up payer records, such as insurance and financial information relating to the subject. The verification may occur with the aid of the device.

In some embodiments, prior to providing a qualitative and/or quantitative evaluation, the system may be capable of accessing one or more records database and/or payer database. In some instances, the system may be capable of determining which records database and/or payer database to access prior to providing said qualitative and/or quantitative evaluation, and/or prior to accessing said databases. The system may make such determination based on the subject's identity, the subject's payer information, information collected about the sample, the proposed qualitative and/or quantitative evaluation, and/or any other information.

In one example, an inappropriate test may be a pregnancy test for a male subject or a PSA level (prostrate-specific antigen) for a female subject. Such tests may fall outside the policy restrictions of a payer or prescribing physician. Such ordering errors may be detectable by reviewing the test ordered and information associated with the subject. Such information associated with the subject may include medical records for the subject or identifying information about the subject. In one example, the appropriateness of the test is verified prior to preparing the subject's sample for the test. The subject's test appropriateness may be verified prior to, concurrently with, or subsequent to providing a sample to the device and/or cartridge. The verification of the subject's test appropriateness may be provided after or prior to verifying the subject's identification and/or insurance coverage. The verification may take place through communications with the medical care provider, laboratory, payer, laboratory benefits manager, or any other entity. A clinical decision support system may operate rapidly and/or in real-time. For example, verification may occur within 10 minutes or less, 5 minutes or less, 3 minutes or less, 1 minute or less, 45 seconds or less, 30 seconds or less, 20 seconds or less, 15 seconds or less, 10 seconds or less, 5 seconds or less, 3 seconds or less, 1 second or less, 0.5 seconds or less, or 0.1 seconds or less. The clinical decision support system may be automated without requiring any human intervention.

In some embodiments, qualified personnel may assist with collecting the subject's identity and/or providing a sample from the subject to the device. The qualified personnel may be an authorized technician that has been trained to use the device. The qualified personnel may be a designated operator of the device. The qualified personnel may or may not be a health care professional. In some embodiments, the identity of the qualified personnel may be verified. The qualified personnel's identity may be verified prior to, currently with, or after receiving the biological sample, transmitting the data from the device electronically and/or analyzing the transmitted data. The qualified personnel's identity may be verified prior to, currently with, or after verifying the identity of the subject. The qualified person's identity may be verified using one or more of the techniques described elsewhere herein.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of evaluating a biological sample collected from a subject, said method comprising:
   (a) receiving data transmitted from a Clinical Laboratory Improvement Amendments (CLIA)-compliant device placed in or on the subject or at a site selected from the group consisting of a retailer site, the subject's home, or a health assessment/treatment location,
       wherein the device is configured to process the biological sample by:
       (i) receiving the biological sample;
       (ii) preparing the biological sample and yielding raw data for a subsequent qualitative and/or quantitative evaluation of said biological sample; and
       (iii) transmitting electronically the raw data to an authorized analytical facility and/or an affiliate thereof for performance of said subsequent evaluation;
   (b) analyzing the raw data transmitted from the device at the authorized analytical facility and/or the affiliate thereof, to provide said evaluation of said biological sample, wherein said analysis is performed using a processor alone or in conjunction with an individual affiliated with the authorized analytical facility; and
   (c) providing oversight of integrity of said analysis and operation of said CLIA-compliant device such that results generated from said analysis can be utilized by a health care professional for diagnosis or treatment of said subject, wherein the oversight is performed using a processor alone or in conjunction with an individual affiliated with the authorized analytical facility, and wherein the authorized analytical facility is a CLIA-compliant laboratory.

2. The method of claim 1, wherein the evaluation of said biological sample is effected without transporting said sample from the site where the sample is collected to the authorized analytical facility and/or an affiliate thereof.

3. The method of claim 1, wherein the biological sample is selected from the group consisting of blood, serum, plasma, nasal swab or nasopharyngeal wash, saliva, urine, tears, gastric fluid, spinal fluid, stool, mucus, sweat, earwax, oil, glandular secretion, cerebral spinal fluid, tissue, semen, and vaginal fluid, throat swab, breath, hair, finger nails, skin, biopsy, placental fluid, amniotic fluid, cord blood, emphatic fluids, cavity fluids, sputum, mucus, puss, micropiota, meconium, breast milk and/or other excretions.

4. The method of claim 1, wherein the biological sample has a volume of 250 uL or less.

5. The method of claim 1, wherein said oversight includes the selection of the analysis methodology and procedures.

6. The method of claim 1, further comprising the step of verifying insurance eligibility of said subject prior to, concurrent with or subsequent to said analysis.

7. The method of claim 1, further comprising generating a report for said subject based on said evaluation.

8. A method of evaluating a biological sample collected from a subject, said method comprising:
   (a) receiving electronic data representative of an image of said biological sample and/or an image of a physical process or chemical reaction performed with said biological sample or a portion thereof, said data being transmitted from a Clinical Laboratory Improvement Amendments (CLIA)-compliant device placed in or on the subject or at a designated sample collection site,
   wherein the device is configured to process the biological sample by:
       (i) receiving the biological sample;
       (ii) preparing the biological sample and yielding the electronic data representative of the image of said biological sample and/or the image of the physical process or the chemical reaction; and
       (iii) transmitting the electronic data representative of the image to an authorized analytical facility and/or an affiliate thereof for performance of an evaluation;
   wherein the processing generates the electronic data representative of the image necessary for the evaluation of said biological sample, and
   (b) analyzing the electronic data representative of the image transmitted from the device at the authorized analytical facility and/or the affiliate thereof, to provide said evaluation of said biological sample, wherein said analysis is performed using a processor alone or in conjunction with an individual affiliated with the authorized analytical facility; and (c) providing oversight of integrity of said analysis and operation of said CLIA-compliant device such that results generated from said analysis can be utilized by a health care professional for diagnosis or treatment of said subject, wherein the oversight is performed using a processor alone or in conjunction with an individual affiliated with the authorized analytical facility, and wherein the authorized analytical facility is a CLIA-compliant laboratory.

9. The method of claim 8, wherein the evaluation of said biological sample is effected without transporting said sample from the site where the sample is collected to the authorized analytical facility and/or an affiliate thereof.

10. The method of claim 8, wherein the biological sample is selected from the group consisting of blood, serum, plasma, nasal swab or nasopharyngeal wash, saliva, urine, tears, gastric fluid, spinal fluid, stool, mucus, sweat, earwax, oil, glandular secretion, cerebral spinal fluid, tissue, semen, and vaginal fluid, throat swab, breath, hair, finger nails, skin, biopsy, placental fluid, amniotic fluid, cord blood, emphatic fluids, cavity fluids, sputum, mucus, puss, micropiota, meconium, breast milk and/or other excretions.

11. The method of claim 8, wherein the biological sample has a volume of 250 uL or less.

12. The method of claim 8, wherein said oversight includes the selection of the analysis methodology and procedures.

13. The method of claim 8, further comprising the step of verifying insurance eligibility of said subject prior to, concurrent with or subsequent to said analysis.

14. The method of claim 8, further comprising generating a report for said subject based on said evaluation.

15. A method of evaluating a plurality of types of biological samples collected from a subject, said method comprising:
(a) receiving data transmitted from a Clinical Laboratory Improvement Amendments (CLIA)-compliant device placed in or on the subject or at a designated sample collection site,
wherein the device is configured to process the plurality of types of biological samples by:
(i) receiving the plurality of types of biological samples;
(ii) preparing the biological samples and yielding raw data for a subsequent qualitative and/or quantitative evaluation of said plurality of types of biological samples; and
(iii) transmitting electronically the raw data to an authorized analytical facility and/or an affiliate thereof for performance of said subsequent evaluation;
(b) analyzing the raw data transmitted from the device at the authorized analytical facility and/or the affiliate thereof, to provide said evaluation of said plurality of types of biological samples, wherein said analysis is performed using a processor alone or in conjunction with an individual affiliated with the authorized analytical facility; and
(c) providing oversight of integrity of said analysis and operation of said CLIA-compliant device such that results generated from said analysis can be utilized by a health care professional for diagnosis or treatment of said subject, wherein the oversight is performed using a processor alone or in conjunction with an individual affiliated with the authorized analytical facility, and wherein the authorized analytical facility is a CLIA-compliant laboratory.

16. The method of claim 15, wherein the evaluation of said biological samples is effected without transporting said samples from the site where the samples are collected to the authorized analytical facility and/or an affiliate thereof.

17. The method of claim 15, wherein the biological samples are selected from the group consisting of blood, serum, plasma, nasal swab or nasopharyngeal wash, saliva, urine, tears, gastric fluid, spinal fluid, stool, mucus, sweat, earwax, oil, glandular secretion, cerebral spinal fluid, tissue, semen, and vaginal fluid, throat swab, breath, hair, finger nails, skin, biopsy, placental fluid, amniotic fluid, cord blood, emphatic fluids, cavity fluids, sputum, mucus, puss, micropiota, meconium, breast milk and/or other excretions.

18. The method of claim 15, wherein each of the biological samples has a volume of 250 uL or less.

19. The method of claim 15, wherein said oversight includes the selection of the analysis methodology and procedures.

20. The method of claim 15, further comprising the step of verifying insurance eligibility of said subject prior to, concurrent with or subsequent to said analysis.

21. The method of claim 15, further comprising generating a report for said subject based on said evaluation.

22. A system of evaluating a biological sample collected from a subject, said system comprising:
(a) a communication unit configured to receive data from a Clinical Laboratory Improvement Amendments (CLIA)-compliant device placed in or on the subject or at a designated sample collection site,
wherein the device is configured to process the biological sample, thereby generating raw data for a subsequent qualitative and/or quantitative evaluation of said biological sample, and
wherein the device comprises
(i) a sample collection unit configured to receive the biological sample;
(ii) a sample preparation unit configured to prepare the biological sample and to yield raw data for the evaluation; and
(iii) transmission unit configured to transmit the raw data to an authorized analytical facility and/or an affiliate thereof;
(b) a processor that processes said data alone or in conjunction with an individual affiliated with the authorized analytical facility for the evaluation of said biological sample at the authorized analytical facility and/or the affiliate thereof, and for the oversight of said integrity of evaluation and operation of said CLIA-compliant device such that results generated from said evaluation can be utilized by a health care professional for diagnosis or treatment of said subject, wherein the authorized analytical facility is a CLIA-compliant laboratory, and wherein said processor communicates with a record database comprising one or more medical records and/or insurance information of the subject.

23. The system of claim 22, wherein the process is configured to communicate with a payer database comprising the insurance information for the subject.

24. The system of claim 22, wherein the device is configured to receive information relating to said evaluation and optionally display said information on said device.

* * * * *